US012639871B2

(12) United States Patent

Chen et al.

(10) Patent No.: US 12,639,871 B2

(45) Date of Patent: May 26, 2026

(54) METHOD AND APPARATUS FOR ANIMATION TRANSITION IN APPLICATION

(71) Applicant: Huawei Technologies Co., Ltd., Shenzhen (CN)

(72) Inventors: Xu Chen, Hangzhou (CN); Bing Xie, Hangzhou (CN); Shuai Zhou, Shenzhen (CN); Min Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 18/517,661

(22) Filed: Nov. 22, 2023

(65) Prior Publication Data

US 2024/0095988 A1 Mar. 21, 2024

Related U.S. Application Data

(63) Continuation of application No. PCT/CN2022/088518, filed on Apr. 22, 2022.

(30) Foreign Application Priority Data

May 25, 2021 (CN) ........................ 202110574091.X
Jun. 2, 2021 (CN) ........................ 202110616128.0

(51) Int. Cl.
*G06T 13/00* (2011.01)

(52) U.S. Cl.
CPC .......... *G06T 13/00* (2013.01); *G06T 2200/24* (2013.01)

(58) Field of Classification Search
CPC ........................... G06T 13/00; G06T 2200/24
See application file for complete search history.

(56) References Cited

U.S. PATENT DOCUMENTS

| | | | |
|---|---|---|---|
| 2007/0013699 A1* | 1/2007 | Nelson .................... | G06T 13/00 |
| | | | 345/473 |
| 2016/0202948 A1* | 7/2016 | Chen ..................... | G06F 3/0481 |
| | | | 715/746 |
| 2017/0109029 A1* | 4/2017 | Lee ........................ | G06T 11/001 |
| 2017/0352322 A1* | 12/2017 | Spence ................... | H04N 7/01 |
| 2018/0061110 A1* | 3/2018 | Flores .................... | G06T 13/80 |

FOREIGN PATENT DOCUMENTS

CN 110162343 A 8/2019

* cited by examiner

*Primary Examiner* — Daniel Samwel

(74) *Attorney, Agent, or Firm* — Conley Rose, P.C.

(57) ABSTRACT

A method includes playing a starting animation and an exiting animation of a first application using a same animationLeash object such that the starting animation and the exiting animation transition smoothly. When playing the starting animation stops, the exiting animation is played.

20 Claims, 48 Drawing Sheets

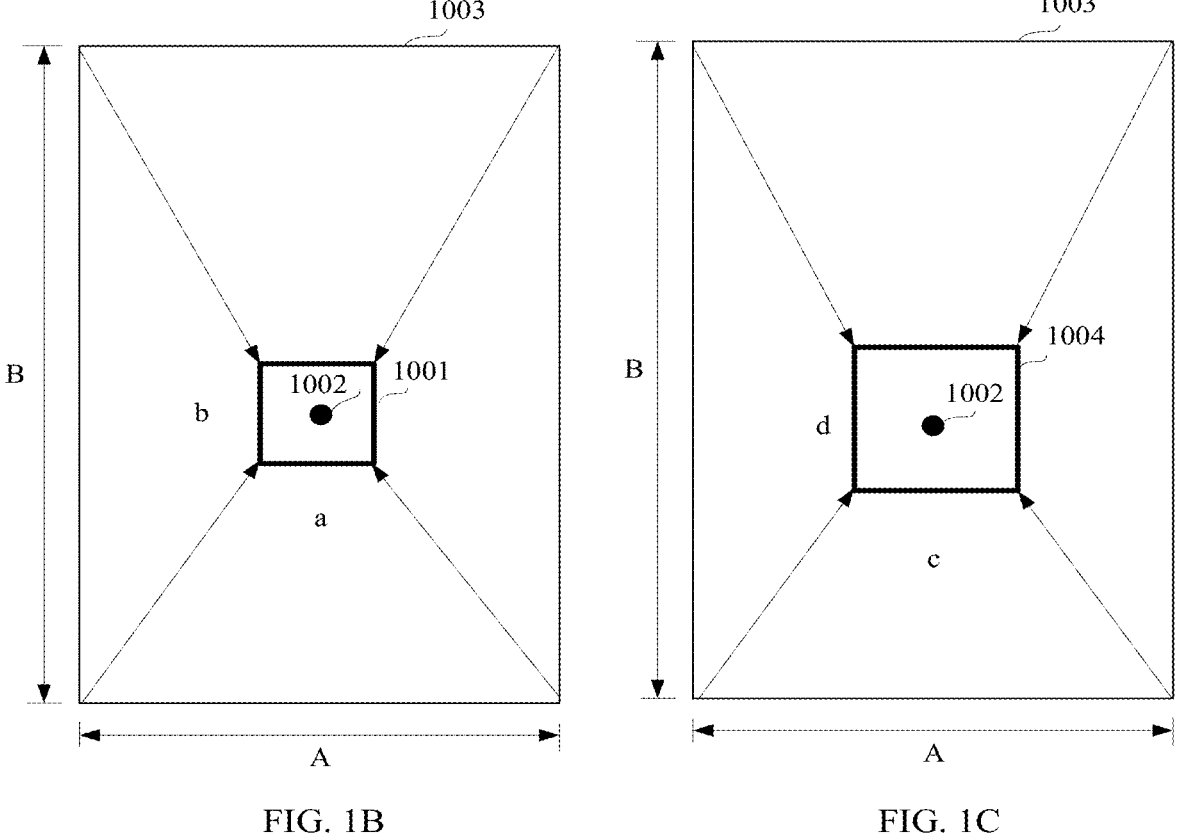
FIG. 1B                   FIG. 1C

User interface 10

User interface 40

FIG. 1M

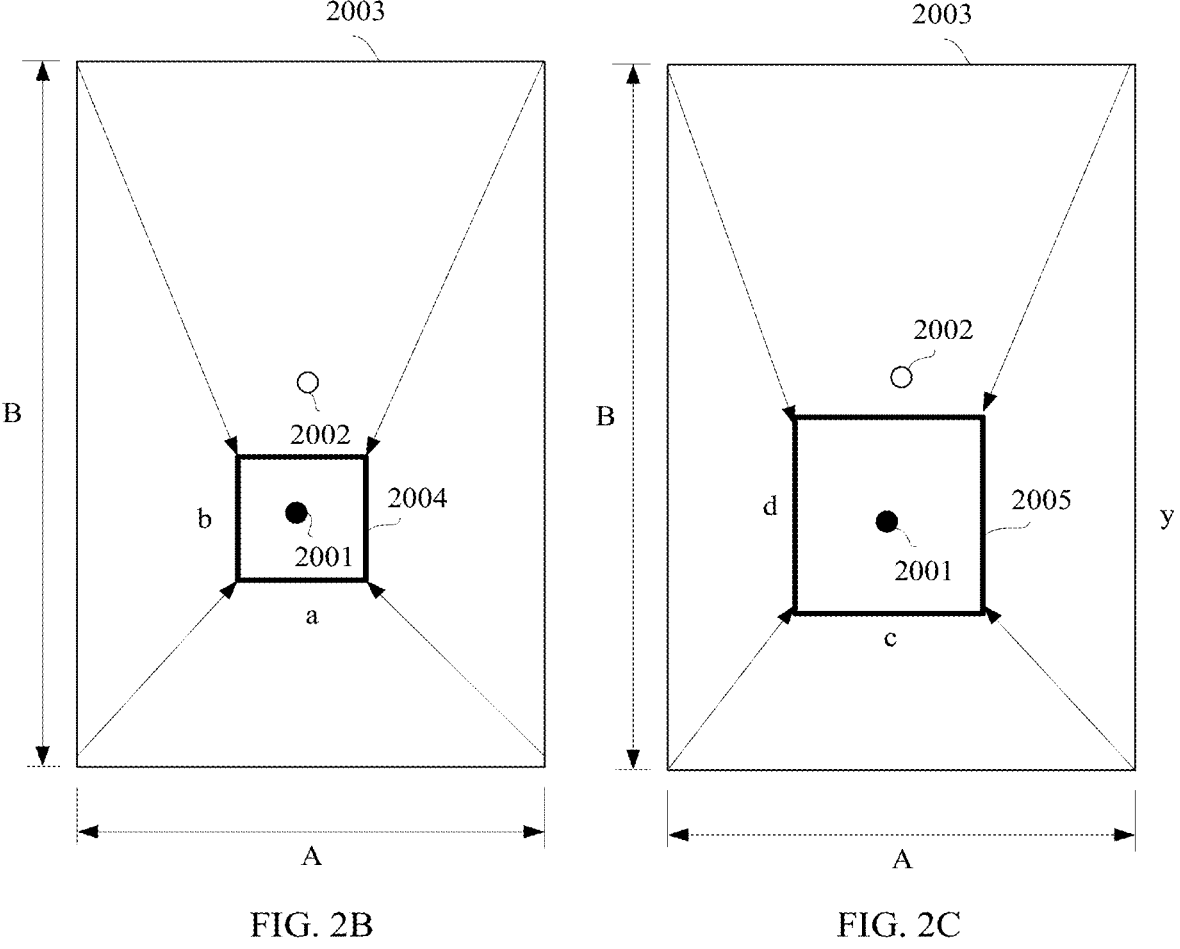
FIG. 2B                    FIG. 2C

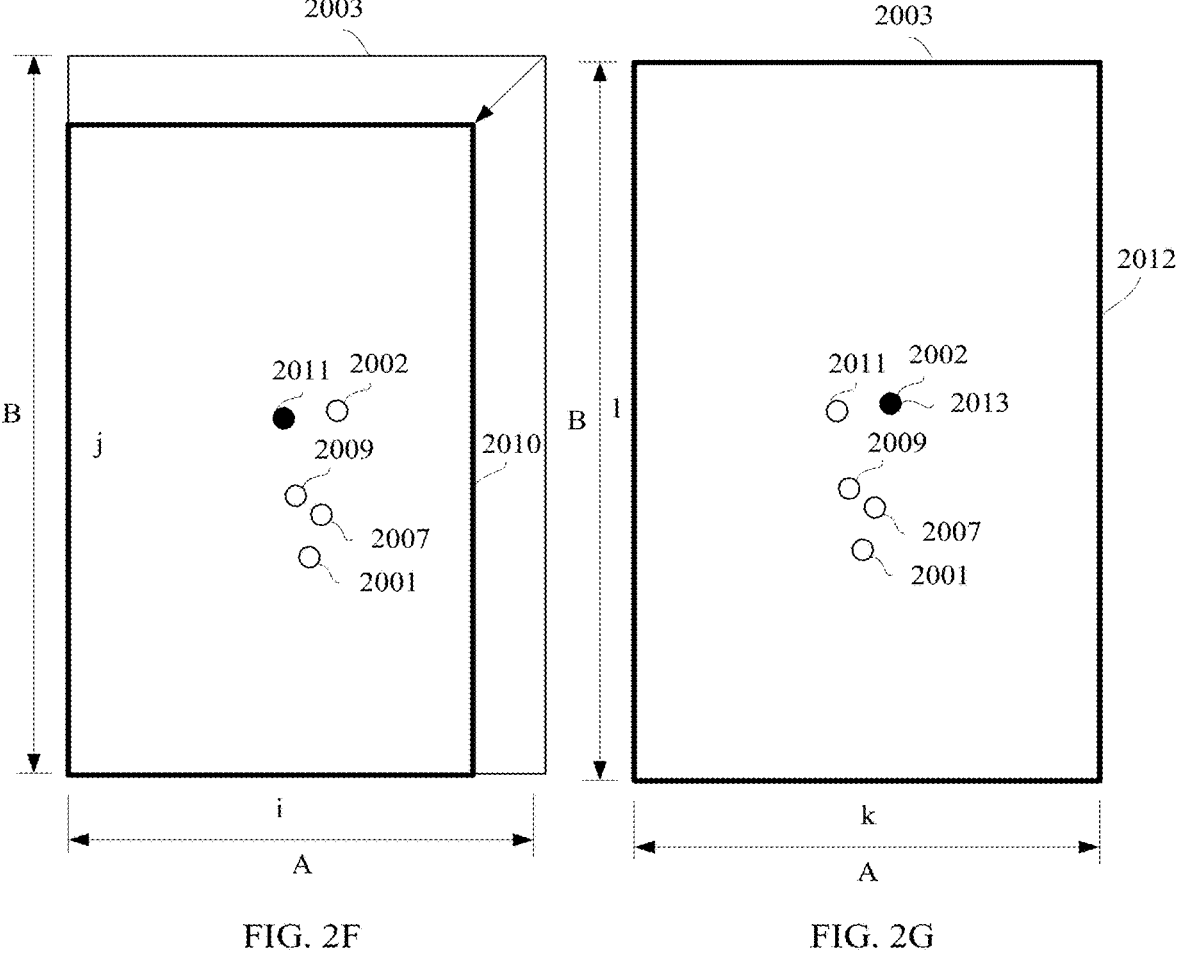
FIG. 2F                    FIG. 2G

User interface 30

User interface 30

User interface 30

User interface 30

User interface 30

METHOD AND APPARATUS FOR ANIMATION TRANSITION IN APPLICATION

CROSS-REFERENCE TO RELATED APPLICATIONS

This is a continuation of International Patent Application No. PCT/CN2022/088518 filed on Apr. 22, 2022, which claims priority to Chinese Patent Application No. 202110574091.X filed on May 25, 2021 and Chinese Patent Application No. 202110616128.0 filed on Jun. 2, 2021. All of the aforementioned patent applications are hereby incorporated by reference in their entireties.

TECHNICAL FIELD

This disclosure relates to the field of terminal technologies, and in particular, to a method and an apparatus for animation transition in an application.

BACKGROUND

With continuous development of information technologies, electronic devices have become indispensable tools in people's lives. For example, a user may install various different applications (APPs) on an electronic device. Different applications can provide different service functions for the user.

At present, to provide better user experience for the user when an application is started or exited, the electronic device may play an animation when the application is started or exited. At present, when an electronic device receives an operation of the user for exiting a first application in a process of playing a starting animation of the first application, the electronic device stops playing the starting animation, creates an exiting animation, and starts to play the exiting animation. However, because the starting animation and the exiting animation are two pieces of animations, when the two pieces of animations are switched, the user may feel a sudden change of a scene. This brings poor experience. Therefore, how to implement a smooth transition between the starting animation and the exiting animation is an urgent problem to be resolved.

SUMMARY

This disclosure provides a method and an apparatus for animation transition in an application. In a process of switching, both a starting animation and an exiting animation of a first application are animations performed by using a first animationLeash object. Therefore, the starting animation and the exiting animation are a same piece of animation. In this way, a problem that a transition is not smooth during switching because the starting animation and the exiting animation are two pieces of animations does not occur.

According to a first aspect, this disclosure provides a method for animation transition in an application. The method includes an electronic device that receives a first operation of a user, where the first operation is used to start playing a first animation of a first application, the electronic device displays, in a first window drawn by a first animationLeash object, a first image frame in the first animation based on the first operation, the electronic device receives a second operation of the user, where the second operation is used to indicate the electronic device to play a second animation of the first application, and the electronic device displays, in a second window drawn by the first animation- Leash object, a second image frame in the second animation based on the second operation.

According to the method provided in the first aspect, in a process of switching, both a starting animation and an exiting animation of the first application are animations performed by using the first animationLeash object. Therefore, the starting animation and the exiting animation are a same piece of animation. In this way, a problem that a transition is not smooth during switching because the starting animation and the exiting animation are two pieces of animations does not occur.

With reference to the first aspect, in a possible implementation, before the electronic device displays, in the first window drawn by the first animationLeash object, the first image frame in the first animation, the method further includes the following. The electronic device obtains the first image frame through composition based on first parameter information of the first image frame in the first animation. Before the electronic device displays, in the second window drawn by the first animationLeash object, the second image frame in the second animation, the method further includes the following. The electronic device obtains the second image frame through composition based on second parameter information of the second image frame in the second animation.

With reference to the first aspect, in a possible implementation, that the electronic device receives the second operation of the user includes the following.

The electronic device receives the second operation when displaying the first image frame. In other words, the electronic device receives the second operation of the user in a process of playing the starting animation. The first image frame may be the last image frame in the starting animation, or may be any image frame before the last image frame in the starting animation.

With reference to the first aspect, in a possible implementation, before the electronic device receives the second operation, the method further includes the following. The electronic device displays a first user interface of the first application after the first animation ends. The electronic device may receive the second operation of the user for exiting the first application after the starting animation ends.

With reference to the first aspect, in a possible implementation, the second image frame is an image frame that is the first in the second animation. Before the electronic device displays, in the second window drawn by the first animationLeash object, the second image frame in the second animation, the method further includes the following. The electronic device determines, based on the first parameter information, the second parameter information and attribute information of the second window, and the electronic device draws, by using the first animationLeash object, the second window based on the attribute information of the second window. The electronic device needs to change, based on parameter information of each image frame in the starting animation or the exiting animation, an attribute of a window drawn by the first animationLeash object, so that the window drawn by the first animationLeash object can display each image frame in the starting animation or the exiting animation.

With reference to the first aspect, in a possible implementation, that the electronic device determines, based on the first parameter information, the second parameter information includes the following. The electronic device obtains the second parameter information through interpolation calculation based on the first parameter information. To be specific, a surfaceflinger calculates, according to an interpolation algorithm, parameter information of a next image frame based on initial parameter information of a currently displayed image frame in the starting animation or the exiting animation. In this way, when the electronic device obtains an image frame through composition based on parameter information of the image frame obtained according to the interpolation algorithm and plays an animation, the animation displayed on the electronic device is smoother.

The parameter information of the next image frame may be obtained based on the parameter information of the current image frame in the animation according to the interpolation algorithm by using the following formulas:

$$a = k \times x / m \tag{Formula (1)}$$

$$V = v + a \times t \tag{Formula (2)}$$

$$P = p + V \times t \tag{Formula (3)}$$

As shown in Formula (1), Formula (2), and Formula (3), target parameter information may be obtained based on preset parameter information of an image frame according to the interpolation algorithm by using Formula (1), Formula (2), and Formula (3). In Formula (1), Formula (2), and Formula (3), a represents an acceleration, and k represents rigidity. According to the Hooke's law for springs, $k = -F/x$, where x represents a change in length from spring deformation, and F represents a force applied to generate x, the change in length from spring deformation. According to the Newtonian mechanics formula, F may be represented as $F = m \times a$, where m is the mass of an object. According to the formula $k = -F/x$ and the formula $F = m \times a$, the acceleration $a = -k \times x / m$ may be obtained.

v represents an initial speed of an object, V represents a speed of the object at a next moment, p represents an initial position of the object, P represents a position of the object at the next moment, and t indicates parameter information of which image frame in the starting animation or the exiting animation is currently calculated by an electronic device. It should be noted that, when the electronic device calculates parameter information of an image frame in the starting animation, v in Formula (3) is a positive number, and when the electronic device calculates parameter information of an image frame in the exiting animation, v in Formula (3) is a negative number.

With reference to the first aspect, in a possible implementation, before the electronic device displays, in the first window drawn by the first animationLeash object, the first image frame in the first animation, the method further includes the following. The electronic device creates a new animation processing thread in the surfaceflinger. That the electronic device determines, based on the first parameter information, the second parameter information includes the following. The electronic device determines, by using the animation processing thread, the second parameter information of the second image frame based on the first parameter information of the first image frame. In this way, the electronic device creates the new animation processing thread on the surfaceflinger side, and may put tasks of animation calculation of all applications on the electronic device into an animation processing thread area on the surfaceflinger side for processing. On one hand, the tasks of animation calculation of all the applications on the electronic device can be scheduled in a centralized manner. On the other hand, a problem that some image frames in an animation are lost and animation lagging occurs during playing because animation calculation is not scheduled in time in a user interface (UI) thread is resolved, and an animation can be played more smoothly.

With reference to the first aspect, in a possible implementation, the first parameter information includes any one or more of the following: a position of a center point of the first image frame, a window size of the first image frame, transparency of the first image frame, and a size of a rounded corner of the first image frame.

The second parameter information includes any one or more of the following: a position of a center point of the second image frame, a window size of the second image frame, transparency of the second image frame, and a size of a rounded corner of the second image frame.

The attribute information of the second window includes any one or more of the following: a position of a center point of the second window, a window size of the second window, transparency of the second window, and a size of a rounded corner of the second window.

According to a second aspect, this disclosure provides an electronic device. The electronic device includes one or more processors and one or more memories. The one or more memories are coupled to the one or more processors. The one or more memories are configured to store computer program code. The computer program code includes computer instructions. The one or more processors invoke the computer instructions to enable the electronic device to perform the following operations: receiving a first operation of a user, where the first operation is used to start playing a first animation of a first application, displaying, in a first window drawn by a first animationLeash object, a first image frame in the first animation based on the first operation, receiving a second operation of the user, where the second operation is used to indicate the electronic device to play a second animation of the first application, and displaying, in a second window drawn by the first animationLeash object, a second image frame in the second animation based on the second operation. According to the method provided in the first aspect, in a process of switching, both a starting animation and an exiting animation of the first application are animations performed by using the first animationLeash object. Therefore, the starting animation and the exiting animation are a same piece of animation. In this way, a problem that a transition is not smooth during switching because the starting animation and the exiting animation are two pieces of animations does not occur.

With reference to the second aspect, in a possible implementation, before the electronic device displays, in the first window drawn by the first animationLeash object, the first image frame in the first animation, the one or more processors invoke the computer instructions to enable the electronic device to perform the following operations: obtaining the first image frame through composition based on first parameter information of the first image frame in the first animation, and obtaining the second image frame through composition based on second parameter information of the second image frame in the second animation.

With reference to the second aspect, in a possible implementation, the one or more processors invoke the computer instructions to enable the electronic device to perform the following operation: receiving the second operation when displaying the first image frame. In other words, the electronic device receives the second operation of the user in a process of playing the starting animation. The first image frame may be the last image frame in the starting animation, or may be any image frame before the last image frame in the starting animation.

With reference to the second aspect, in a possible implementation, before the electronic device receives the second operation, the one or more processors invoke the computer instructions to enable the electronic device to perform the following operation: displaying a first user interface of the first application after the first animation ends. The electronic device may receive the second operation of the user for exiting the first application after the starting animation ends.

With reference to the second aspect, in a possible implementation, the second image frame is an image frame that is the first in the second animation. Before the electronic device displays, in the second window drawn by the first animationLeash object, the second image frame in the second animation, the one or more processors invoke the computer instructions to enable the electronic device to perform the following operations: determining, based on the first parameter information, the second parameter information and attribute information of the second window, and drawing, by using the first animationLeash object, the second window based on the attribute information of the second window. The electronic device needs to change, based on parameter information of each image frame in the starting animation or the exiting animation, an attribute of a window drawn by the first animationLeash object, so that the window drawn by the first animationLeash object can display each image frame in the starting animation or the exiting animation.

With reference to the second aspect, in a possible implementation, the one or more processors invoke the computer instructions to enable the electronic device to perform the following operation: obtaining the second parameter information through interpolation calculation based on the first parameter information.

To be specific, a surfaceflinger calculates, according to an interpolation algorithm, parameter information of a next image frame based on initial parameter information of a currently displayed image frame in the starting animation or the exiting animation. In this way, when the electronic device obtains an image frame through composition based on parameter information of the image frame obtained according to the interpolation algorithm and plays an animation, the animation displayed on the electronic device is smoother.

The parameter information of the next image frame may be obtained based on the parameter information of the current image frame in the animation according to the interpolation algorithm by using the following formulas:

$$a = k \times x/m \qquad \text{Formula (1)}$$

$$V = v + a \times t \qquad \text{Formula (2)}$$

$$P = p + V \times t \qquad \text{Formula (3)}$$

As shown in Formula (1), Formula (2), and Formula (3), target parameter information may be obtained based on preset parameter information of an image frame according to the interpolation algorithm by using Formula (1), Formula (2), and Formula (3). In Formula (1), Formula (2), and Formula (3), a represents an acceleration, and k represents rigidity. According to the Hooke's law for springs, $k = -F/x$, where x represents a change in length from spring deformation, and F represents a force applied to generate x, the change in length from spring deformation. According to the Newtonian mechanics formula, F may be represented as $F = m \times a$, where m is the mass of an object. According to the formula $k = -F/x$ and the formula $F = m \times a$, the acceleration $a = -k \times x/m$ may be obtained.

v represents an initial speed of an object, V represents a speed of the object at a next moment, P represents an initial position of the object, p represents a position of the object at the next moment, and t indicates parameter information of which image frame in the starting animation or the exiting animation is currently calculated by an electronic device. It should be noted that, when the electronic device calculates parameter information of an image frame in the starting animation, v in Formula (3) is a positive number, and when the electronic device calculates parameter information of an image frame in the exiting animation, v in Formula (3) is a negative number.

With reference to the second aspect, in a possible implementation, before the electronic device displays, in the first window drawn by the first animationLeash object, the first image frame in the first animation, the one or more processors invoke the computer instructions to enable the electronic device to perform the following operations: creating a new animation processing thread in the surfaceflinger, and determining, by using the animation processing thread, the second parameter information of the second image frame based on the first parameter information of the first image frame. In this way, the electronic device creates the new animation processing thread on the surfaceflinger side, and may put tasks of animation calculation of all applications on the electronic device into an animation processing thread area on the surfaceflinger side for processing. On one hand, the tasks of animation calculation of all the applications on the electronic device can be scheduled in a centralized manner. On the other hand, a problem that some image frames in an animation are lost and animation lagging occurs during playing because animation calculation is not scheduled in time in a UI thread is resolved, and an animation can be played more smoothly.

With reference to the second aspect, in a possible implementation, the first parameter information includes any one or more of the following: a position of a center point of the first image frame, a window size of the first image frame, transparency of the first image frame, and a size of a rounded corner of the first image frame, the second parameter information includes any one or more of the following: a position of a center point of the second image frame, a window size of the second image frame, transparency of the second image frame, and a size of a rounded corner of the second image frame, and the attribute information of the second window includes any one or more of the following: a position of a center point of the second window, a window size of the second window, transparency of the second window, and a size of a rounded corner of the second window.

According to a third aspect, this disclosure provides a computer-readable storage medium, including instructions. When the instructions are run on an electronic device, the electronic device is enabled to perform the animation calculation method provided in any possible implementation of any one of the foregoing aspects.

According to a fourth aspect, this disclosure provides a computer program product including instructions. When the computer program product is run on an electronic device, the electronic device is enabled to perform the animation calculation method provided in any possible implementation of any one of the foregoing aspects.

BRIEF DESCRIPTION OF DRAWINGS

FIG. 1A to FIG. 1M are UI diagrams of a set of starting animations according to an embodiment of this disclosure;

FIG. 2A to FIG. 2M are UI diagrams of another set of starting animations according to an embodiment of this disclosure;

DESCRIPTION OF EMBODIMENTS

Figure 1A:
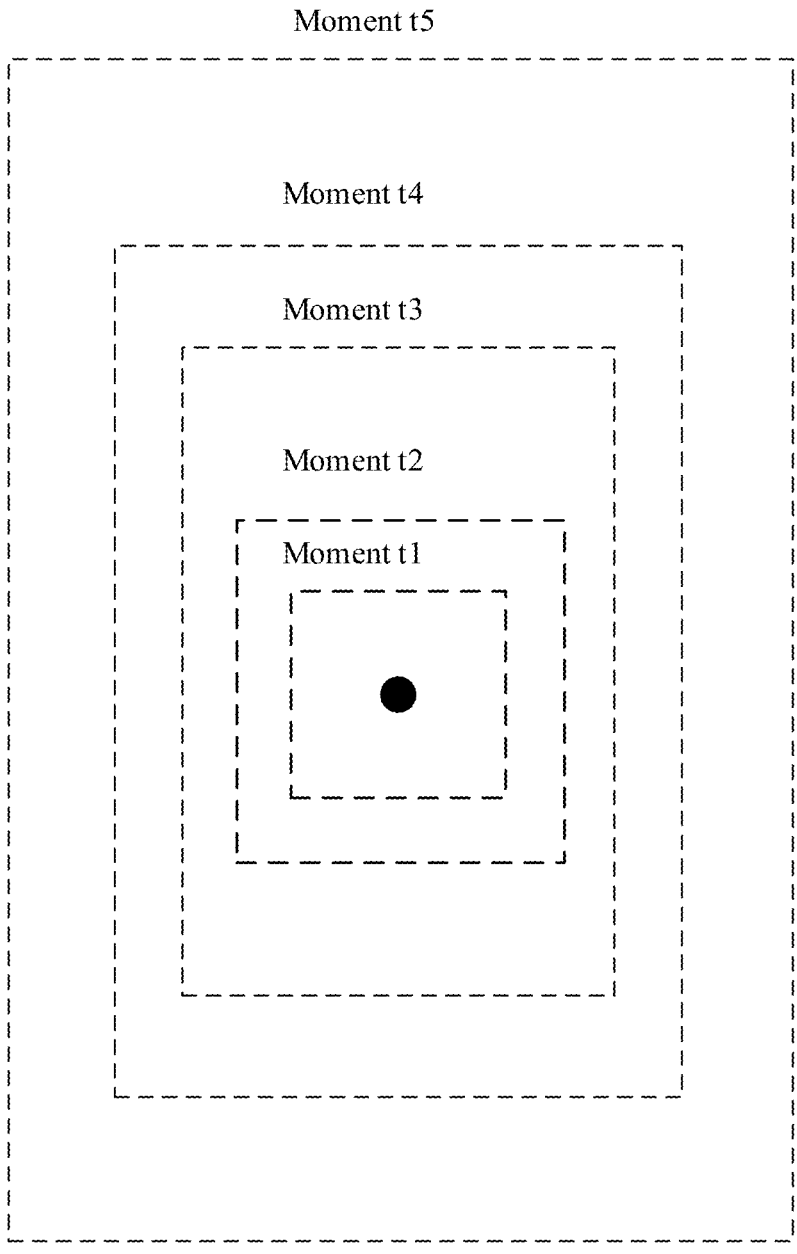

Technical solutions in embodiments of this disclosure are clearly and comprehensively described below with reference to the accompanying drawings. In the descriptions of the embodiments of this disclosure, "/" means "or" unless otherwise stated. For example, A/B may represent A or B. In the text, "or" describes only an association relationship for describing associated objects and represents that three relationships may exist. For example, A or B may represent the following three cases: only A exists, both A and B exist, and only B exists. In addition, in the descriptions of embodiments of this disclosure, "a plurality of" means two or more.

The terms "first" and "second" used below are merely intended for a purpose of description, and shall not be understood as an indication or implication of relative importance or an implicit indication of a quantity of indicated technical features. Therefore, a feature limited by using "first" or "second" may explicitly indicate or implicitly include one or more such features. In the descriptions of embodiments of this disclosure, unless otherwise stated, "a plurality of" means two or more.

The term "UI" in the description, the claims, and the accompanying drawings of this disclosure is a medium interface for interaction and information exchange between a user and an application or an operating system, and implements conversion between an internal form of information and a form acceptable to the user. A user interface of an application is source code written in a specific computer language, for example, JAVA or an Extensible Markup Language (XML). The interface source code is parsed and rendered on a terminal device, and is finally presented as content that can be recognized by a user, for example, an image, text, a button, and another control. The control or a widget, is a basic element in the user interface. Typical controls include a toolbar, a menu bar, an input box, a button, a scrollbar, an image, and text. An attribute and content of a control in an interface are defined by using a tag or a node. For example, the control included in the interface is defined in the XML by using a node, for example, <Textview>, <ImgView>, or <VideoView>. One node corresponds to one control or attribute in the interface. After being parsed and rendered, the node is presented as content visual for a user. In addition, a web page is usually further included in interfaces of many applications such as a hybrid application. A web page or a page, may be understood as a special control embedded in an interface of an application. The web page is source code written in a specific computer language, for example, a HyperText Markup Language (HTML), Cascading Style Sheets (CSS), or JAVASCRIPT (JS). The web page source code may be loaded and displayed as content that can be recognized by a user by a browser or a web page display component that has a similar function as that of the browser. Specific content included in the web page is also defined by using a tag or a node in the web page source code. For example, an element and an attribute of the web page are defined in the HTML by using <p>, <img>, <video>, or <canvas>.

A user interface is usually represented in a form of a graphical user interface (GUI), and is a user interface that is related to a computer operation and that is displayed graphically. The graphical user interface may be an interface element, for example, a window or a control, displayed on a display screen of an electronic device.

Technical terms in embodiments of this disclosure are first explained.

1. Animation:

The animation means changes of positions, sizes, display forms, and the like of M image frames in a predetermined order, so that a user feels that a user interface displayed on an electronic device is varied.

The animation in embodiments of this disclosure includes a starting animation and an exiting animation. A phase from when an application receives an operation of a user for triggering to start the application to when an electronic device 100 displays a main interface of the application is referred to as a starting phase of the application, and time spent in the starting phase is referred to as starting time. Because the electronic device 100 needs to initialize and pre-load the application in the starting phase of the application, the starting time is relatively long. To bring better user experience to a user, the electronic device 100 plays a starting animation in the starting phase of the application. The starting animation may be that N image frames are displayed in the user interface on the electronic device 100 in a floating manner in a predetermined order based on a preset window size, preset display time, a preset display position, preset transparency, a preset display element, and the like. After the application is started, a phase from when the electronic device 100 receives an operation of the user for exiting the application to when the electronic device 100 displays the main interface is referred to as an exiting phase of the application, and time spent in the exiting phase is referred to as exiting time. Because the exiting time of the application is relatively long, to bring better user experience to the user, the electronic device 100 plays an exiting animation in the exiting phase of the application. The exiting animation may be that N image frames are displayed in the user interface on the electronic device 100 in a floating manner in a predetermined order based on a preset window size, preset display time, a preset display position, preset transparency, a preset display element, and the like.

It can be understood that the starting animation and the exiting animation may be reciprocal animations, or may be two different pieces of animations. This is not limited herein in this disclosure.

(1) Starting Animation:

FIG. 1A to FIG. 1M, FIG. 2A to FIG. 2M, and FIG. 3A to FIG. 3E are examples of UI diagrams of several starting animations.

As shown in FIG. 1A to FIG. 1M, in some embodiments, a size of each image frame gradually increases from a preset minimum size to a preset maximum size.

In a possible implementation, a center point of an image frame in a starting animation coincides with a center point of a display screen of the electronic device 100. A size of each image frame may gradually increase from the preset minimum size to the preset maximum size proportionally as time goes on.

As shown in FIG. 1A, FIG. 1A is a schematic diagram of an example of a size change of an image frame in a starting animation.

For example, at a moment t1, the electronic device 100 receives and responds to an operation of a user of tapping an icon of an application, where a size of the icon of the application remains unchanged, and an original size of the application may be referred to as the preset minimum size. Then, at a moment t2, the size of the icon of the application gradually increases. At a moment t3, the size of the icon of the application no longer increases, and the electronic device 100 displays a rectangular box, where a size of the rectangular box is a size of the rectangular box shown at the moment t3. At a moment t4, the size of the rectangular box increases from that at the moment t3 to a size of the rectangular box at the moment t4. At a moment t5, the size of the rectangular box increases from that at the moment t4 to a size of the rectangular box at the moment t5. The size of the rectangular box at the moment t5 is referred to as the preset maximum size.

As shown in FIG. 1B, in the starting animation, a size of the first image frame 1001 is the same as the size of the icon of the application, and a center point of the first image frame 1001 and a center point of the icon of the application are at a same position, that is, at a position 1002. The size of the first image frame 1001 is a minimum size (to be specific, a width is a, and a height is b). The first image frame 1001 may gradually increase from the preset minimum size to a preset maximum size of an image frame 1003, where the preset maximum size includes a width that is A and a length that is B.

As shown in FIG. 1C, in the starting animation, the first image frame 1001 gradually increases from the preset minimum size to an image frame 1004, and a center point of the image frame 1004 and the center point of the icon of the application are at a same position, that is, at the position 1002. A size of the image frame 1004 includes a width that is c and a height that is d. c is greater than a, and d is greater than b.

Figures 1D, 1E, 1F:
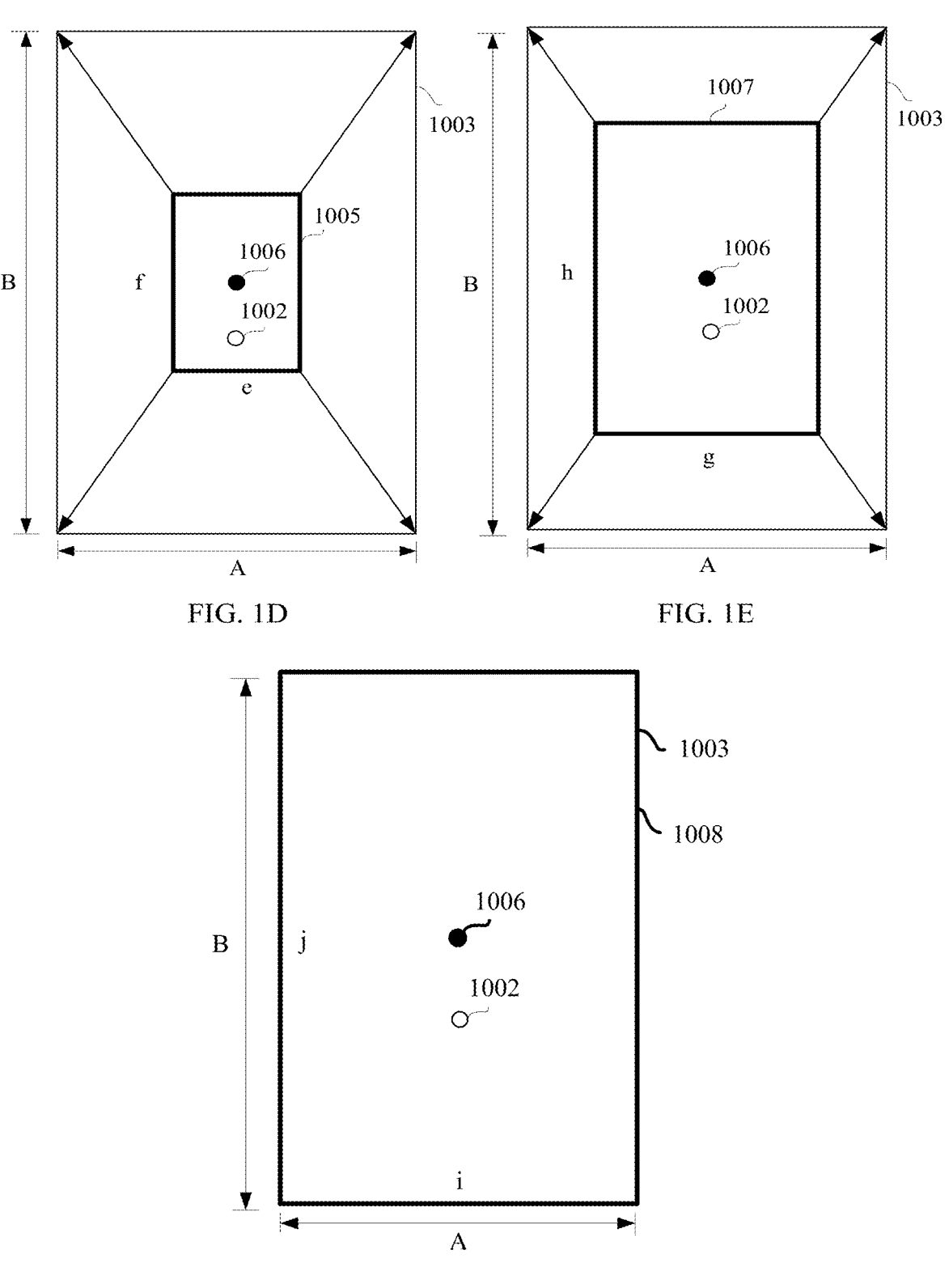

As shown in FIG. 1D, in the starting animation, the size of the image frame 1004 gradually increases to an image frame 1005, and a center of the image frame 1005 is no longer at a same position as the center point 1002 of the icon of the application, but is at a same position as a center point of the image frame 1003, that is, at a position 1006. A size of the image frame 1005 includes a width that is e and a height that is f. f is greater than d.

As shown in FIG. 1E, in the starting animation, the size of the image frame 1005 gradually increases to an image frame 1007, and a center of the image frame 1007 is no longer at a same position as the center point 1002 of the icon of the application, but is at a same position as the center point of the image frame 1003, that is, at the position 1006. A size of the image frame 1007 includes a width that is g and a height that is h. g is greater than e, and h is greater than f.

As shown in FIG. 1F, in the starting animation, the size of the image frame 1007 gradually increases to an image frame 1008, and a center of the image frame 1008 is no longer at a same position as the center point 1002 of the icon of the application, but is at a same position as the center point of the image frame 1003, that is, at the position 1006. A size of the image frame 1007 includes a width that is i and a height that is j. i is greater than g, and j is greater than h. i is equal to A, and j is equal to B.

When the application is started, the electronic device 100 may play the starting animation in the starting phase of the application. The starting animation includes a plurality of image frames. Display positions and sizes of the image frames may be different from each other. The electronic device 100 sequentially displays the plurality of image frames in order.

Figure 1G:
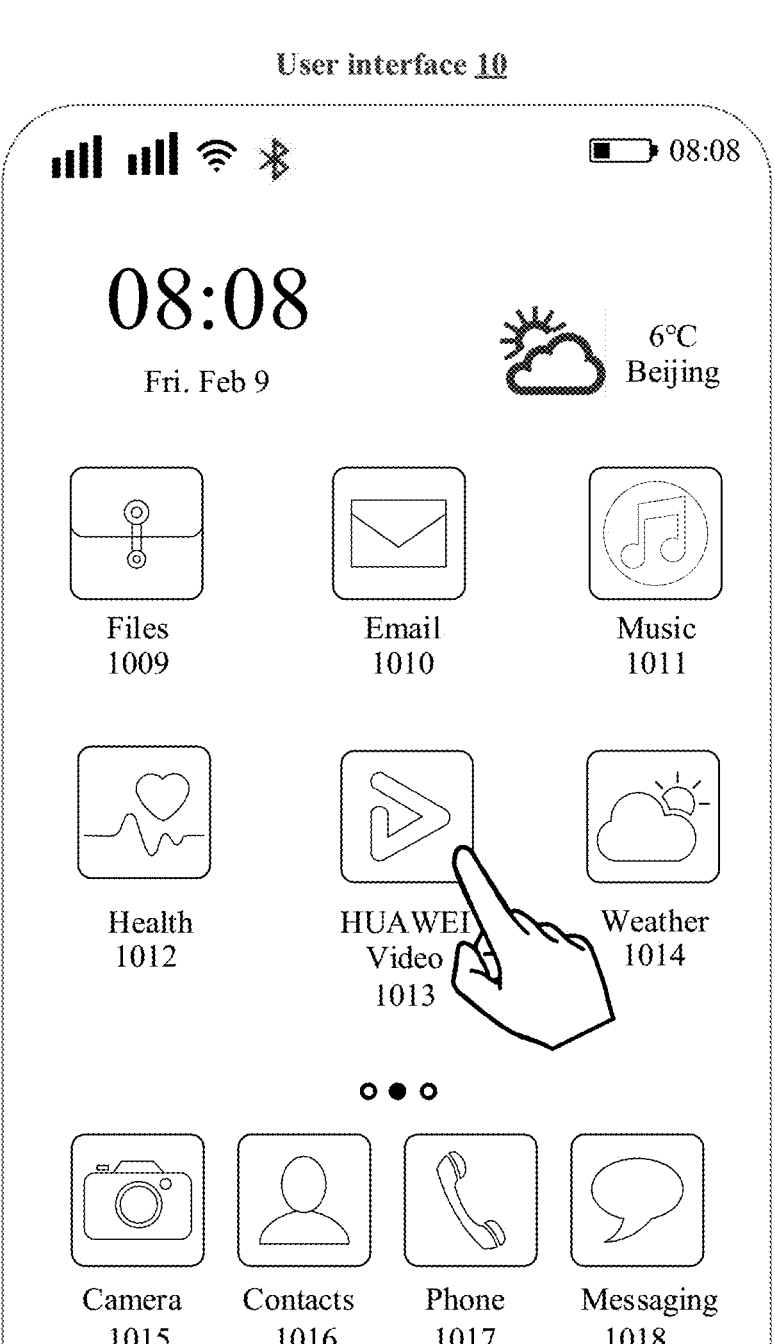

For example, as shown in FIG. 1G, FIG. 1G shows an example of a user interface 10 on the electronic device 100. Icons of some applications may be included in the user interface 10, for example, an icon 1009 of Files, an icon 1010 of Email, an icon 1011 of Music, an icon 1012 of Health, an icon 1013 of HUAWEI Video, an icon 1014 of Weather, an icon 1015 of Camera, an icon 1016 of Contacts, an icon 1017 of Phone, and an icon 1018 of Messaging. In some embodiments, icons of more or fewer applications may be included in the user interface 10. In some embodiments, icons of applications that are different from the applications shown in FIG. 1G may be included in the user interface 10. This is not limited herein.

The electronic device 100 may receive and respond to a user operation (for example, tapping) on the icon 1013 of HUAWEI Video in the user interface 10, and the application HUAWEI Video is started.

Figure 1H:
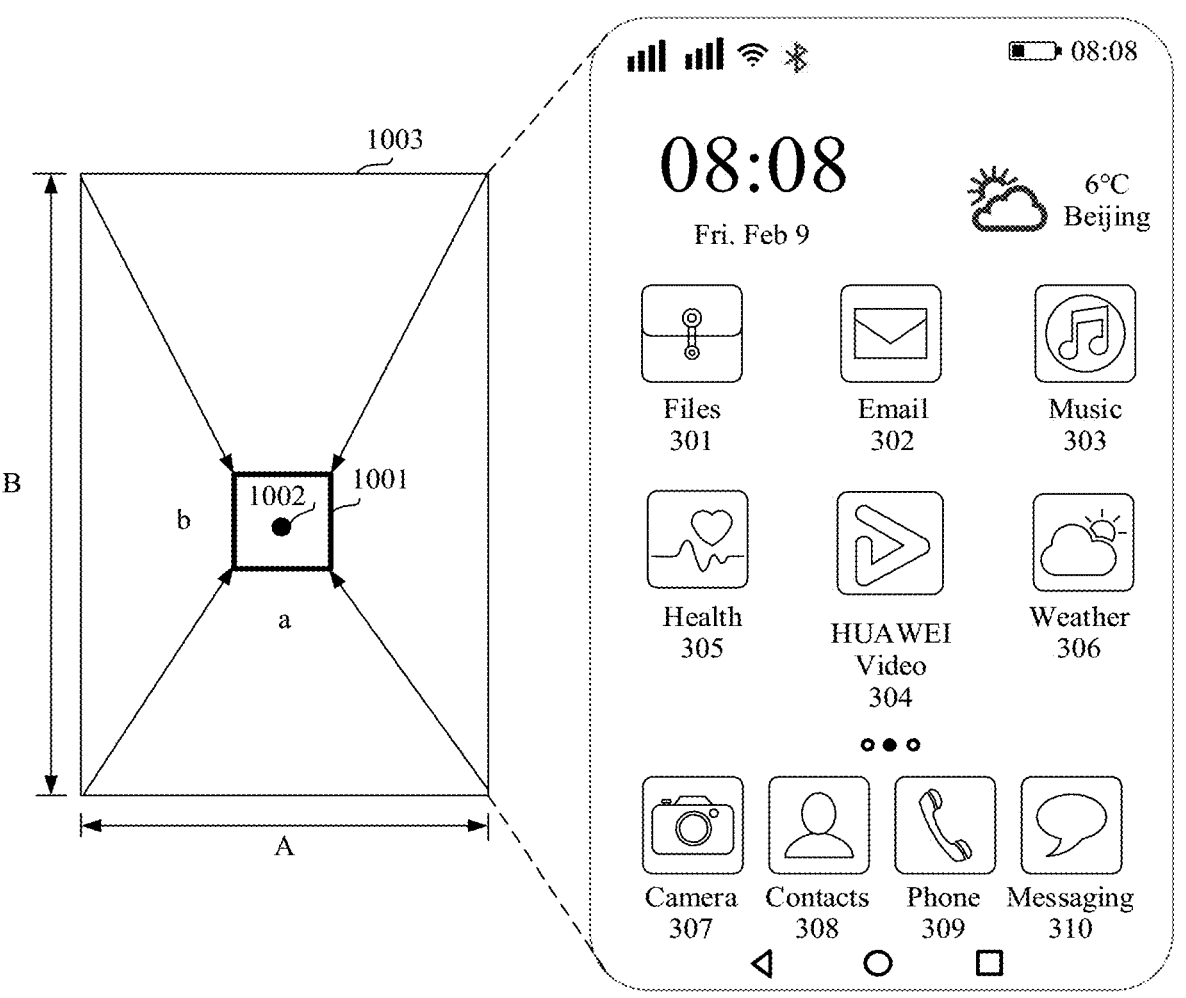

As shown in FIG. 1H, image content of the first image frame 1001 is the same as image content of the icon of the application HUAWEI Video. The size of the first image frame 1001 is the same as a size of the icon of the application HUAWEI Video, and the center point of the first image frame 1001 and a center point of the icon of the application HUAWEI Video are at a same position.

Figure 1I:
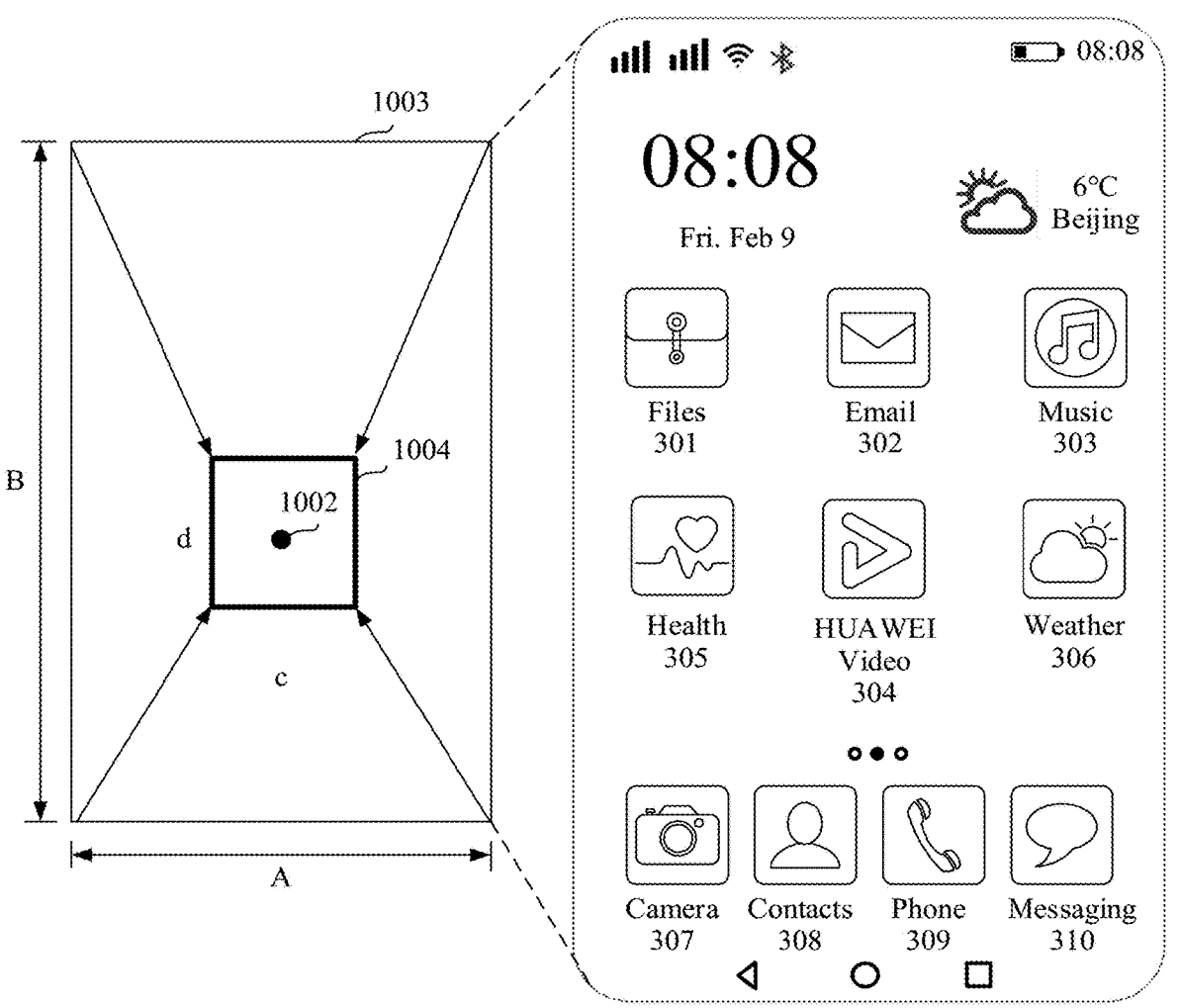

As shown in FIG. 1I, the first image frame 1001 gradually increases from the preset minimum size to the image frame 1004. Image content of the image frame 1004 is the same as the image content of the icon of the application HUAWEI Video, and the center point of the image frame 1004 and the center point of the icon of the application HUAWEI Video are at a same position.

Figure 1J:
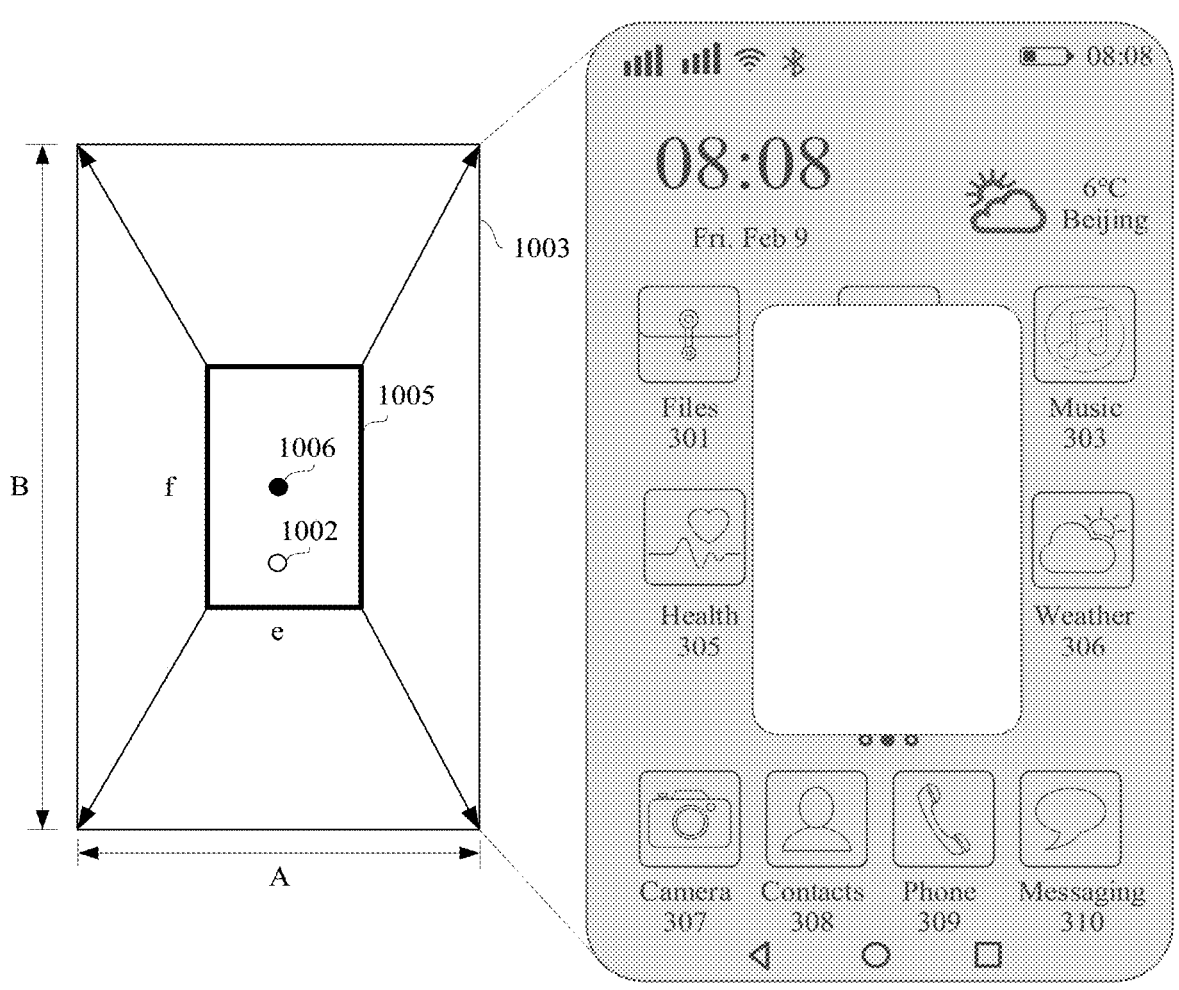

As shown in FIG. 1J, the size of the image frame 1004 gradually increases to the image frame 1005, and image content of the image frame 1005 may not show any element, or may show one or more elements. This is not limited herein in this disclosure. In addition, the center of the image frame 1005 is no longer at a same position as the center point 1002 of the icon of the application HUAWEI Video, but is at a same position as the center point of the display screen of the electronic device 100.

Figure 1K:
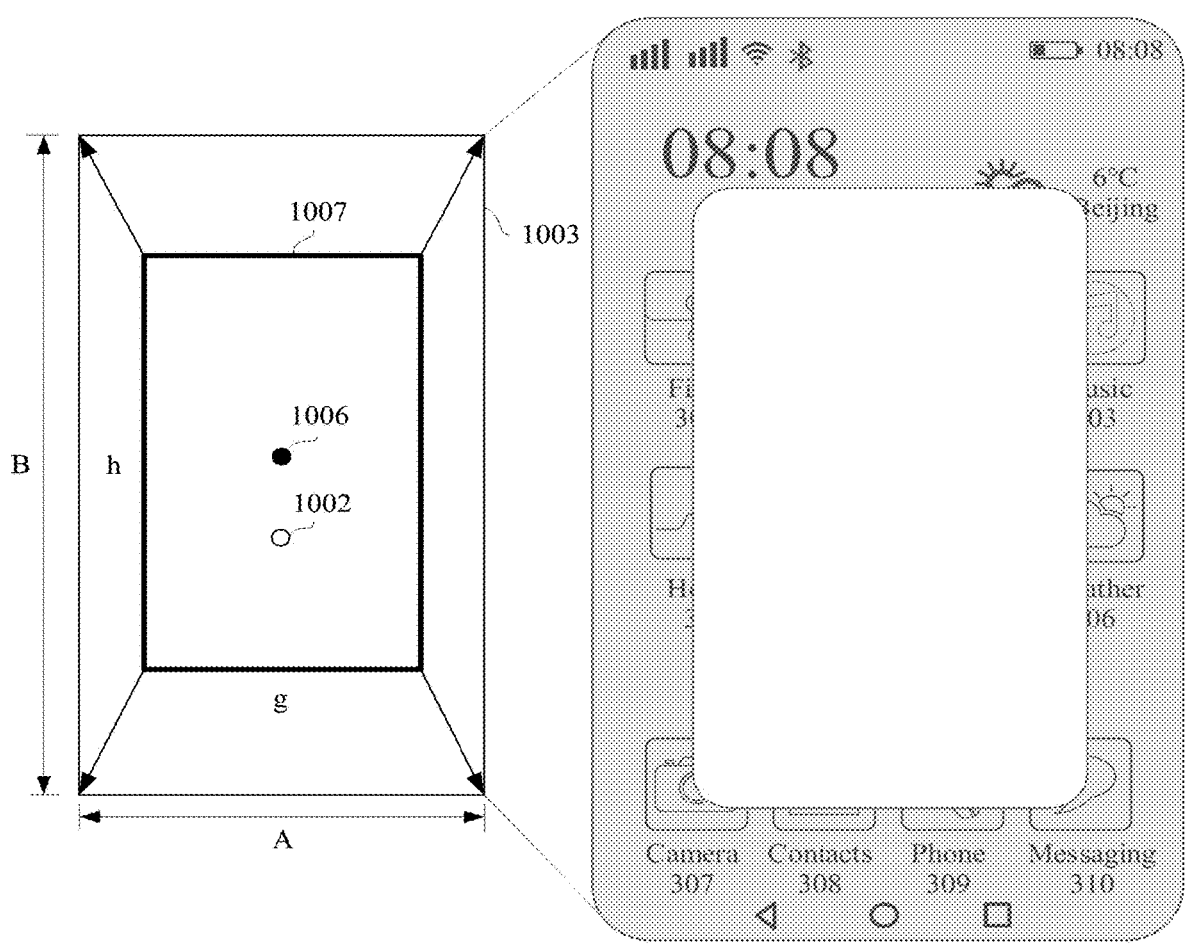

As shown in FIG. 1K, the size of the image frame 1005 gradually increases to the image frame 1007, and image content of the image frame 1007 may not show any element, or may show one or more elements. This is not limited herein in this disclosure. In addition, the center of the image frame 1007 is no longer at a same position as the center point 1002 of the icon of the application HUAWEI Video, but is at a same position as the center point of the display screen of the electronic device 100.

Figure 1L:
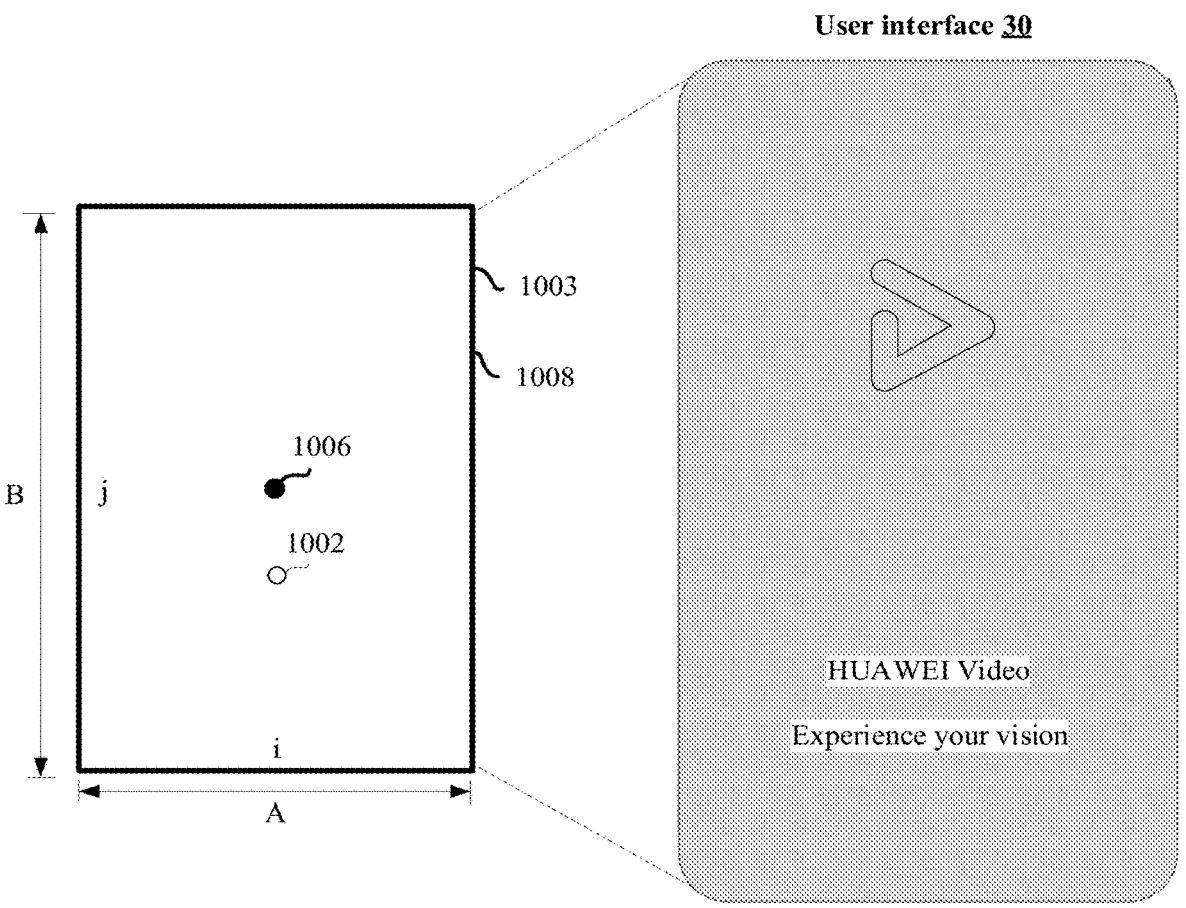

As shown in FIG. 1L, the size of the image frame 1007 gradually increases to the image frame 1008, and image content of the image frame 1008 may not show any element, or may show one or more elements. This is not limited herein in this disclosure. As shown in FIG. 1L, the image content of the image frame 1008 includes the icon of HUAWEI Video and text "HUAWEI Video" and "Experience your vision". In addition, the center of the image frame 1008 is no longer at a same position as the center point 1002 of the icon of the application HUAWEI Video, but is at a same position as the center point of the display screen of the electronic device 100.

Figure 1M:
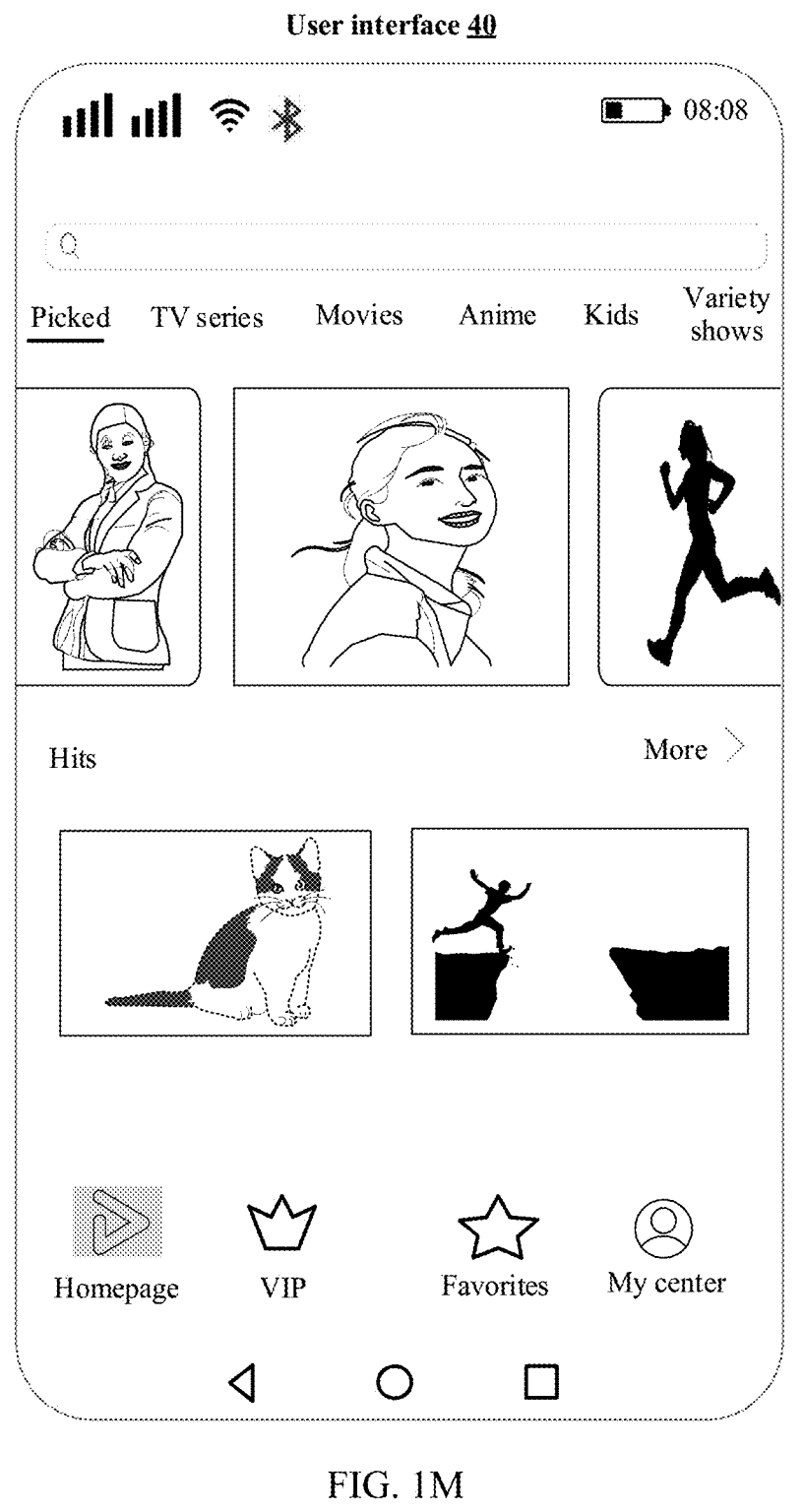

As shown in FIG. 1M, after the starting animation on the electronic device ends, the electronic device displays a main interface of the application HUAWEI Video. One or more video images are included in the main interface of the application HUAWEI Video. The video image may be a moving image or a still image. In addition, a bottom menu bar, a search box, a sub-channel entry, and the like may be further displayed in the main interface. This is not limited in this embodiment of this disclosure.

As shown in FIG. 2A to FIG. 2M, in some embodiments, in a starting animation, a center point of an image frame changes in real time, a size of each image frame gradually increases from a preset minimum size to a preset maximum size, and any border of the image frame is in contact with a border of an image frame of the preset maximum size.

Figure 2A:
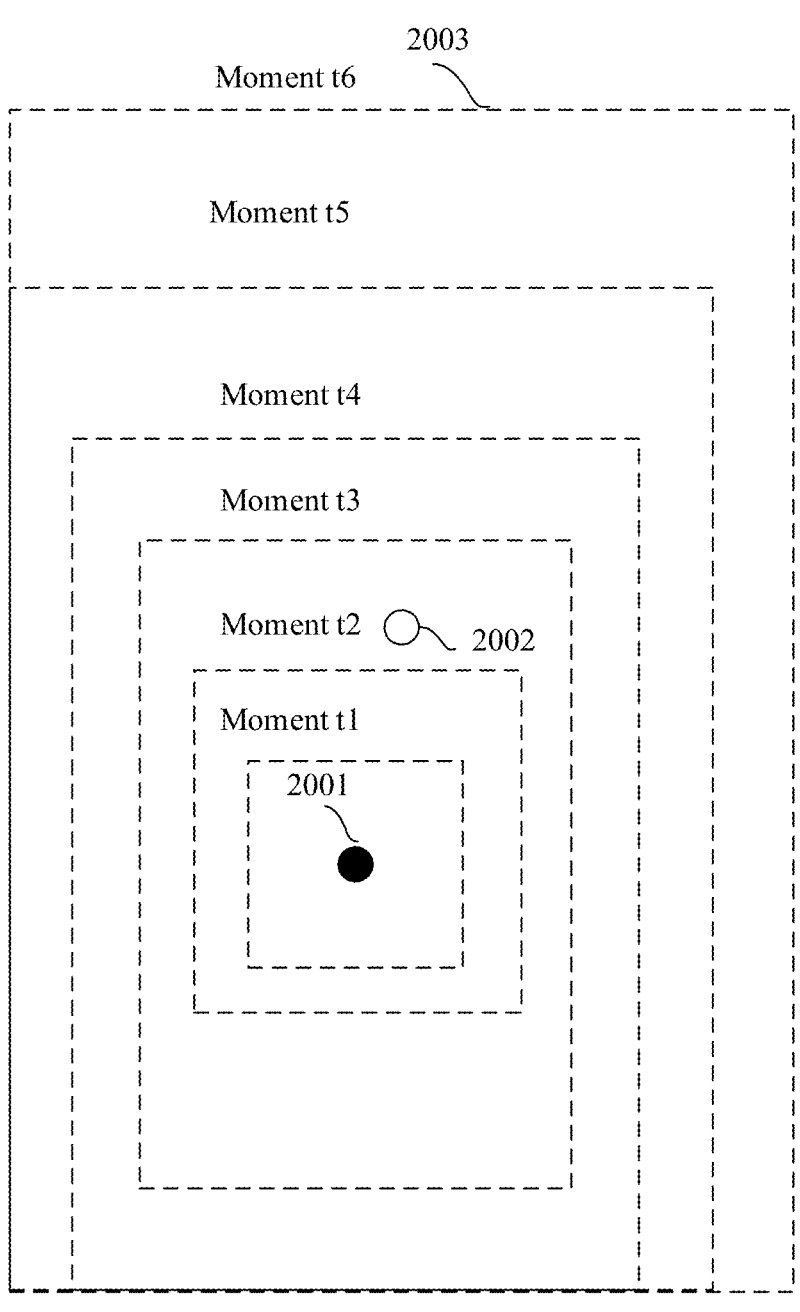

As shown in FIG. 2A, FIG. 2A is a schematic diagram of an example of a size change of an image frame in another starting animation.

For example, at a moment t1, an electronic device 100 receives and responds to an operation of a user of tapping an icon of an application, where a size of the icon of the application remains unchanged, and an original size of the icon of the application may be referred to as a preset minimum size. Then, at a moment t2, the size of the icon of the application gradually increases. At a moment t3, the size of the icon of the application no longer increases, and the electronic device 100 displays a rectangular box, where a size of the rectangular box is a size of the rectangular box shown at the moment t3. At a moment t4, the size of the rectangular box increases from that at the moment t3 to a size of the rectangular box at the moment t4, and one border (for example, a lower border) of the rectangular box at the moment t4 coincides with a border (for example, a lower border) of the rectangular box of a preset maximum size. At a moment t5, the size of the rectangular box increases from that at the moment t4 to a size of the rectangular box at the moment t5, and another border (for example, a left border) of the rectangular box at the moment t5 coincides with another border (for example, a left border) of the rectangular box of the preset maximum size. At a moment t6, the size of the rectangular box increases from that at the moment t5 to a size of the rectangular box at the moment t6, and the size of the rectangular box at the moment t6 is referred to as the preset maximum size.

As shown in FIG. 2B, in the starting animation, a size of the first image frame 2004 is the same as a size of an icon of an application, and a center point of the first image frame 2004 and a center point of the icon of the application are at a same position, that is, at a position 2001. The center point of the first image frame 2004 does not coincide with a center point 2002 of a display screen of the electronic device 100. The size of the first image frame 2004 is a minimum size (to be specific, a width is a, and a height is b). The first image frame 2004 may gradually increase from a preset minimum size to a preset maximum size of an image frame 2003, where the preset maximum size includes a width that is A and a length that is B.

As shown in FIG. 2C, in the starting animation, the first image frame 2004 gradually increases from the preset minimum size to an image frame 2005, and a center point of image frame 2005 and the center point of the icon of the application are at a same position, that is, at the position 2001. The center point of the image frame 2005 does not coincide with the center point 2002 of the display screen of the electronic device 100. A size of the image frame 2005 includes a width that is c and a height that is d. c is greater than a, and d is greater than b.

Figures 2D, 2E:
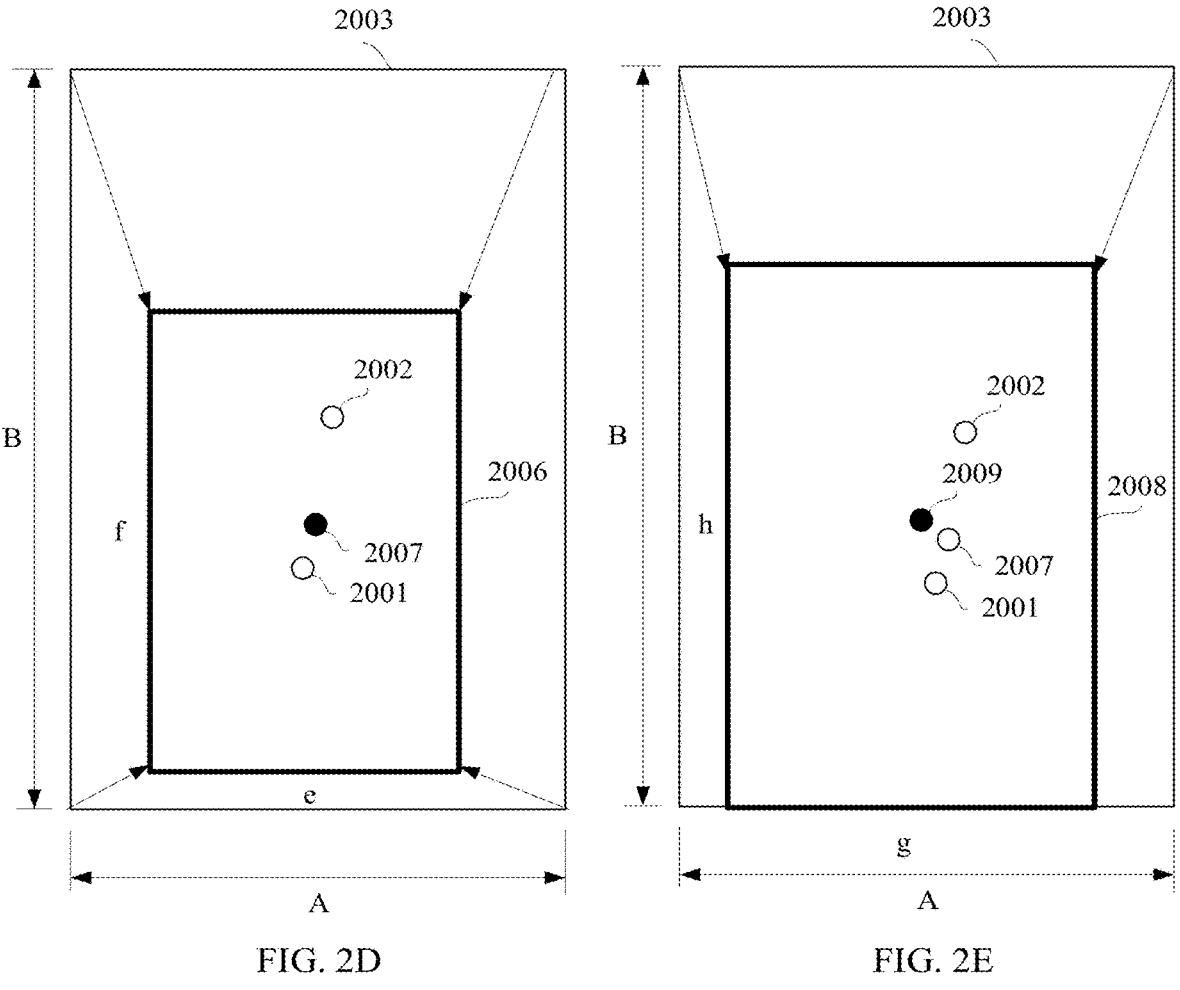

As shown in FIG. 2D, in the starting animation, the size of the image frame 2005 gradually increases to an image frame 2006, and a center point 2007 of the image frame 2006 is no longer at a same position as the center point 2001 of the icon of the application, and is not at a same position as the center point 2002 of an image frame 2003 either. A size of the image frame 2006 includes a width that is e and a height that is f. f is greater than d.

As shown in FIG. 2E, in the starting animation, the size of the image frame 2006 gradually increases to an image frame 2008, and any border (for example, a lower border) of the image frame 2008 coincides with a border (for example, a lower border) of the image frame 2003. In addition, a center point 2009 of the image frame 2008 is no longer at a same position as the center point 2001 of the icon of the application, is not at a same position as the center point 2007 of the image frame 2006 either, and is not at a same position as the center point 2002 of the image frame 2003 either. A size of the image frame 2008 includes a width that is g and a height that is h. g is greater than e, and h is greater than f.

As shown in FIG. 2F, in the starting animation, the size of the image frame 2008 gradually increases to an image frame 2010, and any border (for example, a lower border) of the image frame 2010 coincides with a border (for example, a lower border) of the image frame 2003. In addition, any other border (for example, a left border) of the image frame 2010 coincides with another border (for example, a left border) of the image frame 2003. In addition, a center point 2011 of the image frame 2010 is no longer at a same position as the center point 2001 of the icon of the application, is not at a same position as the center point 2007 of the image frame 2006 either, is not at a same position as the center point 2009 of the image frame 2008 either, and is not at a same position as the center point 2002 of the image frame 2003 either. A size of the image frame 2010 includes a width that is i and a height that is j. i is greater than g, and j is greater than h.

As shown in FIG. 2G, in the starting animation, the size of the image frame 2010 gradually increases to an image frame 2012, and all borders of the image frame 2012 coincide with all borders of the image frame 2003. In addition, a center point 2013 of the image frame 2012 is not at a same position as the center point 2001 of the icon of the application, is not at a same position as the center point 2007 of the image frame 2006 either, is not at a same position as the center point 2009 of the image frame 2008 either, and is not at a same position as the center point 2011 of the image frame 2010 either, but is at a same position as the center point 2002 of the image frame 2003. A size of the image frame 2012 includes a width that is k and a height that is 1. k is greater than i, and 1 is greater than j. k is equal to A, and j is equal to B.

When the application is started, the electronic device 100 may play the starting animation in a starting phase of the application. The starting animation includes a plurality of image frames, and display positions and sizes of each of the image frames may be different. The electronic device 100 sequentially displays the plurality of image frames in order.

For example, as shown in FIG. 1G, FIG. 1G shows an example of a user interface 10 on the electronic device 100. Icons of some applications may be included in the user interface 10. For example, there are an icon 1009 of Files, an icon 1010 of Email, an icon 1011 of Music, an icon 1012 of Health, an icon 1013 of HUAWEI Video, an icon 1014 of Weather, an icon 1015 of Camera, an icon 1016 of Contacts, an icon 1017 of Phone, and an icon 1018 of Messaging. In some embodiments, icons of more or fewer applications may be included in the user interface 10. In some embodiments, icons of applications that are different from the applications shown in FIG. 1G may be included in the user interface 10. This is not limited herein.

The electronic device 100 may receive and respond to a user operation (for example, tapping) on the icon 1013 of HUAWEI Video in the user interface 10, and the application HUAWEI Video is started.

Figure 2H:
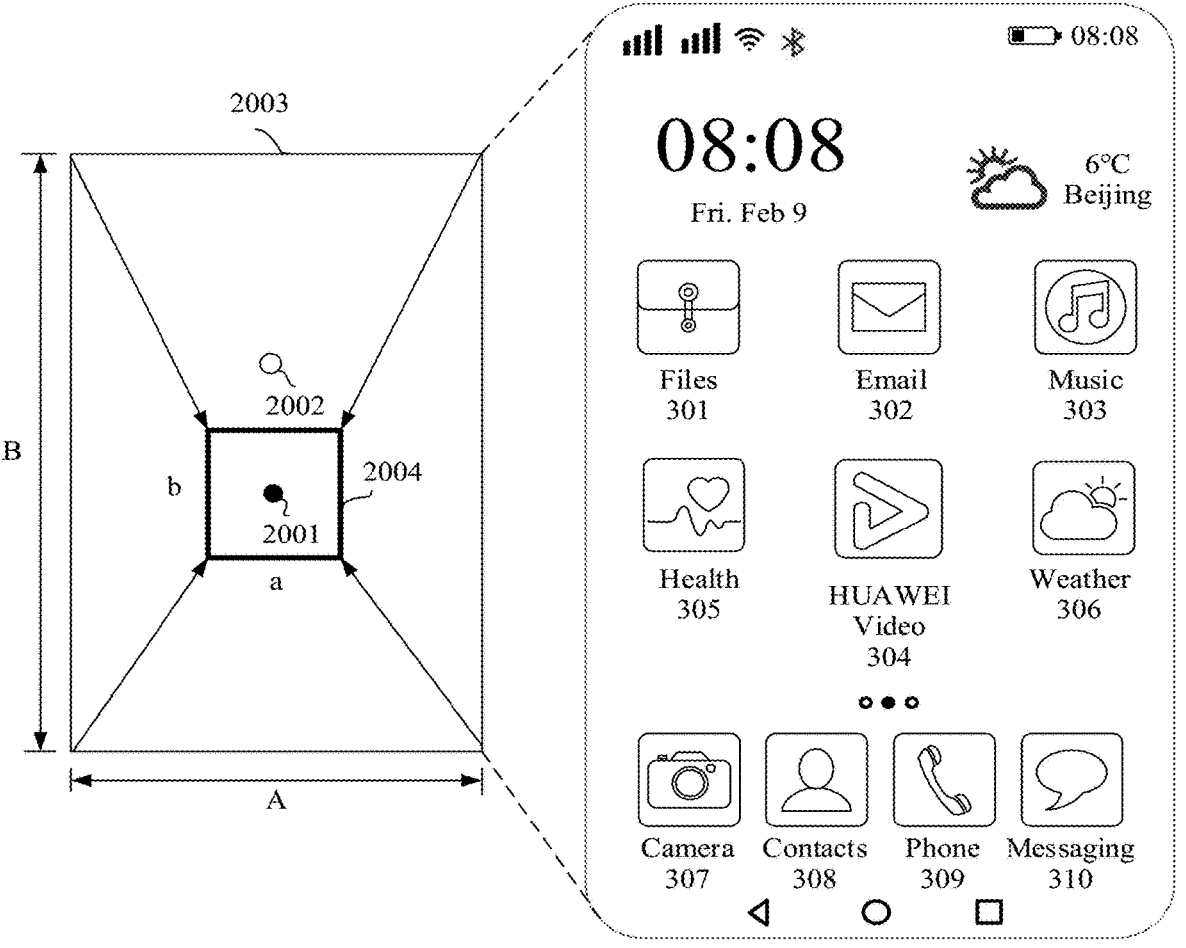

As shown in FIG. 2H, image content of the first image frame 2004 is the same as image content of the icon of the application HUAWEI Video. The size of the first image frame 2004 is the same as a size of the icon of the application HUAWEI Video, and the center point 2001 of the first image frame 2004 and a center point of the icon of the application HUAWEI Video are at a same position.

Figure 2I:
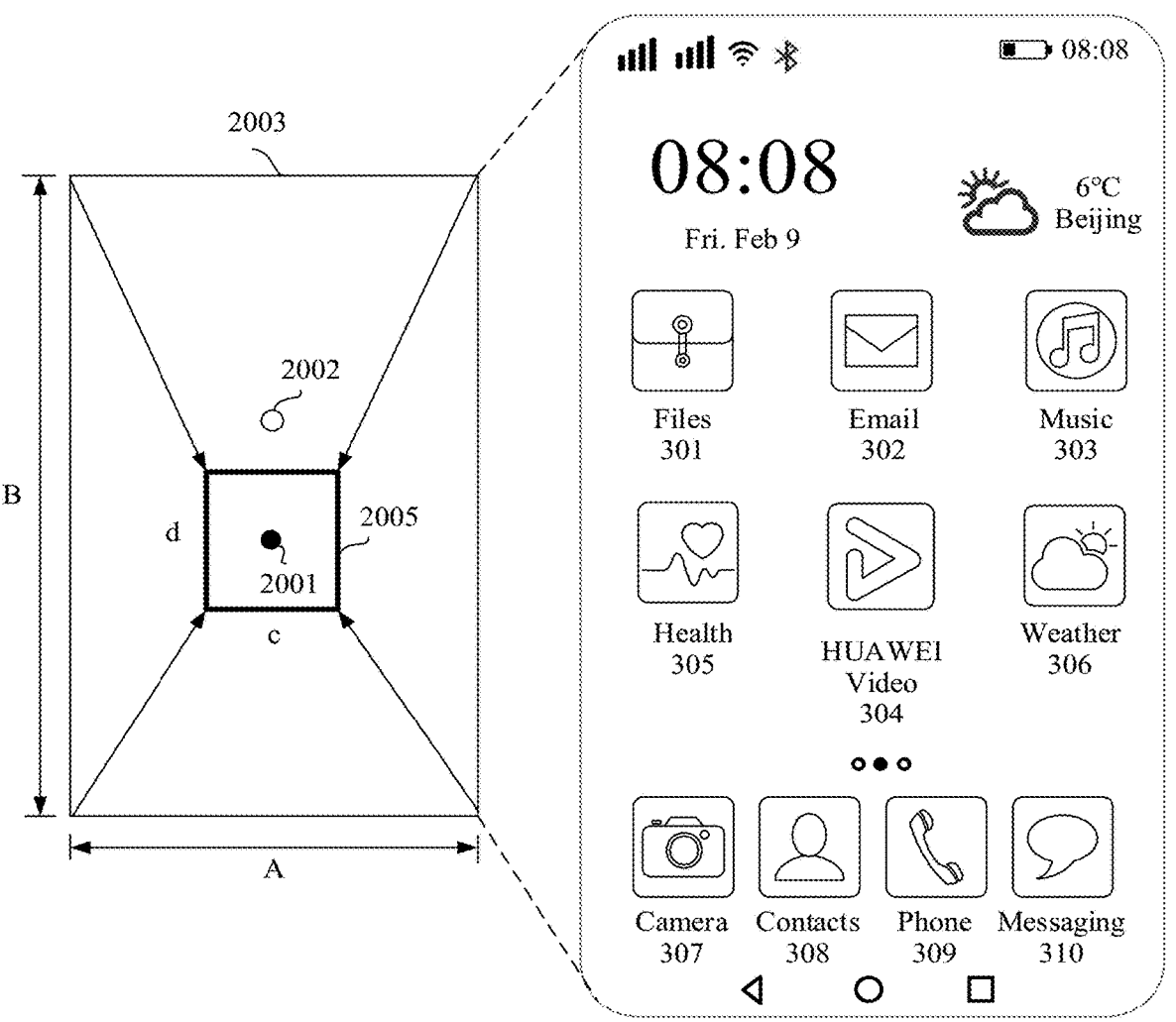

As shown in FIG. 2I, the first image frame 2004 gradually increases from the preset minimum size to the image frame 2005. Image content of the image frame 2005 is the same as the image content of the icon of the application HUAWEI Video, and the center point of the image frame 2005 is at a same position as the center point 2001 of the icon of the application HUAWEI Video, but is not at a same position as the center point 2002 of the display screen of the electronic device 100.

Figure 2J:
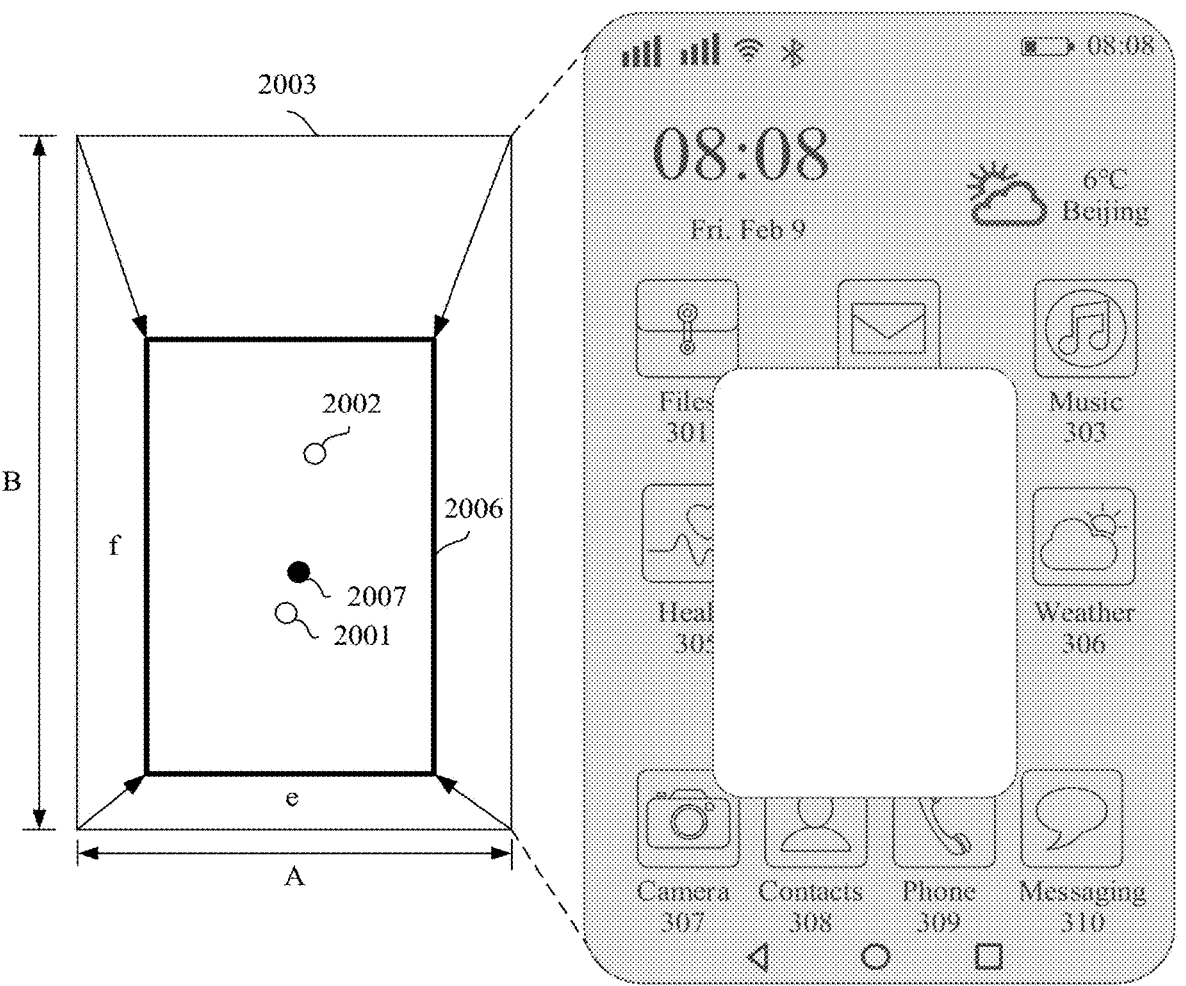

As shown in FIG. 2J, the size of the image frame 2005 gradually increases to the image frame 2006, and image content of the image frame 2006 may not show any element, or may show one or more elements. This is not limited herein in this disclosure. In addition, the center point 2007 of the image frame 2006 is no longer at a same position as the center point 2001 of the icon of the application HUAWEI Video, and is not at a same position as the center point 2002 of the display screen of the electronic device 100 either.

Figure 2K:
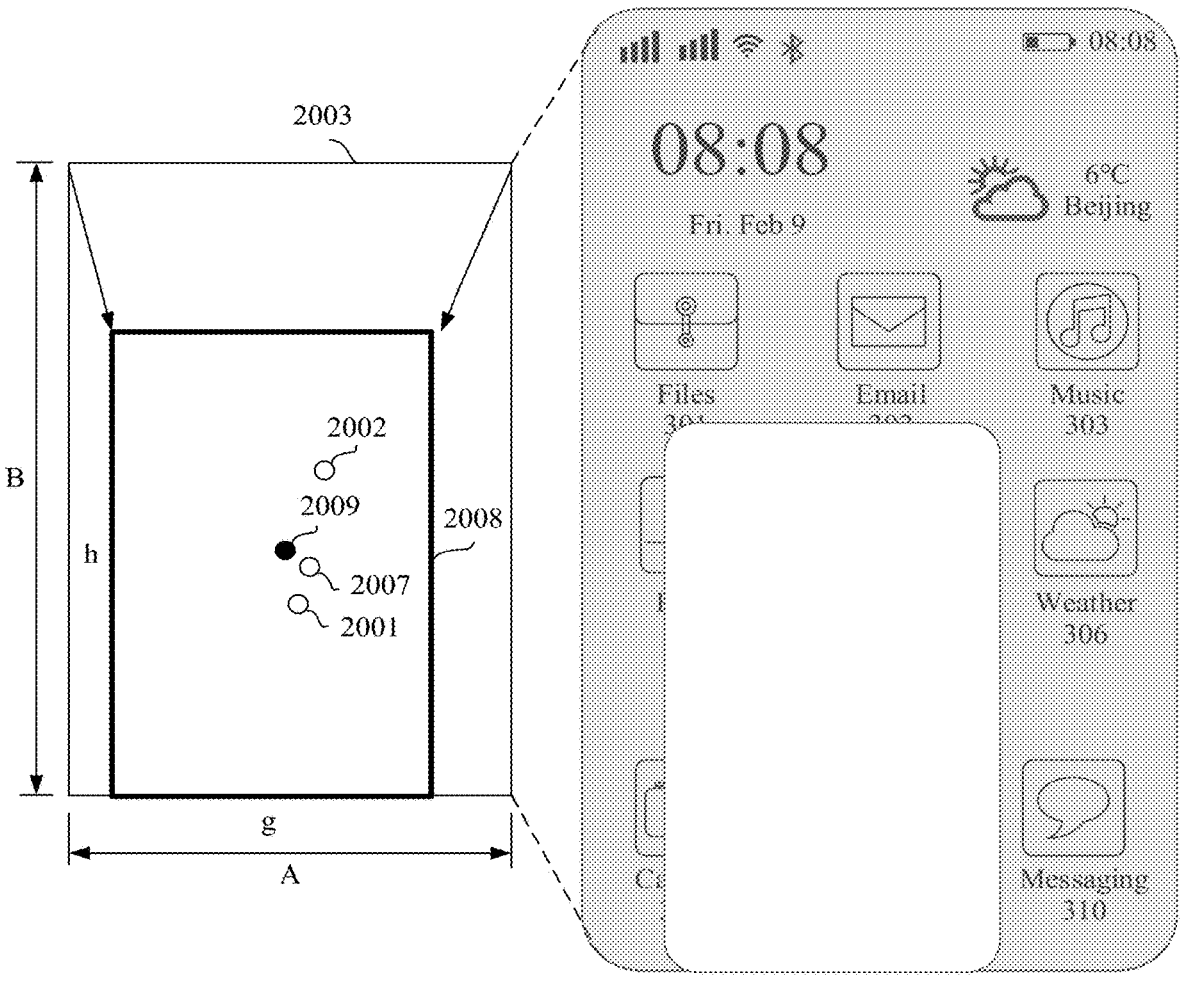

As shown in FIG. 2K, the size of the image frame 2006 gradually increases to the image frame 2008, and one border (for example, the lower border) of the image frame 2008 coincides with a border (for example, a lower border) of the display screen of the electronic device 100. Image content of the image frame 2008 may not show any element, or may show one or more elements. This is not limited herein in this disclosure. In addition, the center point 2009 of the image frame 2008 is no longer at a same position as the center point 2001 of the icon of the application HUAWEI Video, is not at a same position as the center point 2007 of the image frame 2006, and is not at a same position as the center point 2002 of the display screen of the electronic device 100 either.

Figure 2L:
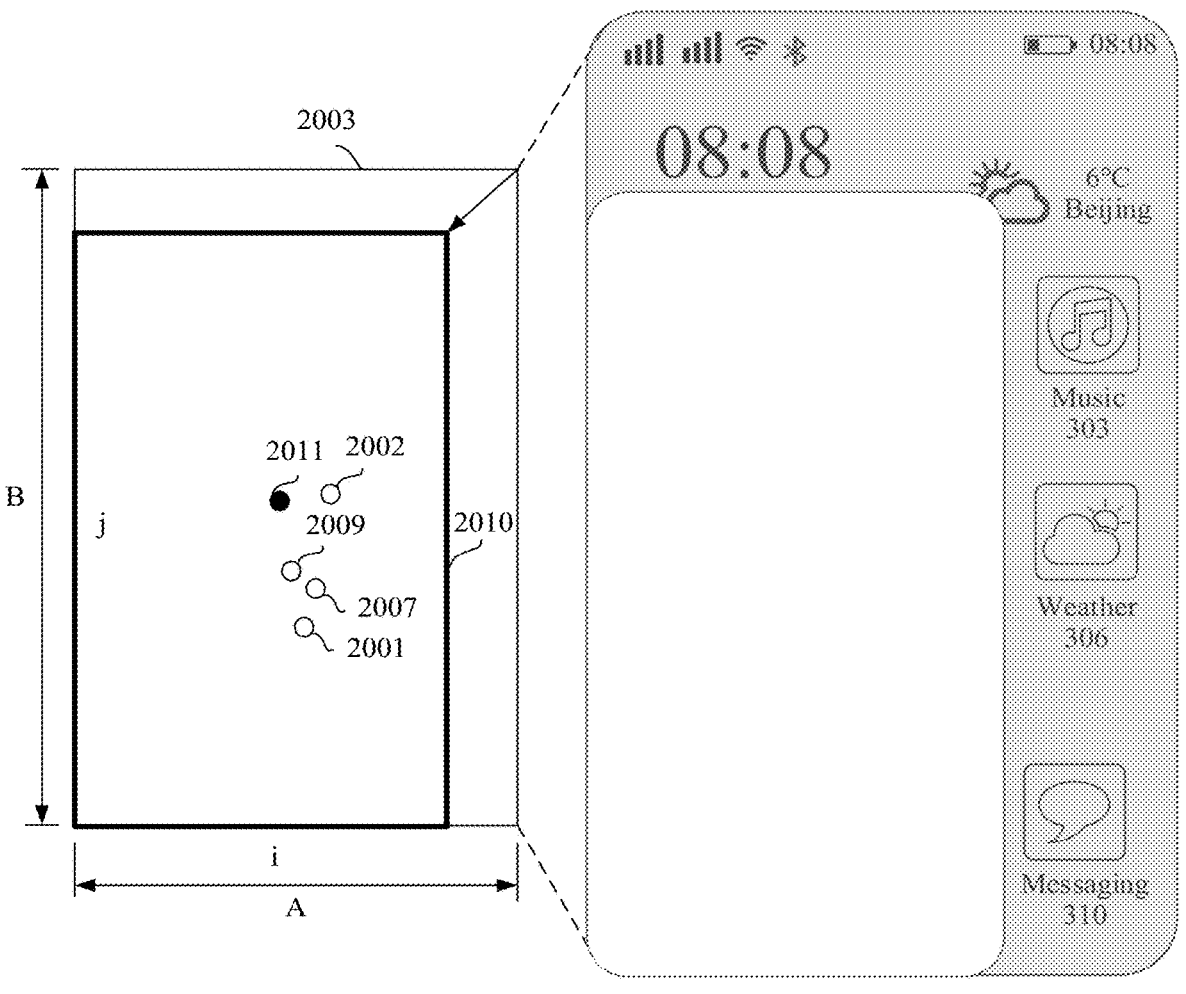

As shown in FIG. 2L, the size of the image frame 2008 gradually increases to the image frame 2010, and another border (for example, the left border) of the image frame 2010 coincide s with another border (for example, a left border) of the display screen of the electronic device 100. Image content of the image frame 2010 may not show any element, or may show one or more elements. This is not limited herein in this disclosure. In addition, the center point 2011 of the image frame 2010 is no longer at a same position as the center point 2001 of the icon of the application HUAWEI Video, is not at a same position as the center point 2007 of the image frame 2006, is not at a same position as the center point 2009 of the image frame 2008, and is not at a same position as the center point 2002 of the display screen of the electronic device 100 either.

Figure 2M:
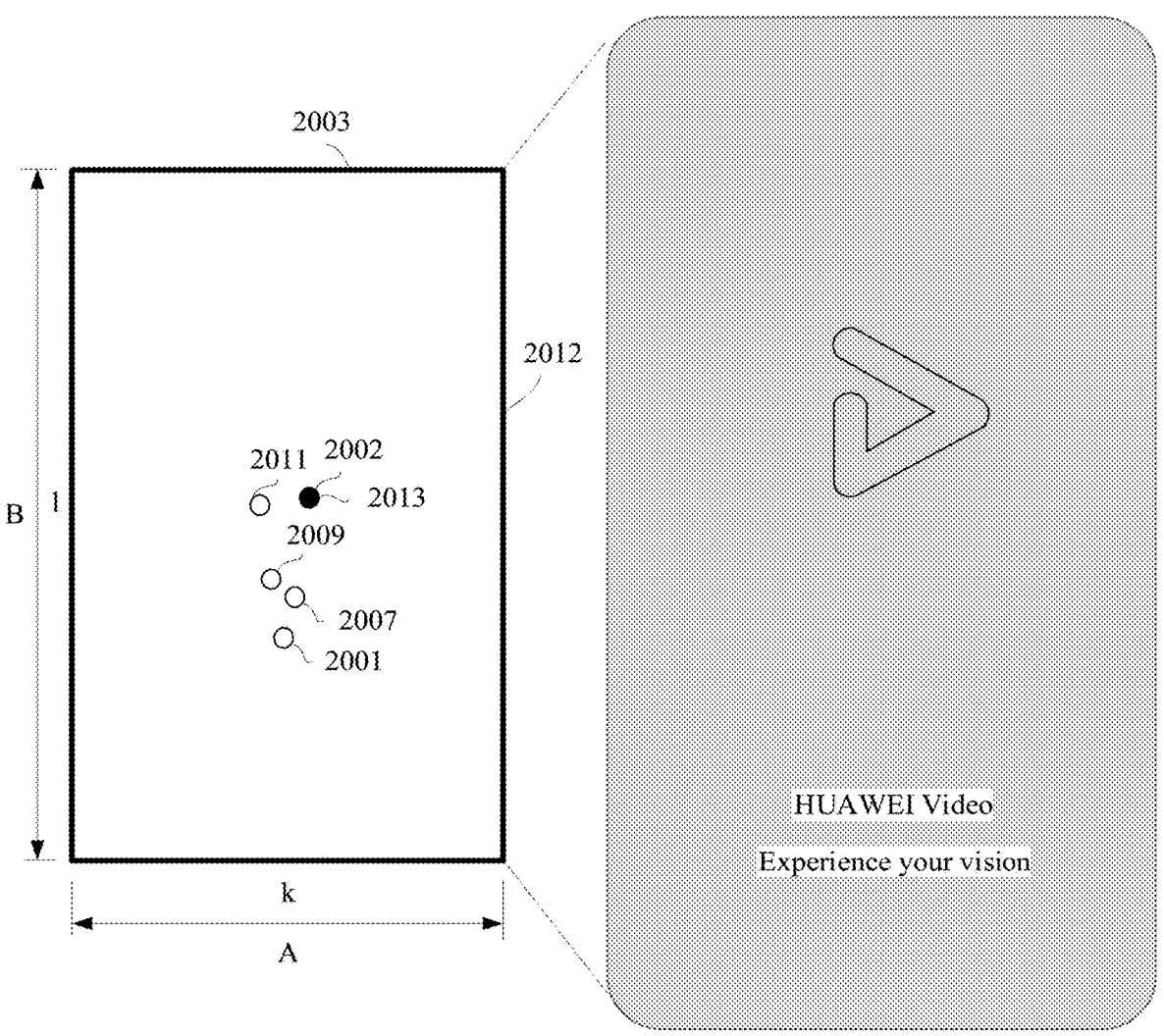

As shown in FIG. 2M, the size of the image frame 2010 gradually increases to the image frame 2012, and all borders of the image frame 2012 coincide with all borders of the display screen of the electronic device 100. Image content of the image frame 2012 may not show any element, or may show one or more elements. This is not limited herein in this disclosure. As shown in FIG. 2M, the image content of the image frame 2012 includes the icon of HUAWEI Video and text "HUAWEI Video" and "Experience your vision". In addition, the center point 2013 of the image frame 2012 is no longer at a same position as the center point 2001 of the icon of the application HUAWEI Video, is not at a same position as the center point 2007 of the image frame 2006, is not at a same position as the center point 2009 of the image frame 2008, is not at a same position as the center point 2011 of the image frame 2010, and is at a same position as the center point 2002 of the display screen of the electronic device 100.

As shown in FIG. 3A to FIG. 3E, in some embodiments, in a starting animation, a size of each image frame is fixed, and a center point of each image frame moves on a preset trajectory. A shape of each image frame may be a circle, or may be a rectangle. This is not limited herein in this disclosure.

An electronic device 100 receives and responds to an operation of a user of tapping an icon of an application, and a size of the icon of the application gradually increases. After the size of the icon of the application increases to a preset size, the size of the icon of the application stops changing. An image frame is displayed in a user interface on the electronic device 100 in a floating manner, and the image frame may move on the preset trajectory. Further, for a UI diagram in which an icon of an application changes, refer to the embodiments of FIG. 1G to FIG. 1I. Details are not described herein again in this disclosure. For a UI diagram in which an image frame moves on the preset trajectory, refer to the following embodiments of FIG. 3A to FIG. 3E.

Figure 3A:
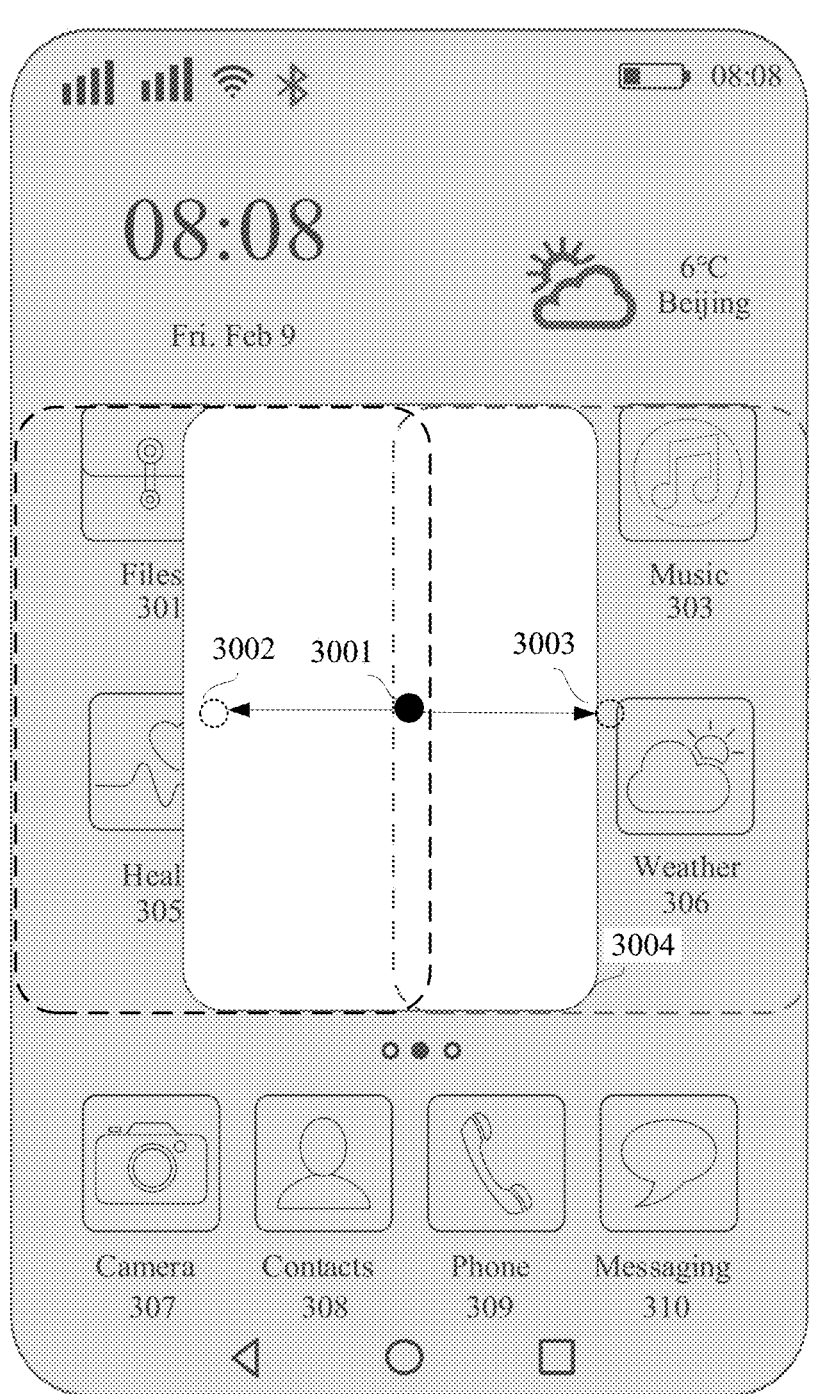
FIG. 3A to FIG. 3E are UI diagrams of another set of starting animations according to an embodiment of this disclosure.

For example, as shown in FIG. 3A, a center point 3001 of an image frame 3004 may move left and right between a position 3002 and a position 3003 on a straight trajectory. When the center point 3001 of the image frame 3004 is at the position 3002, a left border of the image frame 3004 may coincide with a left border of a display screen of the electronic device 100. When the center point 3001 of the image frame 3004 is at the position 3003, a right border of the image frame 3004 may coincide with a right border of the display screen of the electronic device 100. Image content of the image frame 3004 may include one or more elements, or may not include any element. This is not limited herein in this disclosure.

Figure 3B:
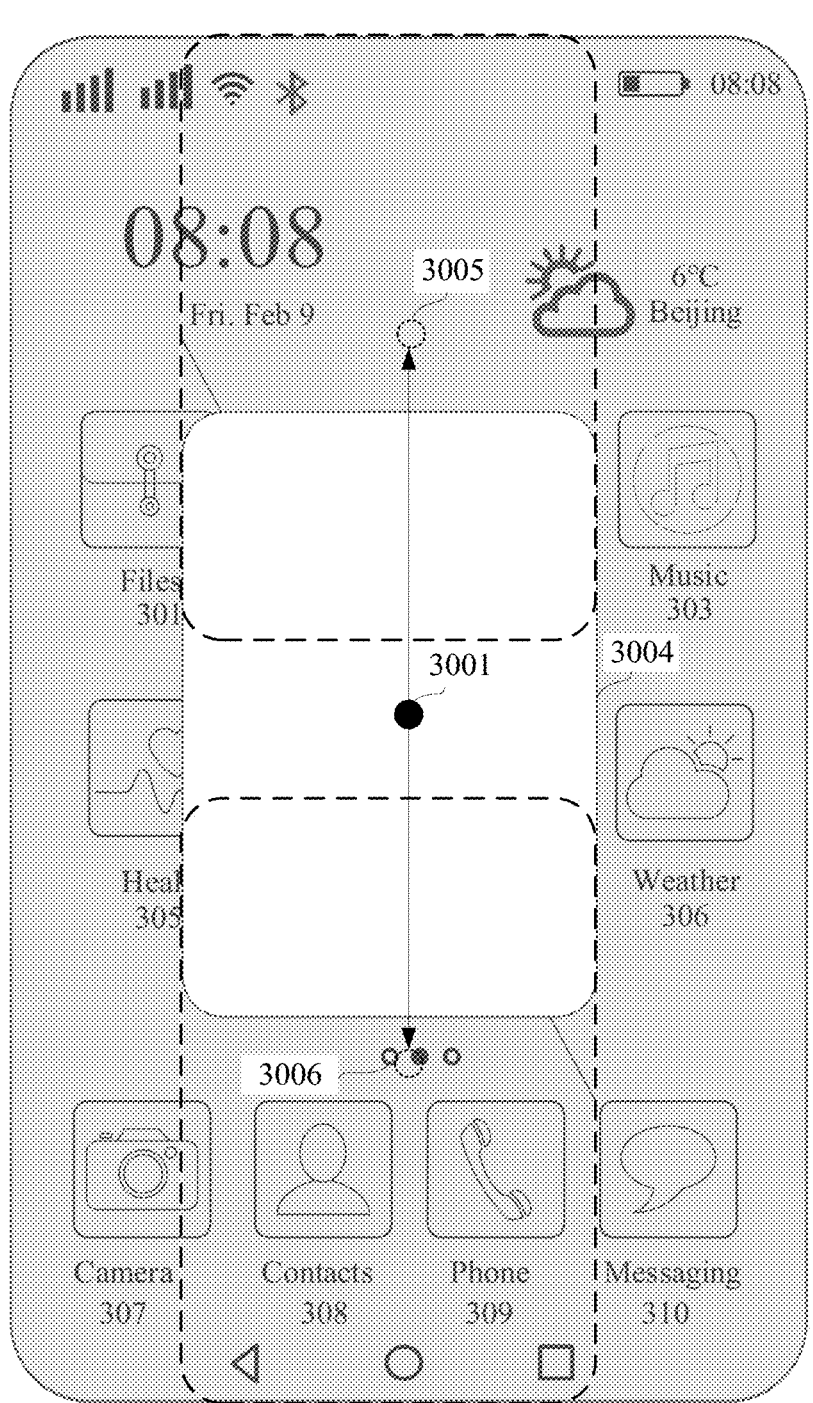

For example, as shown in FIG. 3B, the center point 3001 of the image frame 3004 may move up and down between a position 3005 and a position 3006 on a straight trajectory. When the center point 3001 of the image frame 3004 is at the position 3005, an upper border of the image frame 3004 may coincide with an upper border of the display screen of the electronic device 100. When the center point 3001 of the image frame 3004 is at the position 3006, a lower border of the image frame 3004 may coincide with a lower border of the display screen of the electronic device 100. Image content of the image frame 3004 may include one or more elements, or may not include any element. This is not limited herein in this disclosure.

Figure 3C:
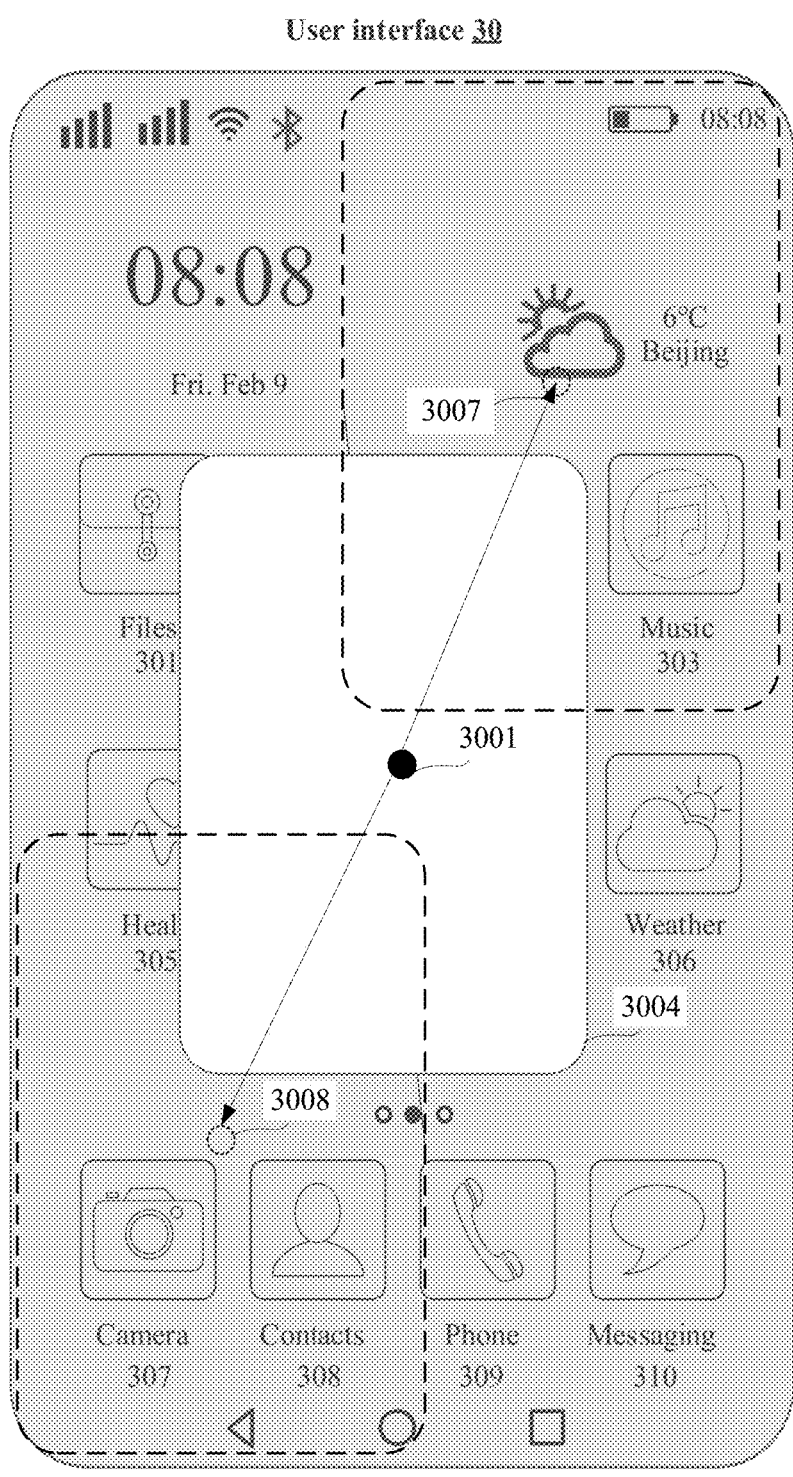

For example, as shown in FIG. 3C, the center point 3001 of the image frame 3004 may move toward upper right or lower left between a position 3007 and a position 3008 on a straight trajectory. When the center point 3001 of the image frame 3004 is at the position 3007, the upper border of the image frame 3004 may coincide with the upper border of the display screen of the electronic device 100, and the right border of the image frame 3004 may coincide with the right border of the display screen of the electronic device 100. When the center point 3001 of the image frame 3004 is at the position 3008, the lower border of the image frame 3004 may coincide with the lower border of the display screen of the electronic device 100, and the left border of the image frame 3004 may coincide with the left border of the display screen of the electronic device 100. Image content of the image frame 3004 may include one or more elements, or may not include any element. This is not limited herein in this disclosure.

Figure 3D:
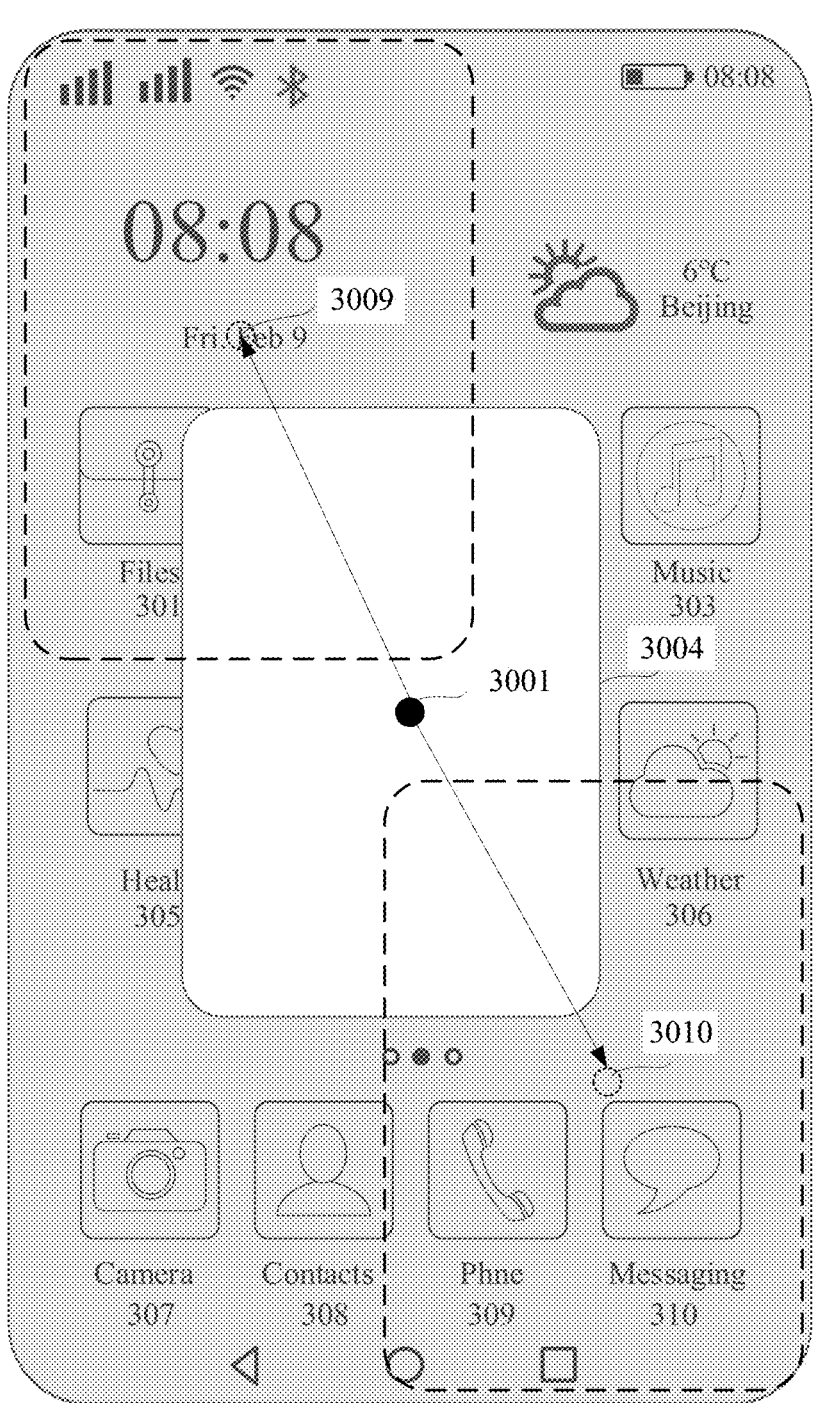

For example, as shown in FIG. 3D, the center point 3001 of the image frame 3004 may move toward upper left or lower right between a position 3009 and a position 3010 on a straight trajectory. When the center point 3001 of the image frame 3004 is at the position 3009, the upper border of the image frame 3004 may coincide with the upper border of the display screen of the electronic device 100, and the left border of the image frame 3004 may coincide with the left border of the display screen of the electronic device 100. When the center point 3001 of the image frame 3004 is at the position 3010, the lower border of the image frame 3004 may coincide with the lower border of the display screen of the electronic device 100, and the right border of the image frame 3004 may coincide with the right border of the display screen of the electronic device 100. Image content of the image frame 3004 may include one or more elements, or may not include any element. This is not limited herein in this disclosure.

Figure 3E:
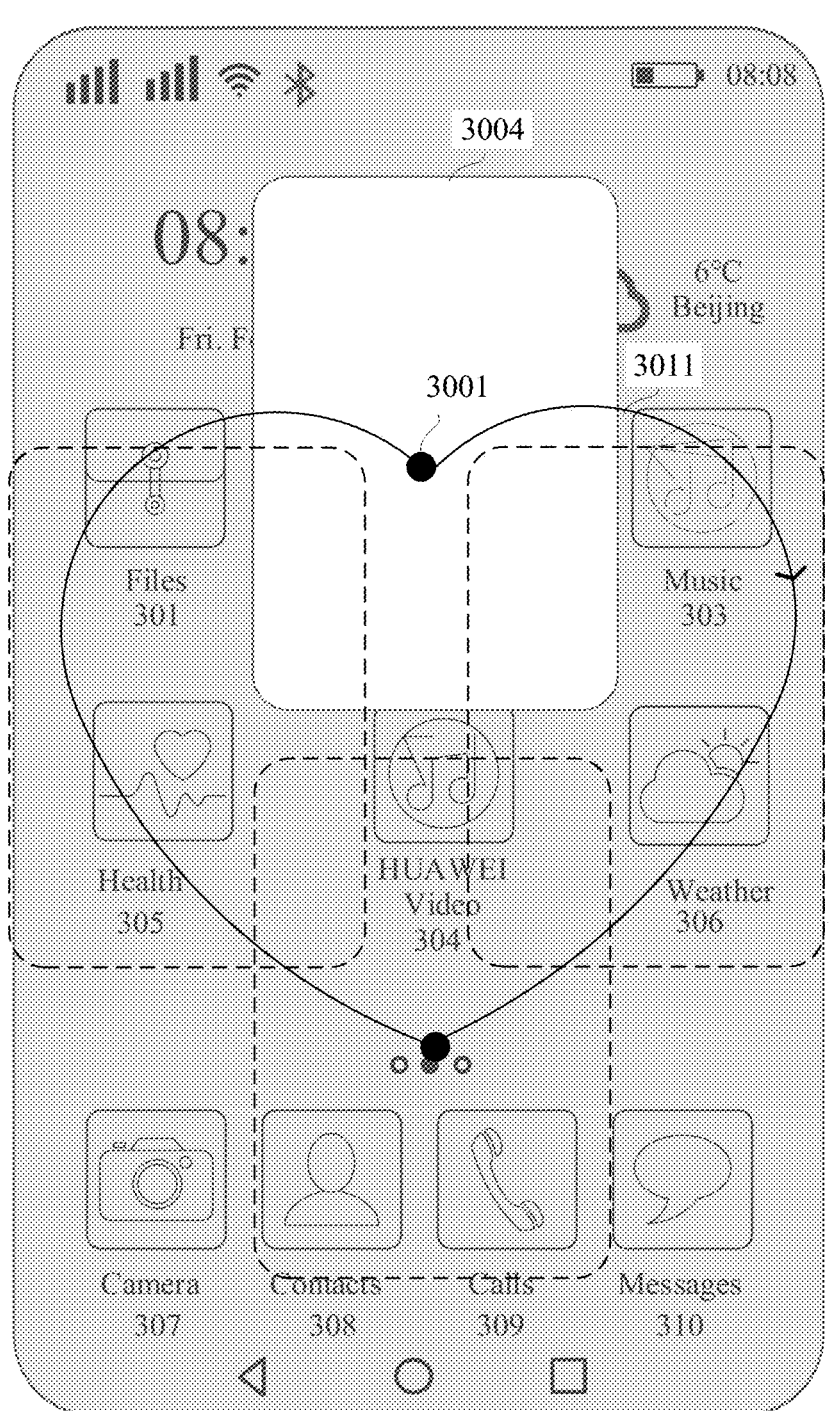

As shown in FIG. 3E, a motion trajectory 3011 of the center point 3001 of the image frame 3004 may be heart-shaped, and the image frame 3004 may move clockwise or counter-clockwise on the motion trajectory 3011.

It should be noted that a motion trajectory of the center point 3001 of the image frame 3004 on the electronic device 100 is not limited to the foregoing shape, and may further be another shape, for example, a circle, a horizontal "8" curve shape, a Bezier curve shape, or a circular curve shape. This is not limited herein in this disclosure.

(2) Exiting Animation:

After an electronic device 100 receives an operation of a user for starting an application, a phase from when the electronic device 100 receives an operation of the user for exiting the application to when the electronic device 100 displays a main interface is referred to as an exiting phase of the application, and time spent in the exiting phase is referred to as exiting time. Because the exiting time of the application is relatively long, to bring better user experience to the user, the electronic device 100 plays an exiting animation in the exiting phase of the application. The exiting animation may be that N image frames are displayed in the user interface on the electronic device 100 in a floating manner in a predetermined order based on a preset window size, preset display time, a preset display position, preset transparency, a preset display element, and the like.

In some embodiments, when the application already displays the main interface of the application, the electronic device 100 receives the operation of the user for exiting the application. In this case, in the exiting animation, a size of each image frame gradually decreases from a preset maximum size to a preset minimum size. The preset maximum size may be the same as a size of a display screen of the electronic device 100, and the preset minimum size may be the same as a size of an icon of an application.

Further, in a possible implementation, in the exiting animation, an order of displaying image frames may be FIG. 1L, FIG. 1K, FIG. 1J, FIG. 1I, and FIG. 1H displayed in order.

In another possible implementation, in the exiting animation, an order of displaying image frames may be FIG. 2M, FIG. 2L, FIG. 2K, FIG. 2J, FIG. 2I, and FIG. 2H displayed in order.

In the exiting animation, image frames may alternatively be sequentially displayed according to another rule. This is not limited herein in this disclosure.

In some other embodiments, when the application is already started, before the main interface of the application is displayed, the electronic device 100 receives the operation of the user for exiting the application. It is assumed that a starting animation of the application includes M image frames, and the exiting animation also includes M image frames. When the starting animation is played to an $N^{th}$ frame, where N is less than M, the electronic device 100 may play the exiting animation in the following two implementations.

Manner 1:

When the starting animation is played to the $N^{th}$ frame, where N is less than M, the electronic device 100 receives the operation of the user for exiting the application, and the electronic device 100 starts the exiting animation and stops playing an image frame in the starting animation. Further, the electronic device 100 starts to play from an $M^{th}$ frame in the exiting animation and continues to play until the first image frame in the exiting animation.

It should be noted that the starting animation includes the M image frames, and a play order of the starting animation is the first image frame, the second image frame, . . . , the $N^{th}$ image frame, . . . , and an $M^{th}$ image frame.

The exiting animation includes the M image frames, and a play order of the exiting animation is the M$^{th}$ image frame, the (M−1)$^{th}$ image frame, . . . , an N$^{th}$ image frame, . . . , and the first image frame.

For example, if a starting animation of an application includes 30 image frames, an exiting animation also includes 30 image frames. After the application is started, the starting animation of the application is played to the eighth frame. Image frames that have been played on the electronic device 100 are the first image frame to the eighth image frame, and the first image frame to the eighth image frame may be UI diagrams shown in FIG. 1H to FIG. 1K. It can be understood that some accompanying drawings are omitted in FIG. 1H to FIG. 1K.

Figure 4A:
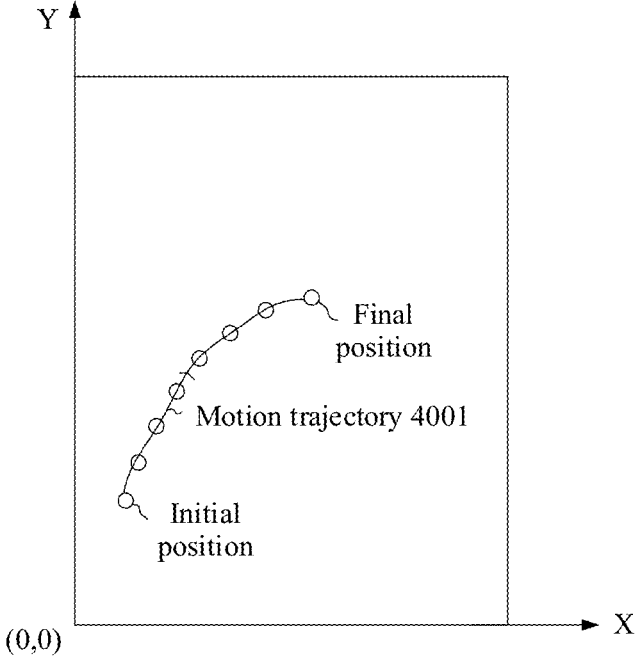
FIG. 4A and FIG. 4B are schematic diagrams of motion trajectories of a center point of an image frame in a set of animations according to an embodiment of this disclosure.

For example, as shown in FIG. 4A, FIG. 4A is a schematic diagram of an example of a motion trajectory of a center point of each image frame when the starting animation is played from the first frame to the eighth frame.

When the starting animation is played to the eighth frame, the electronic device 100 receives the operation of the user for exiting the application. In this case, the electronic device 100 starts the exiting animation, and the electronic device 100 starts to play from the eighth image frame in the exiting animation and continues to play until the first image frame in the exiting animation. The eighth image frame to the first image frame may be UI diagrams shown in FIG. 1K to FIG. 1H. It can be understood that some accompanying drawings are omitted in FIG. 1K to FIG. 1H.

It should be noted that image information of each image frame in the exiting animation may be the same as or different from image information of each image frame in the starting animation. This is not limited herein in this disclosure. The image information includes, but is not limited to, a size of the image frame, a display element of the image frame, transparency of the image frame, display time of the image frame, rounded corner information of the image frame, and the like.

As shown in FIG. 4A, a direction to the right of a lower border of a page display area on an electronic device 100 is used as a positive direction of an X-axis, an upward direction of a left border of the page display area on the electronic device 100 is used as a positive direction of a Y-axis, and an intersection point of the X-axis and the Y-axis is used as an origin to establish a rectangular coordinate system.

First, an initial position is a center point of the first image frame in the starting animation, and the center point of the first image frame is an initial position of the motion trajectory of the center point of each image frame in the starting animation. Then, center points of all image frames in the starting animation move in a direction of a motion trajectory 4001 sequentially. When a center point of the eighth image frame in the starting animation moves to a final position of the motion trajectory, the electronic device 100 receives the operation of the user for exiting the application, and the electronic device 100 performs the exiting animation.

Figure 4B:
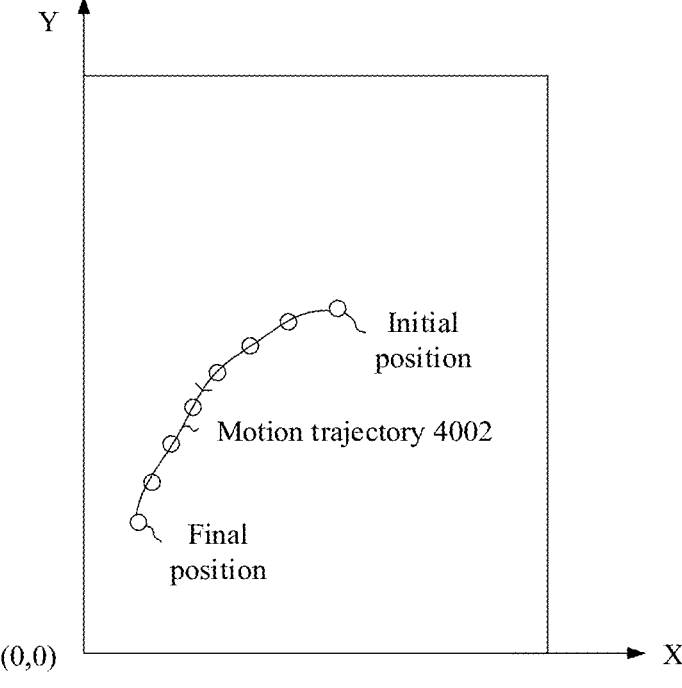

As shown in FIG. 4B, an initial position is a center point of the eighth image frame in the starting animation, and the electronic device 100 starts the exiting animation and plays the exiting animation from the eighth image frame to the first image frame sequentially. It can be understood that a center point of the eighth image frame in the exiting animation coincides with the center point of the eighth image frame in the starting animation. The center point of the eighth image frame in the exiting animation is an initial position of a motion trajectory of a center point of each image frame in the exiting animation. Then, center points of all image frames in the exiting animation move in a direction of a motion trajectory 4002 sequentially. When the center point of the first image frame in the starting animation moves to a final position of the motion trajectory, the electronic device 100 exits the application and displays a main interface.

It should be noted that the motion trajectory 4001 and the motion trajectory 4002 may be the same, or may be different. This is not limited herein in this disclosure.

Manner 2:

When the starting animation is played to the N$^{th}$ frame, where N is less than M, the electronic device 100 receives the operation of the user for exiting the application, and the electronic device 100 starts the exiting animation, but the electronic device 100 does not stop playing an image frame in the starting animation. The electronic device 100 correspondingly superimposes an (N+1)$^{th}$ image frame to an M$^{th}$ image frame in the starting animation and the first image frame to an (M−N)$^{th}$ image frame in the exiting animation respectively to obtain M−N new image frames. The electronic device 100 plays the M−N new image frames and an (M−N+1)$^{th}$ image frame to an M$^{th}$ image frame in the exiting animation.

For example, if a starting animation of an application includes 30 image frames, an exiting animation also includes 30 image frames. After the application is started, the starting animation of the application is played to the eighth frame. Image frames that have been played on the electronic device 100 are the first image frame to the eighth image frame, and the first image frame to the eighth image frame may be UI diagrams shown in FIG. 1H to FIG. 1K. It can be understood that some accompanying drawings are omitted in FIG. 1H to FIG. 1K.

Then, the electronic device 100 performs superimposition calculation on the ninth image frame to the 30$^{th}$ image frame in the starting animation and the first image frame to the 22$^{nd}$ image frame in the exiting animation respectively to obtain 21 new image frames. The electronic device 100 plays the 21 new image frames and the 23$^{rd}$ image frame to the 30$^{th}$ image frame in the exiting animation sequentially.

2. Animation Calculation:

The animation calculation includes starting animation calculation and exiting animation calculation.

When playing a starting animation, the electronic device 100 needs to calculate parameter information, for example, a window size, display time, a display position, transparency, and a display element, of each image frame in the starting animation, and obtain an image frame through composition based on the parameter information of each image frame. Herein, the information, for example, the window size, the display time, the display position, the transparency, and the display element, of each image frame in the starting animation is referred to as the parameter information of the image frame. The parameter information of the image frame may further include more other information. This is not limited herein in this disclosure.

In addition, when playing an exiting animation, the electronic device 100 further needs to calculate information, for example, a window size, display time, a display position, transparency, and a display element, of each image frame in the exiting animation, and obtain an image frame through composition based on the parameter information of each image frame.

It can be understood that, the window size of each image frame includes values of a length and a width of the image frame, the display time of each image frame is time during which the image frame is displayed in a user interface on the electronic device 100 in a floating manner, the display position of each image frame is position coordinates of a center point of the image frame on a display screen of the electronic device 100, the transparency of each image frame indicates how dark a shade of the image frame is, and a darker shade of the image frame indicates a lower transparency of the image frame, and the display element of each image frame is textual information, image information, and/or the like displayed in the image frame.

How the electronic device 100 performs animation calculation is described in detail in an embodiment below. Details are not described herein in this disclosure.

3. UI thread: An ANDROID program has only one process by default, but one process may have a plurality of threads. One of the threads is a UI thread. The UI thread is also referred to as a UI main thread. The UI thread is created when the program runs, and mainly controls display, update, and control interaction in a UI. All application components, including an activity, a service, and a broadcast receiver, run on the main thread of the application. Therefore, a time-consuming operation of any component may block all other components, including a service and a visible activity.

4. Surfaceflinger (SF) module: The surfaceflinger is used to receive graphics display data from a plurality of sources, combines the data, and sends the data to a display device for display. For example, when an application is opened, there are commonly three layers of display, that is, a status bar on the top, a navigation bar at the bottom or at a side, and an interface of the application. Each of the layers is separately updated and rendered. For all these interfaces, a frame buffer is obtained by the surfaceflinger through composition. A display of an electronic device may read data from the frame buffer and display a page corresponding to the data. A buffer queue is used during a display process, and the surfaceflinger is used for composition. For example, a page generated by using a graphics processing unit (GPU) when, for example, a window manager layer is used for generation is then obtained by the surfaceflinger through composition.

Figure 5A:
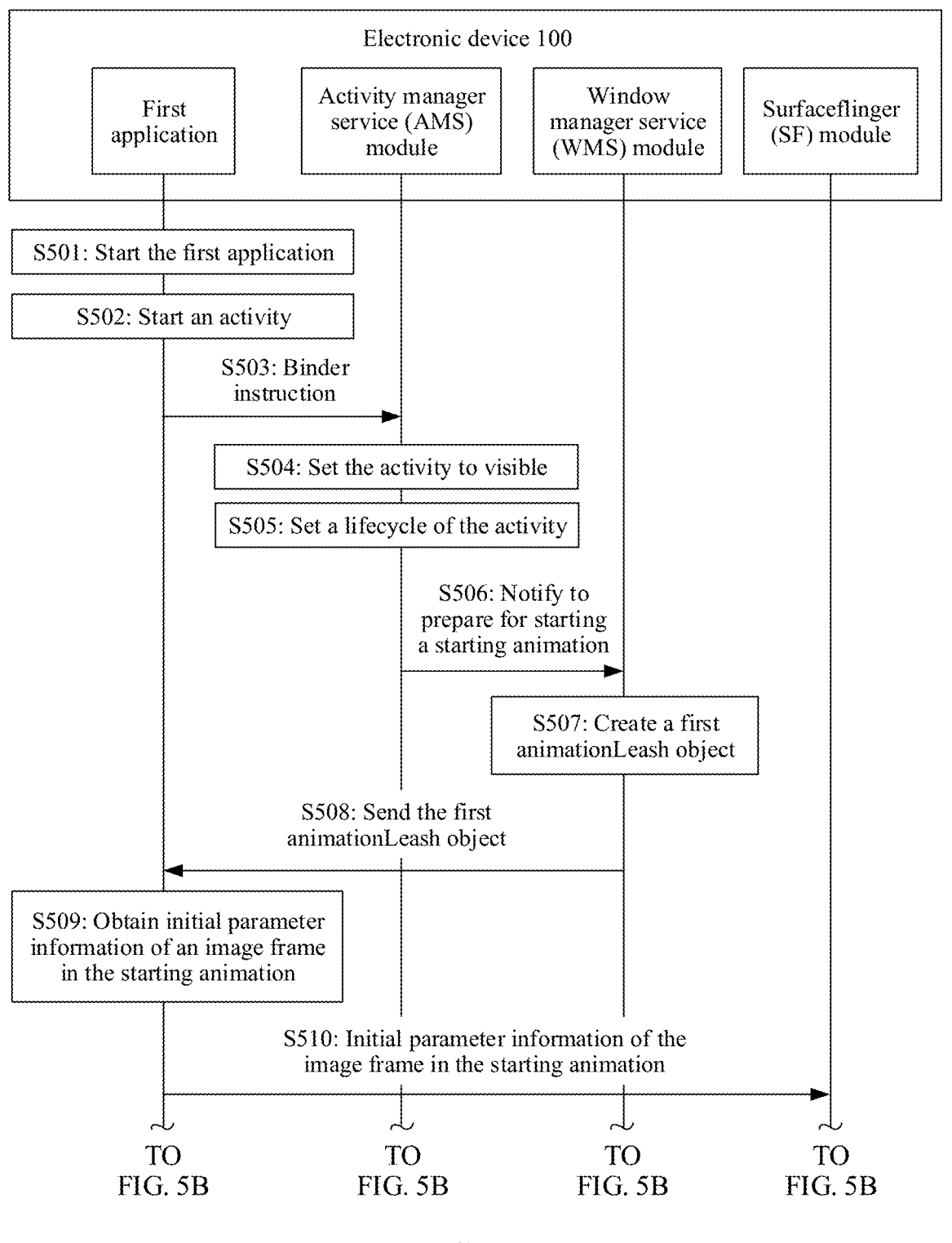
FIG. 5A and FIG. 5B are a schematic diagram of playing a starting animation and playing an exiting animation by an electronic device according to an embodiment of this disclosure.
Figure 5B:
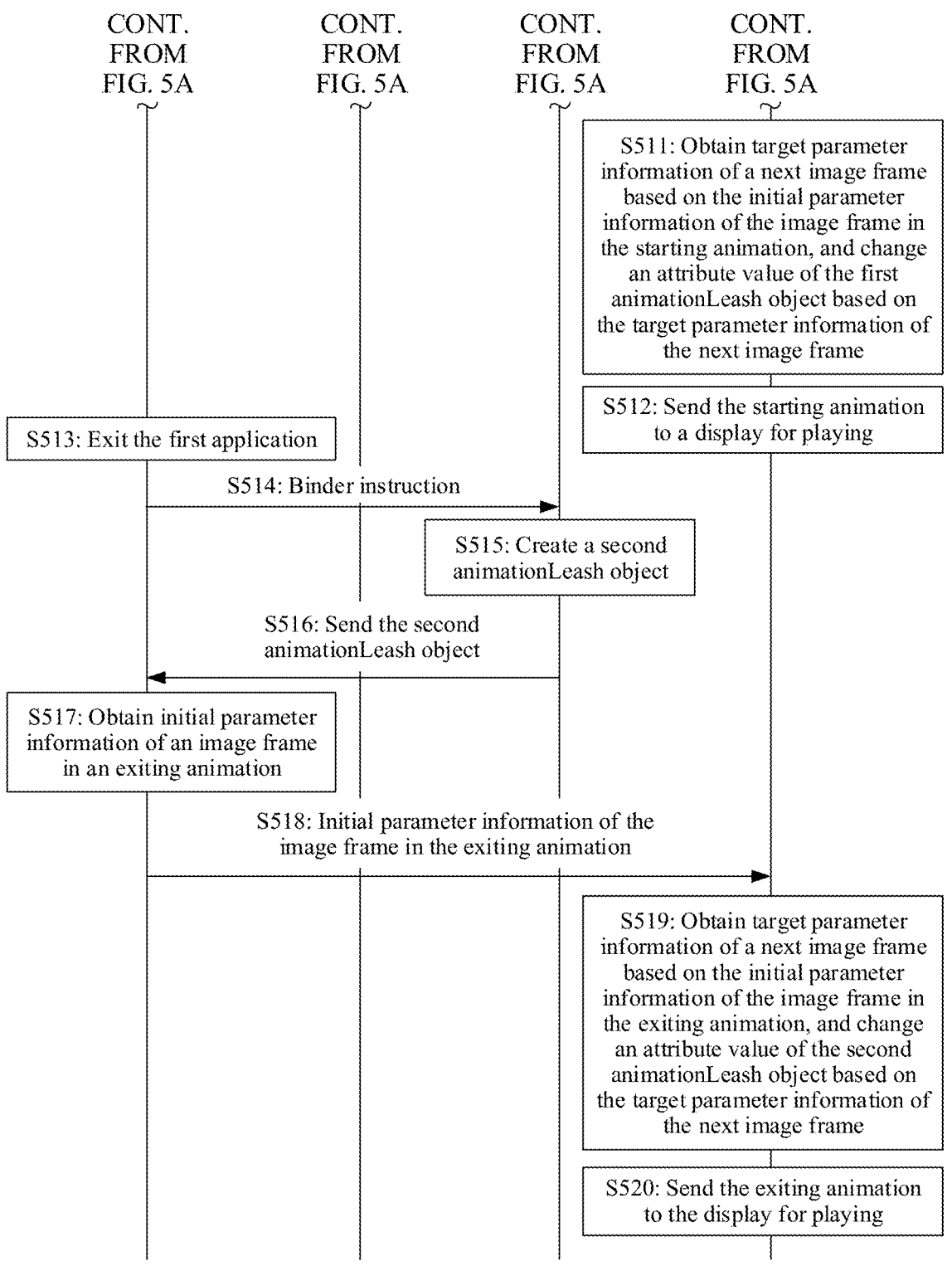

As shown in FIG. 5A and FIG. 5B, FIG. 5A and FIG. 5B are a schematic diagram of an example of an electronic device 100 playing a starting animation and playing an exiting animation.

A flowchart shown in FIG. 5A and FIG. 5B includes a first application, an activity manager service (AMS) module, a window manager service (WMS) module, and an SF module.

In some embodiments, the surfaceflinger module may not be included. This is not limited herein in this disclosure.

The AMS is used for a lifecycle management service for all activities on the electronic device 100.

The WMS is used to manage a display order, size, position of a window and a window animation.

First, the electronic device 100 receives an operation of a user for starting the first application. The electronic device 100 creates a first animationLeash object by using the AMS module and the WMS module in response to the operation of the user for starting the first application. Then, the WMS module sends an identifier of the first animationLeash object to the first application. After the first application receives the identifier of the first animationLeash object, the first application starts the starting animation.

Further, a method procedure in which the AMS module and the WMS module create the first animationLeash object is described in S501 to S508. It should be noted that, the method procedure in which the AMS module and the WMS module create the first animationLeash object may include more or fewer steps than S501 to S508. This is not limited herein in this disclosure. In addition, an execution order of each step in S501 to S508 is not limited in this disclosure.

S501: The first application is started.

The electronic device 100 receives the operation of the user for starting the first application, and the first application is started.

For example, the first application may be an application HUAWEI Video. The operation for starting the first application may be an operation of tapping an icon of the application HUAWEI Video as shown in FIG. 1G.

S502: The first application starts an activity.

The activity is a core component of the first application. After the electronic device 100 receives the operation of the user for starting the first application, the first application is started, and the first application starts the activity.

S503: The first application sends a binder instruction to the AMS module.

The AMS module is responsible for the lifecycle management service for the activity.

The AMS module is in an application framework layer of the first application. In the application framework layer, the AMS is a very important interface not only for starting an activity and a service but also for managing an activity and a service.

After starting the activity, the first application enters an AMS process of a system through interprocess communications according to the binder instruction, and invokes a start activity interface of the AMS.

S504: The AMS module sets the activity to visible.

S505: The AMS module sets a lifecycle of the activity.

S506: The AMS module sends, to the WMS module, a notification for preparing to start a starting animation.

S507: The WMS module receives and responds to the notification, sent by the AMS module, for preparing to start the starting animation, and the WMS module prepares to start an animation and creates a first animationLeash object.

Further, the WMS module invokes a function apply animation locked to prepare for starting the animation. The WMS module obtains a parent node, a Task object, corresponding to an app window token, and uses a surface animator of the Task for the animation. The app window token corresponds to one activity, that is, an actual object of the activity in the system, and is used for an operation of the AMS module and the WMS module on the activity. The surface animator generates an animation for a window, and manages a lifecycle of a window animation.

The WMS module creates the first animationLeash object by using the surface animator. The first animationLeash object is a temporary object created by the surface animator, and may control which window needs to move. In addition, the first application may control, by using the first animationLeash object, parameter information of each image frame in the starting animation.

S508: The WMS module sends the first animationLeash object to the first application.

After the first application receives the identifier of the first animationLeash object, the first application starts the starting animation. After the first application determines the parameter information of each image frame in the starting animation, the first application changes, based on the parameter information of each image frame in the starting animation, an attribute of a window drawn by the first animationLeash object. The first application sends the parameter information of each image frame in the starting animation to the SF module, and the SF module obtains an image frame through composition. Then, the SF module displays the composite image frame in the window drawn by the first animationLeash object.

Alternatively, after the first application receives the identifier of the first animationLeash object, the first application notifies the SF module to start the starting animation. After the first application determines initial parameter information of an image frame in the starting animation, the first application sends the initial parameter information of the image frame in the starting animation to the SF module. The SF module determines the parameter information of each image frame in the starting animation based on the initial parameter information of the image frame in the starting animation, and obtains an image frame through composition based on the parameter information of each image frame in the starting animation. The SF module changes, based on the parameter information of each image frame in the starting animation, an attribute of a window drawn by the first animationLeash object. The SF module displays the composite image frame in the window drawn by the first animationLeash object.

Further, a method procedure showing how the first application plays the starting animation is described in S509 to S512. It should be noted that the method procedure showing how the first application plays the starting animation may include more or fewer steps than S509 to S512. This is not limited herein in this disclosure. In addition, an execution order of each step in S509 to S512 is not limited in this disclosure.

S509: The first application obtains the initial parameter information of the image frame in the starting animation.

The initial parameter information of the image frame in the starting animation is parameter information, for example, a window size, display time, a display position, transparency, and a display element, of the first image frame in the starting animation. The initial parameter information of the image frame may further include more other information. This is not limited herein in this disclosure.

In some embodiments, the parameter information of the first image frame may be consistent with parameter information of an icon of the first application. That is, the window size of the first image frame is the same as a size of the icon of the first application, the display position of the first image frame is a display position of the icon of the first application, and the display element of the first image frame is the same as a display element of the icon of the first application.

In some other embodiments, the parameter information of the first image frame may alternatively be inconsistent with the parameter information of the icon of the first application. This is not limited herein in this disclosure.

S510: The first application sends the initial parameter information of the image frame in the starting animation to the surfaceflinger module.

S511: The surfaceflinger module obtains target parameter information of a next image frame based on the initial parameter information of the image frame in the starting animation, and changes an attribute value of the first animationLeash object based on the target parameter information of the next image frame.

In S510 and S511, the first application sends a task of animation calculation to the surfaceflinger module, and the surfaceflinger module performs animation calculation. In this way, a current problem of a jank frame that occurs when a UI thread processes animation calculation can be greatly improved.

Further, the surfaceflinger module creates a new animation processing thread based on an original thread. The animation processing thread has a task of calculating all tasks of animation calculation processed by a UI thread on the electronic device 100. In this way, a problem that an image frame is lost because processing of a UI thread of an application is not timely can be resolved.

Figure 5C:
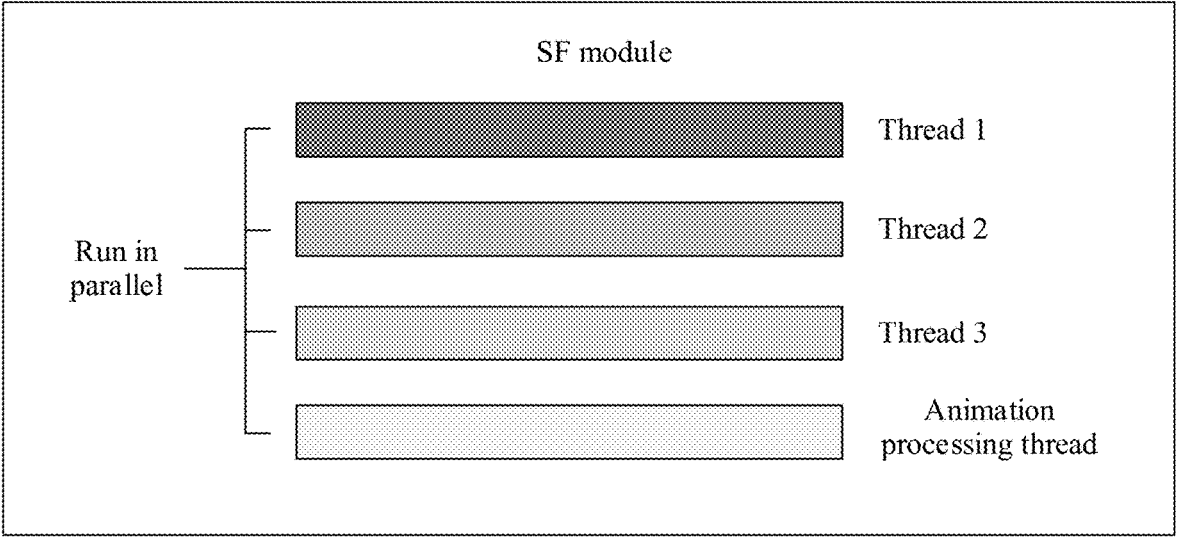
FIG. 5C is a schematic diagram of multi-thread running in a surfaceflinger according to an embodiment of this disclosure.

As shown in FIG. 5C, FIG. 5C is a schematic diagram of an example of multi-thread running in a surfaceflinger.

The surfaceflinger is used to receive graphics display data from a plurality of sources, combines the data, and sends the data to a display device. For example, when an application is opened, there are commonly three layers of display, that is, a status bar on the top, a navigation bar at the bottom or at a side, and an interface of the application. Each of the layers is separately updated and rendered.

For example, in a process of starting, the surfaceflinger is related to three types of threads, that is, a thread 1 (for example, a binder thread), a thread 2 (for example, a UI rendering thread), and a thread 3 (for example, a console event monitoring thread). The binder thread is used for binder interprocess communications between another process, for example, an application process, and the surfaceflinger. An operation for a part of the communications is to use the UI rendering thread to update a system UI. The console event monitoring thread is used for monitoring a sleep/awake state switching event in a frame buffer of hardware. Once the frame buffer of hardware is about to enter a sleep/awake state, the console event monitoring thread needs to notify the UI rendering thread, so that the UI rendering thread may perform an operation of turning off or turning on a display screen.

It can be understood that a plurality of threads in the surfaceflinger run in parallel.

As shown in FIG. 5C, there are the thread 1, the thread 2, and the thread 3 currently on a surfaceflinger side. To resolve a problem of a jank frame that occurs because the electronic device 100 puts the task of animation calculation in a UI thread of each application for processing and the application does not process the task in time, the electronic device 100 creates a new thread (i.e., animation processing thread) on the surfaceflinger side. A function of the animation processing thread is as follows. UI threads of all applications on the electronic device 100 couple the task of animation calculation to the animation processing thread on the surfaceflinger side, and the animation processing thread on the surfaceflinger side processes the task of animation calculation of all the applications on the electronic device 100.

It can be understood that the animation processing thread, the thread 1, the thread 2, and the thread 3 run in parallel, and the animation processing thread is used only for resolving a problem of a jank frame that occurs because the first application does not process animation calculation in time. On one hand, the current problem of a jank frame that occurs when the UI thread processes animation calculation is greatly improved, on the other hand, when the electronic device 100 plays the starting animation or the exiting animation, lagging does not occur, thereby improving user experience.

Further, the surfaceflinger module receives the initial parameter information, sent by the first application, of the image frame in the starting animation, and obtains the target parameter information of the next image frame through calculation based on the initial parameter information of the image frame in the starting animation. The surfaceflinger module sends the target parameter information of the next image frame to the WMS module. The WMS module changes the attribute value of the first animationLeash object based on the target parameter information of the next image frame. For example, the target parameter information of the next image frame includes information, for example, a window size, display time, a display position, transparency, and a display element, of the next image frame, and the attribute value of the first animationLeash object also includes the information, for example, the window size, the display time, the display position, the transparency, and the display element.

It can be understood that the first animationLeash object may be a window displayed in a user interface on the electronic device 100 in a floating manner. Then, the surfaceflinger module sets an attribute of the "window" based on the initial parameter information of the image frame in the starting animation, so that the window can display an image according to a display order and a display status of a preset image frame in the starting animation.

S512: The surfaceflinger module sends the starting animation to a display for playing.

For how the first application plays the starting animation, refer to the embodiments shown in FIG. 1A to FIG. 1L, FIG. 2A to FIG. 2M, and FIG. 3A to FIG. 3E. Details are not described herein again in this disclosure.

In some embodiments, S510, S511, and S512 may alternatively be replaced with the following S510 and S511.

S510: The first application obtains target parameter information of a next image frame based on the initial parameter information of the image frame in the starting animation, and changes an attribute value of the first animationLeash object based on the target parameter information of the next image frame.

In some embodiments, a task of animation calculation may alternatively be performed by the first application.

To be specific, the first application obtains the initial parameter information of the image frame in the starting animation, and obtains the target parameter information of the next image frame through calculation based on the initial parameter information of the image frame in the starting animation. The first application changes the attribute value of the first animationLeash object based on the target parameter information of the next image frame. The attribute value of the first animationLeash object is the same as the target parameter information of the next image frame. For example, the target parameter information of the next image frame includes information, for example, a window size, display time, a display position, transparency, and a display element, of the next image frame, and the attribute value of the first animationLeash object also includes the information, for example, the window size, the display time, the display position, the transparency, and the display element.

It can be understood that the first animationLeash object may be a window displayed in a user interface on the electronic device 100 in a floating manner. Then, the surfaceflinger module sets an attribute of the "window" based on the initial parameter information of the image frame in the starting animation, so that the window can display an image according to a display order and a display status of a preset image frame in the starting animation.

S511: The first application sends the starting animation to a display for playing.

For how the electronic device 100 plays the starting animation, refer to the embodiments shown in FIG. 1A to FIG. 1L, FIG. 2A to FIG. 2M, and FIG. 3A to FIG. 3E. Details are not described herein again in this disclosure.

The electronic device 100 receives an operation of a user for exiting the first application. The electronic device 100 may receive, in a process of playing the starting animation, the operation of the user for exiting the first application, or may receive, after the starting animation ends, the operation of the user for exiting the first application. This is not limited herein in this disclosure. In response to the operation of the user for exiting the first application, the electronic device 100 creates a second animationLeash object by using the AMS module and the WMS module. Then, the WMS module sends an identifier of the second animationLeash object to the first application. After the first application receives the identifier of the second animationLeash object, the first application starts the exiting animation.

Further, a method procedure in which the AMS module and the WMS module create the second animationLeash object is described in S513 to S516. It should be noted that the method procedure in which the AMS module and the WMS module create the second animationLeash object may include more or fewer steps than S513 to S516. This is not limited herein in this disclosure. In addition, an execution order of each step in S513 to S516 is not limited in this disclosure.

S513: The first application is exited.

After the first application is started, the electronic device 100 starts to play the starting animation. In this case, the electronic device 100 may receive and respond to the operation of the user for exiting the first application, and the first application is exited.

When the first application is exited, the electronic device 100 plays the exiting animation.

S514: The first application sends a binder instruction to the WMS module.

When the first application is exited, the first application sends the binder instruction to the WMS module. The binder instruction is used to instruct the WMS module to start the exiting animation.

S515: The WMS module receives and responds to the binder instruction, and creates the second animationLeash object.

Similarly, the WMS module creates the second animationLeash object by using the surface animator. The second animationLeash object is a temporary object created by the surface animator, and may control which window needs to move. In addition, the first application may control, by using the second animationLeash object, parameter information of each image frame in the exiting animation.

S516: The WMS module sends the second animationLeash object to the first application.

After the first application receives the identifier of the second animationLeash object, the first application starts the exiting animation. After the first application determines the parameter information of each image frame in the exiting animation, the first application changes, based on the parameter information of each image frame in the exiting animation, an attribute of a window drawn by the second animationLeash object. The first application sends the parameter information of each image frame in the exiting animation to the SF module, and the SF module obtains an image frame through composition. Then, the SF module displays the composite image frame in the window drawn by the second animationLeash object.

Alternatively, after the first application receives the identifier of the second animationLeash object, the first application notifies the SF module to start the exiting animation. After the first application determines initial parameter information of an image frame in the exiting animation, the first application sends the initial parameter information of the image frame in the exiting animation to the SF module. The SF module determines the parameter information of each image frame in the exiting animation based on the initial parameter information of the image frame in the exiting animation, and obtains an image frame through composition based on the parameter information of each image frame in the exiting animation. The SF module changes, based on the parameter information of each image frame in the exiting animation, an attribute of a window drawn by the second animationLeash object. The SF module displays the composite image frame in the window drawn by the second animationLeash object.

Further, a method procedure in which the AMS module and the WMS module create the second animationLeash object is described in S517 to S520. It should be noted that the method procedure in which the AMS module and the WMS module create the second animationLeash object may include more or fewer steps than S517 to S520. This is not limited herein in this disclosure. In addition, an execution order of each step in S517 to S520 is not limited in this disclosure.

S517: The first application obtains the initial parameter information of the image frame in the exiting animation.

S518: The first application sends the initial parameter information of the image frame in the exiting animation to the surfaceflinger module.

S519: The surfaceflinger module obtains target parameter information of a next image frame based on the initial parameter information of the image frame in the exiting animation, and changes an attribute value of the second animationLeash object based on the target parameter information of the next image frame.

In S518 and S519, the first application sends a task of animation calculation to the surfaceflinger module, and the surfaceflinger module performs animation calculation. In this way, a current problem of a jank frame that occurs when a UI thread processes animation calculation can be greatly improved.

Further, the surfaceflinger module creates a new animation processing thread based on an original thread, and the thread has a task of calculating all tasks of animation calculation processed by a UI thread on the electronic device 100.

Further, the surfaceflinger module receives the initial parameter information, sent by the first application, of the image frame in the exiting animation, and obtains the target parameter information of the next image frame through calculation based on the initial parameter information of the image frame in the exiting animation. The surfaceflinger module changes the attribute value of the second animationLeash object based on the target parameter information of the next image frame. An attribute value of the second animationLeash object is the same as the target parameter information of the next image frame. For example, the target parameter information of the next image frame includes information, for example, a window size, display time, a display position, transparency, and a display element of the next image frame, and the attribute value of the second animationLeash object also includes the information, for example, the window size, the display time, the display position, the transparency, and the display element.

It can be understood that the second animationLeash object may be a window displayed in a user interface on the electronic device 100 in a floating manner. Then, the surfaceflinger module sets an attribute of the "window" based on the initial parameter information of the image frame in the starting animation, so that the window can display an image according to a display order and a display status of a preset image frame in the starting animation.

S520: The surfaceflinger module sends the exiting animation to a display for playing.

How the electronic device 100 plays the exiting animation has been described in the foregoing explanation of technical terms. For details, refer to the foregoing embodiment. Details are not described herein again in this disclosure.

In some embodiments, S518, S519, and S520 may alternatively be replaced with the following S518 and S519.

S518: The first application obtains target parameter information of a next image frame based on a change from the initial parameter information of the image frame in the exiting animation, and changes an attribute value of the second animationLeash object based on the target parameter information of the next image frame.

In some embodiments, a task of animation calculation may be performed also by the first application.

To be specific, the first application obtains the initial parameter information of the image frame in the exiting animation, and obtains the target parameter information of the next image frame through calculation based on the initial parameter information of the image frame in the exiting animation. The first application changes the attribute value of the second animationLeash object based on the target parameter information of the next image frame. An attribute value of the second animationLeash object is the same as the target parameter information of the next image frame. For example, the target parameter information of the next image frame includes information, for example, a window size, display time, a display position, transparency, and a display element of the next image frame, and the attribute value of the second animationLeash object also includes the information, for example, the window size, the display time, the display position, the transparency, and the display element.

It can be understood that the second animationLeash object may be a window displayed in a user interface on the electronic device 100 in a floating manner. Then, the surfaceflinger module sets an attribute of the "window" based on the initial parameter information of the image frame in the starting animation, so that the window can display an image according to a display order and a display status of a preset image frame in the starting animation.

S519: The first application sends the exiting animation to the display for playing.

How the electronic device 100 plays the exiting animation has been described in the foregoing explanation of technical terms. For details, refer to the foregoing embodiment. Details are not described herein again in this disclosure.

It can be learned from FIG. 5A and FIG. 5B that, when the electronic device 100 plays the starting animation of the first application, the first animationLeash object is created, and the electronic device 100 plays the starting animation by using the first animationLeash object. Before the starting animation of the first application ends, the electronic device 100 receives the operation of the user for exiting the first application, and the electronic device 100 closes the starting animation and creates the second animationLeash object for the exiting animation. Then, the electronic device 100 starts to play the exiting animation. As the starting animation and the exiting animation are two pieces of animations, when the two pieces of animations are switched, the user can feel that a scene changes abruptly, which brings poor experience.

At present, there are two manners of playing the exiting animation. The two manners have been mentioned in the explanation of terms. For details, refer to the foregoing embodiment.

Manner 1 has a drawback described below. When the electronic device 100 plays the starting animation of the first application, before the starting animation of the first application on the electronic device 100 ends, the electronic device 100 receives the operation of the user for exiting the first application, and the electronic device 100 stops playing the starting animation, and starts to play the exiting animation. Herein, as the starting animation and the exiting animation are two pieces of animations, when the two pieces of animations are switched, the user can feel a sudden change of a scene. This brings poor experience.

Manner 2 has a drawback described below. Before the starting animation ends, the electronic device 100 creates the exiting animation. The electronic device 100 needs to superimpose overlapping parts of animation in the starting animation and the exiting animation, and the electronic device 100 displays a superimposed part of animation. After the superimposed part of animation ends, the electronic device 100 starts to play an animation included in the exiting animation. In Manner 2, the electronic device 100 needs to perform superimposition calculation on the overlapping parts of animation in the starting animation and the exiting animation, and calculation in a complex scenario is relatively complex. In addition, after the starting animation stops, the electronic device 100 performs three parts of calculation: calculation on a part of starting animation that has not been played in the starting animation, calculation on a part of exiting animation that overlaps the part of starting animation that has not been played in the starting animation, and superimposition calculation on the part of starting animation that has not been played in the starting animation and the part of exiting animation that overlaps the part of starting animation that has not been played in the starting animation. This surely increases computation of the electronic device 100.

Therefore, this disclosure provides a method for animation transition in an application. The method includes the following. An electronic device 100 receives an operation of a user for starting a first application, and the electronic device 100 creates a first animationLeash object for a starting animation, and in a process of starting the first application, the electronic device 100 receives an operation of the user for exiting the first application, and the electronic device 100 reuses the first animationLeash object for an exiting animation. In this way, in a process of switching, as both the starting animation and the exiting animation of the first application are animations performed by using the first animationLeash object, the starting animation and the exiting animation are a same piece of animation, so that a problem that a transition is not smooth during switching because the starting animation and the exiting animation are two pieces of animations does not occur.

A hardware architecture of the electronic device 100 mentioned in embodiments of this disclosure is described below.

Figure 6:
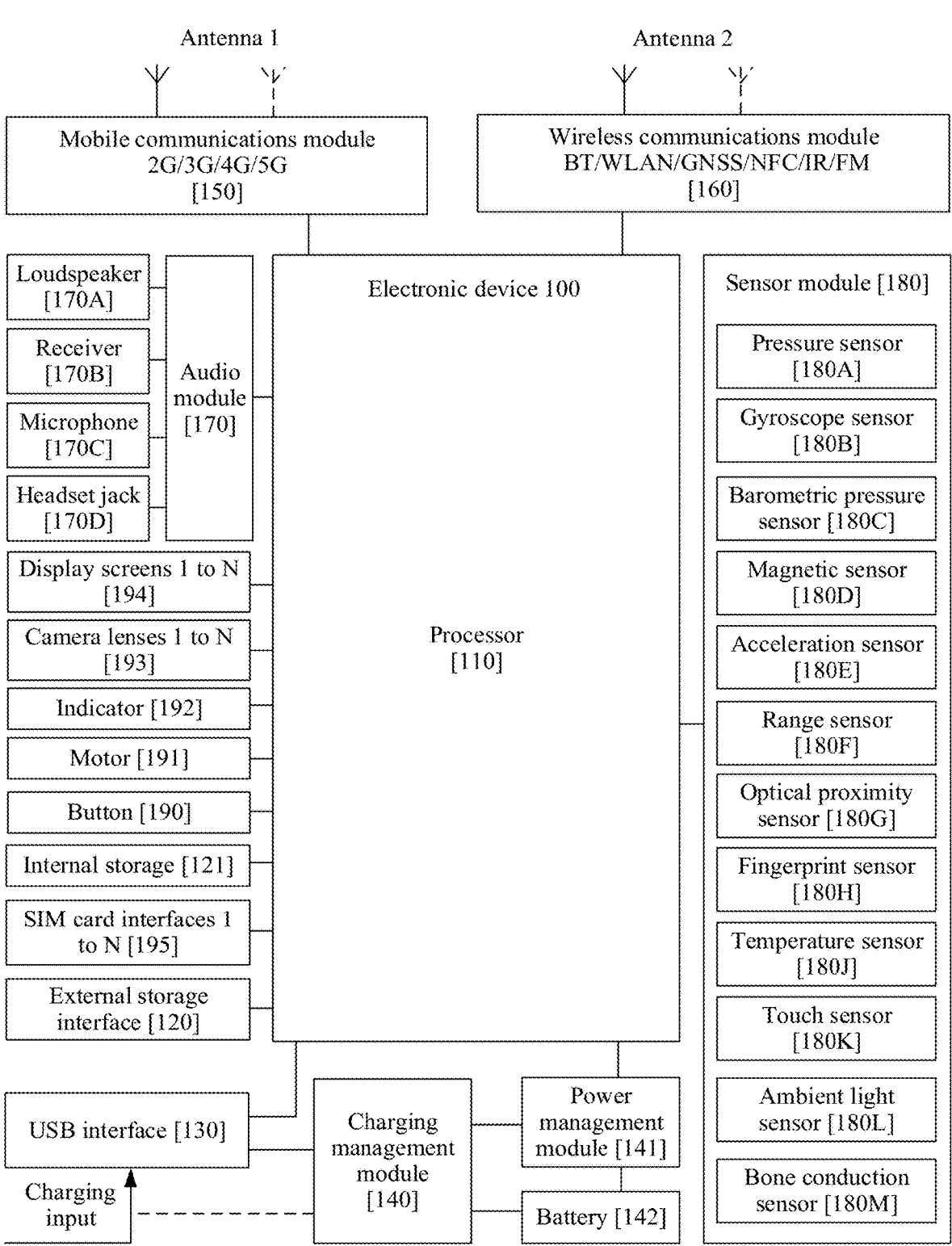
FIG. 6 is a schematic diagram of a structure of an electronic device according to an embodiment of this disclosure.

FIG. 6 is a schematic diagram of a structure of an electronic device 100.

The electronic device 100 is used as an example below to describe embodiments in detail. A device type of the electronic device 100 may include a mobile phone, a tablet computer, a smart screen, a desktop computer, a laptop computer, a handheld computer, a notebook computer, an ultra-mobile personal computer (UMPC), a netbook, and the like. A device type of the electronic device 100 is not specially limited in this embodiment of this disclosure.

It should be understood that the electronic device 100 shown in FIG. 6 is merely an example, and the electronic device 100 may have more or fewer components than those shown in FIG. 6, or may combine two or more components, or may have different component configurations. The components shown in the figure may be implemented by hardware including one or more signal processing and/or application-specific integrated circuits, software, or a combination of hardware and software.

The electronic device 100 may include a processor 110, an external storage interface 120, an internal storage 121, a Universal Serial Bus (USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a button 190, a motor 191, an indicator 192, a camera lens 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present disclosure does not constitute a specific limitation on the electronic device 100. In some other embodiments of this disclosure, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a GPU, an image signal processor (ISP), a controller, a memory, a video codec, a digital signal processor (DSP), a baseband processor, and/or a neural-network processing unit (NPU). Different processing units may be independent components, or may be integrated into one or more processors.

In some embodiments, the processor 110 may include a softAP network configuration module. The softAP network configuration module may be integrated into an AP, an NPU, or another chip. When it is determined that a near-me area network (NAN) fails to perform network configuration, the electronic device 100 may wake up the softAP network configuration module, and perform network configuration for the electronic device 100 by using a softAP network configuration method. In some other embodiments, the processor 110 may include a BLUETOOTH network configuration module, a sound wave network configuration module, and the like. A chip integrating the foregoing different types of network configuration modules is not limited in this embodiment of this disclosure. The foregoing different types of network configuration modules may be woken up after the electronic device 100 confirms that the NAN fails to perform network configuration. The electronic device 100 may provide a corresponding network configuration service for the electronic device 100 by using the foregoing different types of network configuration modules.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor may directly invoke the instruction or the data from the memory. This avoids repeated access, reduces a time for waiting of the processor 110, and improves system efficiency.

The USB interface 130 is an interface that conforms to a USB standard specification, and may be a mini-USB interface, a micro-USB interface, a USB Type-C interface, or the like. The USB interface 130 may be used to connect to a charger to charge the electronic device 100, or may be used to transmit data between the electronic device 100 and a peripheral device, or may be used to connect to a headset for playing audio through the headset. The interface may be further used to connect to another electronic device, for example, an AR device.

The charging management module 140 is configured to receive a charging input from a charger.

The power management module 141 is configured to connect to the battery 142, the charging management module 140, and the processor 110. The power management module 141 receives an input from the battery 142 and/or the charging management module 140, and supplies power to the processor 110, the internal storage 121, the external storage, the display screen 194, the camera lens 193, the wireless communications module 160, and the like.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further reused, to improve antenna utilization.

The mobile communications module 150 may provide a wireless communications solution including second generation (2G)/third generation (3G)/fourth generation (4G)/fifth generation (5G) that is applied to the electronic device 100. The mobile communications module 150 may include at least one filter, a switch, a power amplifier, a low-noise amplifier (LNA), and the like. The mobile communications module 150 may receive an electromagnetic wave through the antenna 1, perform processing, for example, filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1.

The wireless communications module 160 may provide a wireless communications solution that is applied to the electronic device 100 and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, and the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-transmitted signal from the processor 110, perform frequency modulation and amplification on the signal, and convert the signal into an electromagnetic wave for radiation through the antenna 2.

The electronic device 100 may implement a display function by using the GPU, the display screen 194, the application processor, and the like. The GPU is a microprocessor for image processing, and is connected to the display screen 194 and the application processor. The GPU is configured to perform mathematical and geometric computation, and render an image. The processor 110 may include one or more GPUs that execute a program instruction to generate or change display information.

The display screen 194 is configured to display an image, a video, or the like. In some embodiments, the electronic device 100 may include one or N display screens 194, and N is a positive integer greater than 1.

The electronic device 100 may implement a photographing function by using the ISP, the camera lens 193, the video codec, the GPU, the display screen 194, the application processor, and the like.

The ISP is configured to process data fed back by the camera lens 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. In some embodiments, the ISP may be disposed in the camera lens 193.

The camera lens 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, red, green, and blue (RGB) or luma, blue projection, and red projection (YUV). In some embodiments, the electronic device 100 may include one or N camera lenses 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of encoded formats, for example, Moving Picture Experts Group (MPEG)-1, MPEG-2, MPEG-3, and MPEG-4.

The NPU is a neural-network (NN) computing processor that quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, may be implemented by using the NPU.

The external storage interface 120 may be used to connect to an external storage card, for example, a micro Secure Digital (SD) card, to extend a storage capability of the electronic device 100. The external storage card communicates with the processor 110 through the external storage interface 120, to implement a data storage function. For example, files such as music and a video are stored in the external storage card.

The internal storage 121 may be configured to store computer-executable program code. The executable program code includes instructions. The processor 110 runs the instructions stored in the internal storage 121, to perform various function applications and data processing on the electronic device 100.

The electronic device 100 may implement an audio function, for example, music play or recording, by using the audio module 170, the loudspeaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal.

The loudspeaker 170A, also referred to as a "speaker", is configured to convert an electrical audio signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and may convert the pressure signal into an electrical signal.

The gyroscope sensor 180B may be configured to determine a motion posture of the electronic device 100. In some embodiments, an angular velocity of the electronic device 100 around three axes (that is, axes x, y, and z) may be determined by using the gyroscope sensor 180B.

The barometric pressure sensor 180C is configured to measure barometric pressure.

The magnetic sensor 180D includes a Hall sensor.

The acceleration sensor 180E may detect accelerations in various directions (on three axes) of the electronic device 100. When the electronic device 100 is still, a magnitude and a direction of gravity may be detected. The acceleration sensor 180E may be further configured to identify a posture of the electronic device 100, and is used in, for example, switching between landscape mode and portrait mode or a pedometer.

The range sensor 180F is configured to measure a distance. The electronic device 100 may measure a distance using infrared or laser.

The optical proximity sensor 180G may include a light-emitting diode (LED) and an optical detector, for example, a photodiode. The LED may be an infrared LED. The electronic device 100 emits infrared light through the LED. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a "touch panel". The touch sensor 180K may be disposed on the display screen 194. The touch sensor 180K and the display screen 194 form a touchscreen, which is also referred to as a "touch screen". The touch sensor 180K is configured to detect a touch operation performed on or near the touch sensor. The touch sensor may transfer a detected touch operation to the application processor to determine a type of the touch event.

The bone conduction sensor 180M may obtain a vibration signal.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt.

The indicator 192 may be an indicator light, may be configured to indicate a charging status and a power change, and may be configured to indicate a message, a missed call, a notification, and the like.

The SIM card interface 195 is used to connect a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. In some embodiments, the electronic device 100 uses an eSIM, that is, an embedded SIM card. The eSIM card may be embedded into the electronic device 100, and cannot be separated from the electronic device 100.

A software system on the electronic device 100 may use a layered architecture, an event-driven architecture, a micro-kernel architecture, a micro service architecture, or a cloud architecture. In this embodiment of the present disclosure, an ANDROID system with a layered architecture is used as an example to describe a software structure of the electronic device 100.

Figure 7:
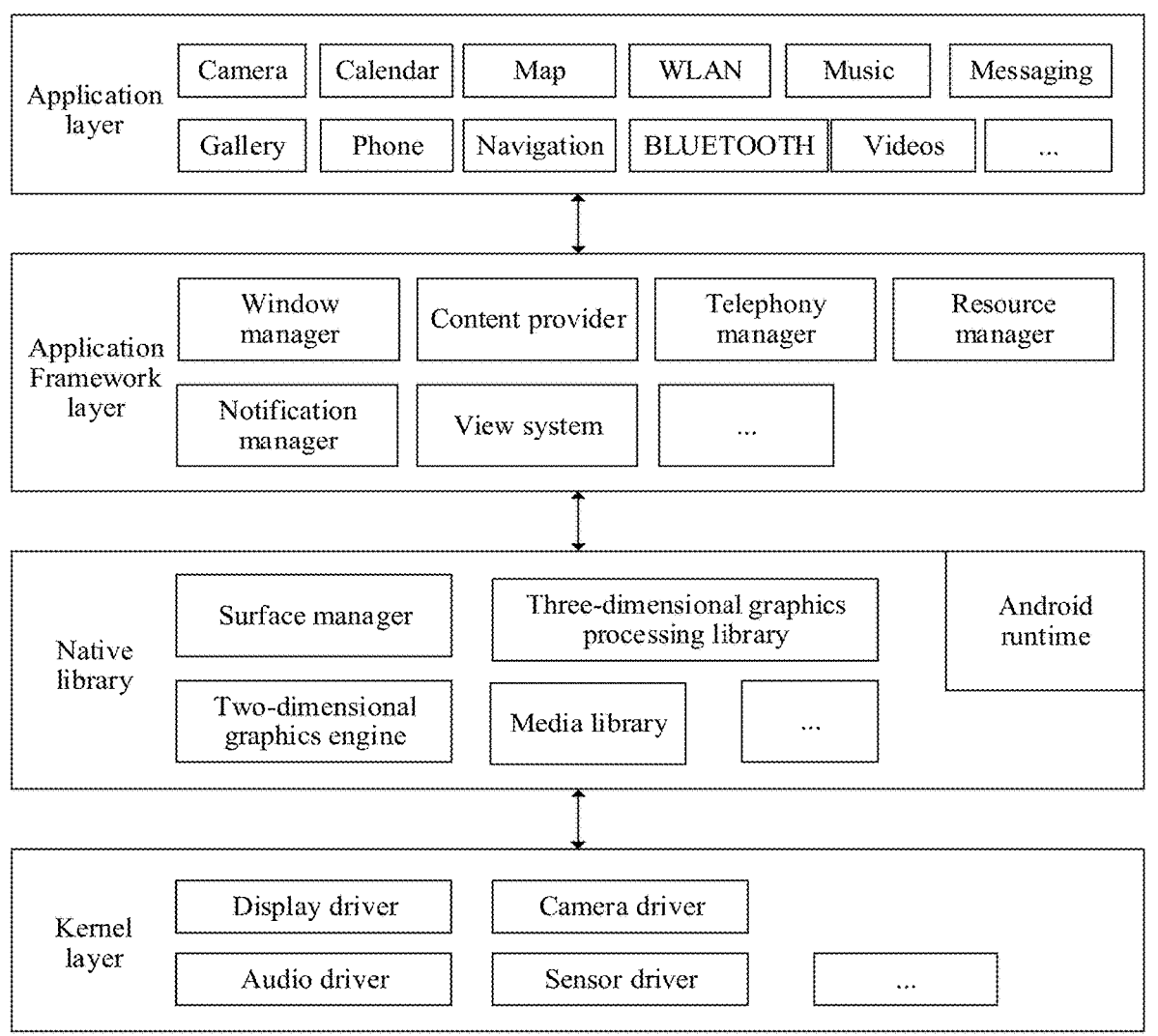
FIG. 7 is a block diagram of a software structure of an electronic device according to an embodiment of this disclosure.

FIG. 7 is a block diagram of a software structure of the electronic device 100 according to an embodiment of the present disclosure.

In the layered architecture, software is divided into several layers, and each layer has a clear-cut role and task. The layers communicate with each other through a software interface. In some embodiments, the ANDROID system is divided from top to bottom into four layers: an application layer, an application framework layer, ANDROID runtime, and a native library, and a kernel layer.

The application layer may include a series of application packages.

As shown in FIG. 7, an application package may include applications such as Camera, Gallery, Calendar, Phone, Maps, Navigation, WLAN, BLUETOOTH, Music, Videos, and Messaging.

The application framework layer provides an application programming interface (API) and a programming framework to an application at the application layer. The application framework layer includes some predefined functions.

As shown in FIG. 7, the application framework layer may include a window manager, a content provider, a view system, a telephony manager, a resource manager, a notification manager, and the like.

The window manager is used to manage a window program. The window manager may obtain a size of a display screen, determine whether there is a status bar, lock the screen, take a screenshot, and the like.

The content provider is used to store and obtain data, and enable the data to be accessed by an application. The data may include a video, an image, audio, outgoing and incoming calls, a browsing history and bookmarks, contacts, and the like.

The view system includes a visual control, for example, a control for displaying text and a control for displaying an image. The view system may be used to construct an application. A display interface may include one or more views. For example, a display interface including a notification icon of Messaging may include a text display view and a picture display view.

The telephony manager is used to provide a communications function of the electronic device 100, for example, management of a call status (including answering, hanging up, and the like).

The resource manager provides, to an application, various resources, such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is used to notify download completion, provide a message notification, and the like. The notification manager may alternatively be a notification that appears in a status bar atop the system in a form of a graph or a scroll bar text, for example, a notification of an application running on the background, or may be a notification that appears on the screen in a form of a dialog window. For example, text information is prompted in the status bar, a prompt tone is played, the electronic device vibrates, or the indicator light blinks.

ANDROID runtime includes a core library and a virtual machine. ANDROID runtime is responsible for scheduling and management of the ANDROID system.

The core library includes two parts. One of the parts is a performance function that needs to be invoked in the JAVA language, and the other part is a core library of ANDROID.

The application layer and the application framework layer run on the virtual machine. The virtual machine executes JAVA files at the application layer and the application framework layer as binary files. The virtual machine is configured to implement functions such as object life cycle management, stack management, thread management, safety and exception management, and garbage collection.

The native library may include a plurality of functional modules, for example, a surface manager, a media library, a three-dimensional (3D) graphics processing library (for example, OpenGL Embedded System (ES)), and a two-dimensional (2D) graphics engine (for example, SGL)

The surface manager is used to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An example of a working procedure of software and hardware of the electronic device 100 is described below with reference to a capturing and photographing scenario.

When the touch sensor 180K receives a touch operation, a corresponding hardware interruption is sent to the kernel layer. The kernel layer processes the touch operation into an original input event (including information, for example, touch coordinates and a time stamp of the touch operation). The original input event is stored in the kernel layer. The application framework layer obtains the original input event from the kernel layer, and recognizes a control corresponding to the input event. For example, the touch operation is a touch and tapping operation, and a control corresponding to the tapping operation is a control of an icon of a camera application. The camera application invokes an interface in the application framework layer to start the camera application, to enable a camera driver by invoking the kernel layer and capture a static image or a video by using the camera lens 193.

A method for animation transition in an application provided in an embodiment of this disclosure is described below with reference to an application scenario.

First, an electronic device 100 receives and responds to an operation of a user for starting a first application, and the electronic device 100 plays a starting animation of the first application.

For example, if the starting animation of the first application includes N image frames (for example, 10 frames), when the electronic device 100 receives an operation of the user for exiting the first application, the electronic device 100 has played to an $M^{th}$ image frame (for example, the fourth frame) in the starting animation.

For example, first four image frames in the starting animation that has been played by the electronic device 100 may be UI diagrams shown in FIG. 1H to FIG. 1K. Details are not described herein again in this disclosure.

When the electronic device 100 displays the fourth image frame (for example, a UI diagram shown in FIG. 1K) in the starting animation, the electronic device 100 receives the operation of the user for exiting the first application, and the electronic device 100 starts an exiting animation.

The operation for exiting the first application may be a sliding operation toward the top of a screen of the electronic device 100 performed on an edge (for example, a lower edge) of the screen, or may be a tapping operation performed on a button for returning to a home screen in "three buttons". It should be noted that the button for returning to the home screen in the "three buttons" may be a physical button or a virtual button. This is not limited herein in this disclosure. The operation for exiting the first application may alternatively be another operation. This is not limited herein in this disclosure.

In this embodiment of this disclosure, an example in which the operation for exiting the first application is the sliding operation toward the top of the screen of the electronic device 100 performed on the lower edge of the screen is used for description.

It should be noted that a direction of the sliding operation toward the top of the screen of the electronic device 100 performed on the lower edge of the screen affects an effect of playing the exiting animation.

Further, when the operation for exiting the first application is a sliding operation toward the top of the screen of the electronic device 100 performed on and perpendicular to the lower edge of the screen, the operation does not affect the effect of playing the exiting animation on the electronic device 100.

When the operation for exiting the first application is a sliding operation toward the top right of the screen of the electronic device 100 performed on the lower edge of the screen, the exiting animation played on the electronic device 100 is shifted to the right.

When the operation for exiting the first application is a sliding operation toward the top left of the screen of the electronic device 100 performed on the lower edge of the screen, the exiting animation played on the electronic device 100 is shifted to the left.

First, a corresponding application scenario in which the operation for exiting the first application is the sliding operation toward the top of the screen of the electronic device 100 performed on and perpendicular to the lower edge of the screen is described.

FIG. 8A to FIG. 8H are an example of UI diagrams of an application scenario corresponding to an operation for exiting a first application that is a sliding operation toward the top of a screen of an electronic device 100 performed on and perpendicular to a lower edge of the screen.

Figure 8B:
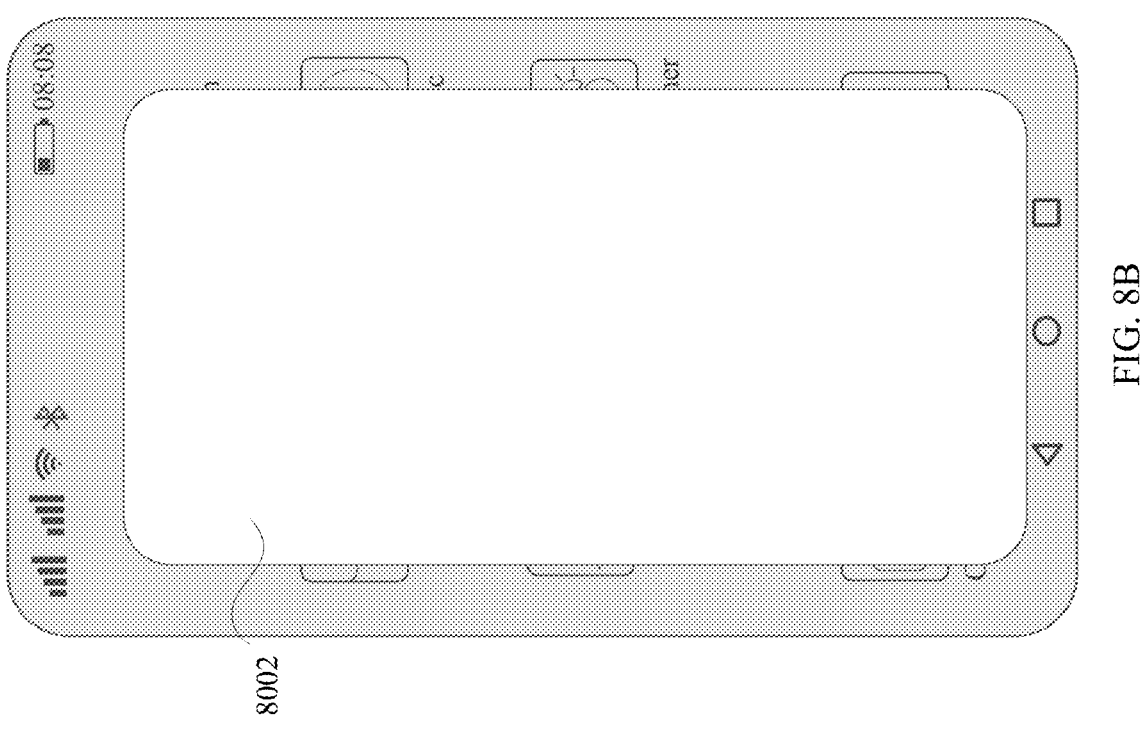
FIG. 8A to FIG. 8H are an example of UI diagrams of an application scenario corresponding to an operation for exiting a first application that is a sliding operation toward the top of a screen of an electronic device performed on and perpendicular to a lower edge of the screen.
Figure 8A:
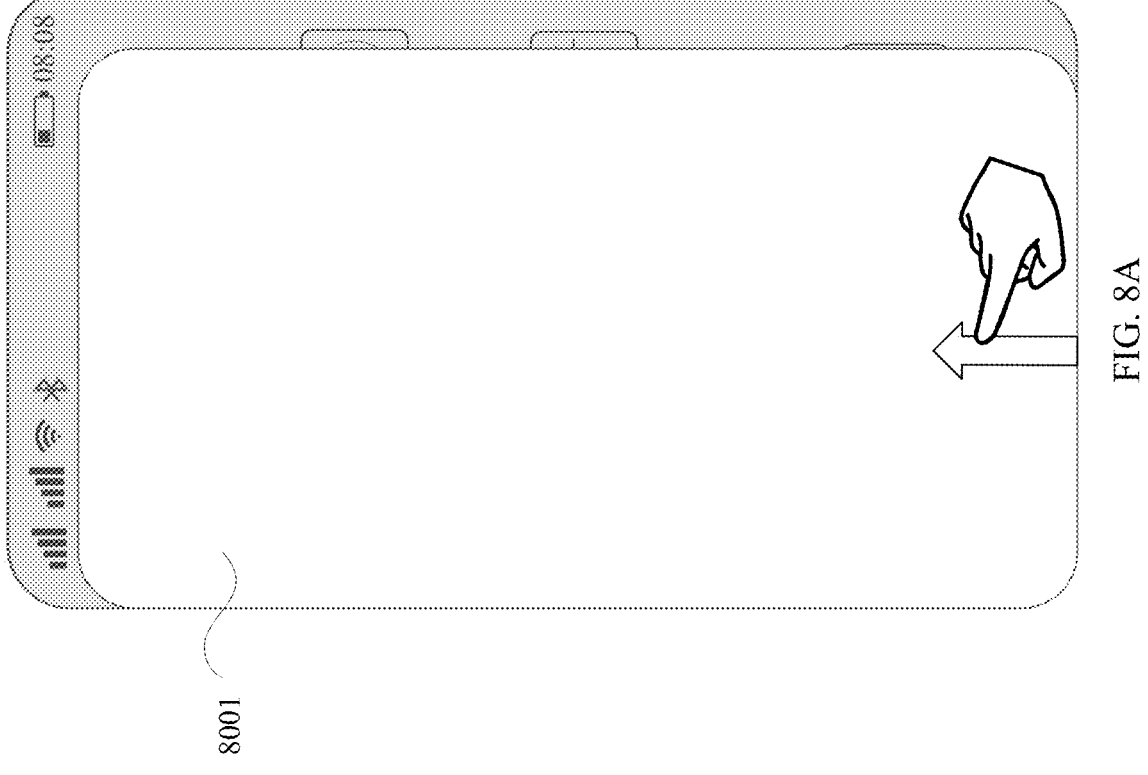

For example, as shown in FIG. 8A, FIG. 8A shows the last image frame 8001 in a starting animation of the first application played by the electronic device 100. The electronic device 100 receives and responds to the sliding operation of a user toward the top of the screen of the electronic device 100 performed on and perpendicular to the lower edge of the screen, and the electronic device 100 plays an exiting animation of the first application.

In addition, the electronic device 100 displays the image frame 8001 and an image frame 8002 in a window drawn by a same animationLeash object. The image frame 8001 is the last image frame in the starting animation. The image frame 8002 is the first image frame in the exiting animation. Therefore, a transition is smooth when the electronic device 100 switches from the starting animation to the exiting animation.

The electronic device 100 displays the image frame 8002 shown in FIG. 8B, and the image frame 8002 may be the first image frame in the exiting animation. Image content of the image frame 8002 may not show any element, or may show one or more elements. This is not limited herein in this disclosure.

Figures 8C, 8D:
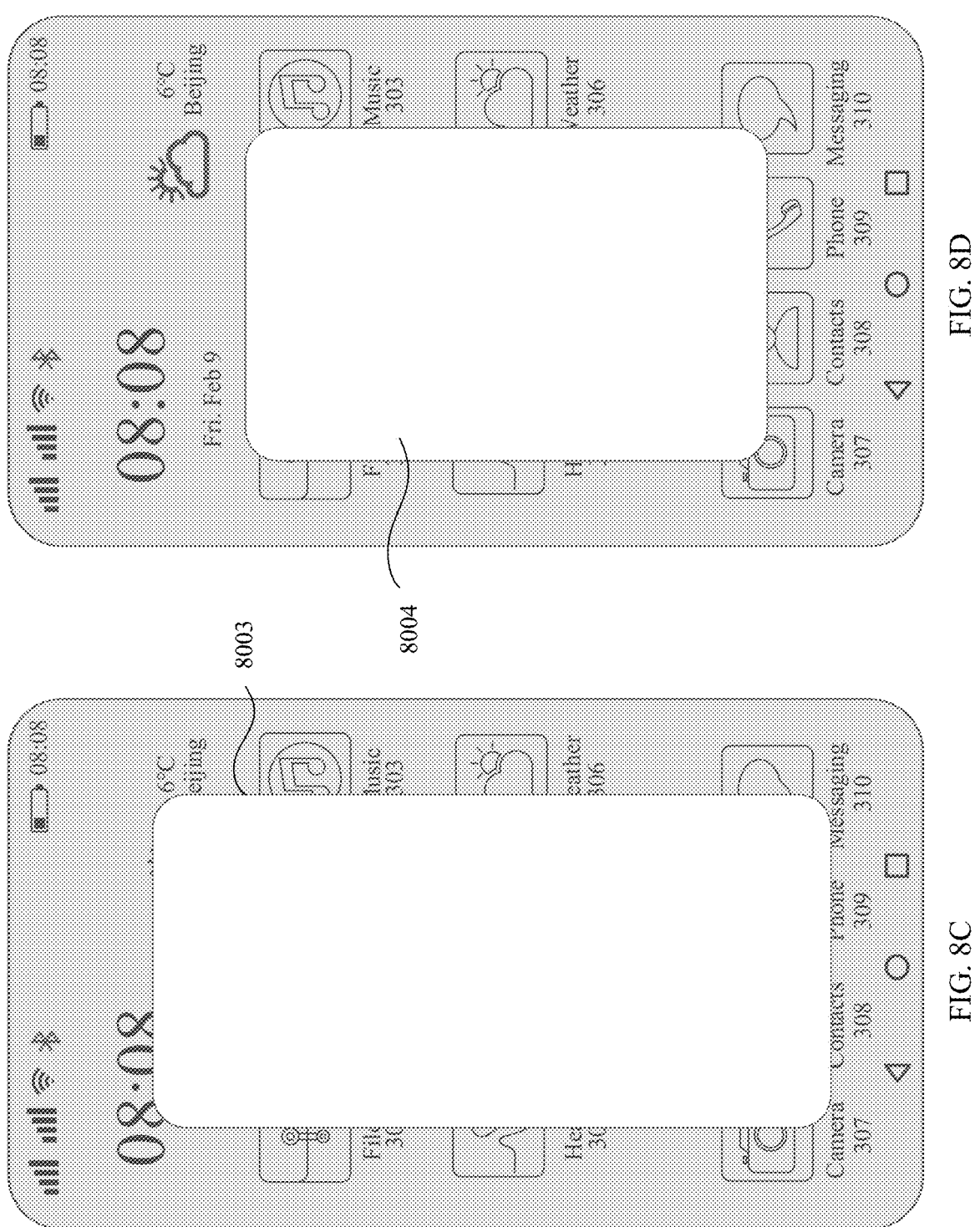

A size of the image frame 8002 gradually decreases, and the electronic device 100 displays an image frame 8003 shown in FIG. 8C, and the image frame 8003 may be the second image frame in the exiting animation. Image content of the image frame 8003 may not show any element, or may show one or more elements. This is not limited herein in this disclosure.

A size of the image frame 8003 gradually decreases, and the electronic device 100 displays an image frame 8004 shown in FIG. 8D, and the image frame 8004 may be the third image frame in the exiting animation. Image content of the image frame 8004 may not show any element, or may show one or more elements. This is not limited herein in this disclosure.

Figure 8E:
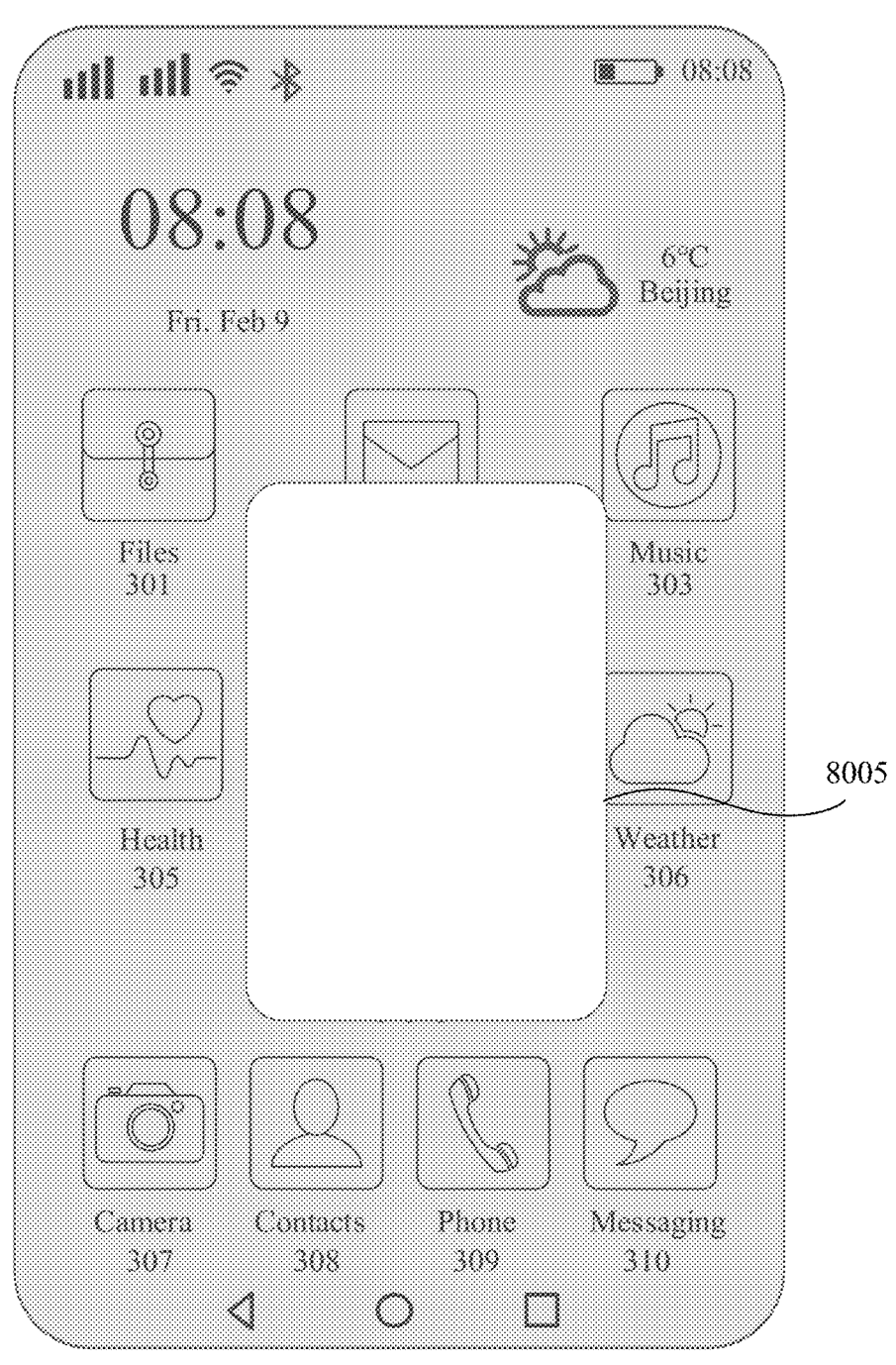

A size of the image frame 8004 gradually decreases, and the electronic device 100 displays an image frame 8005 shown in FIG. 8E, and the image frame 8005 may be the fourth image frame in the exiting animation. Image content of the image frame 8005 may not show any element, or may show one or more elements. This is not limited herein in this disclosure.

Figures 8F, 8G:
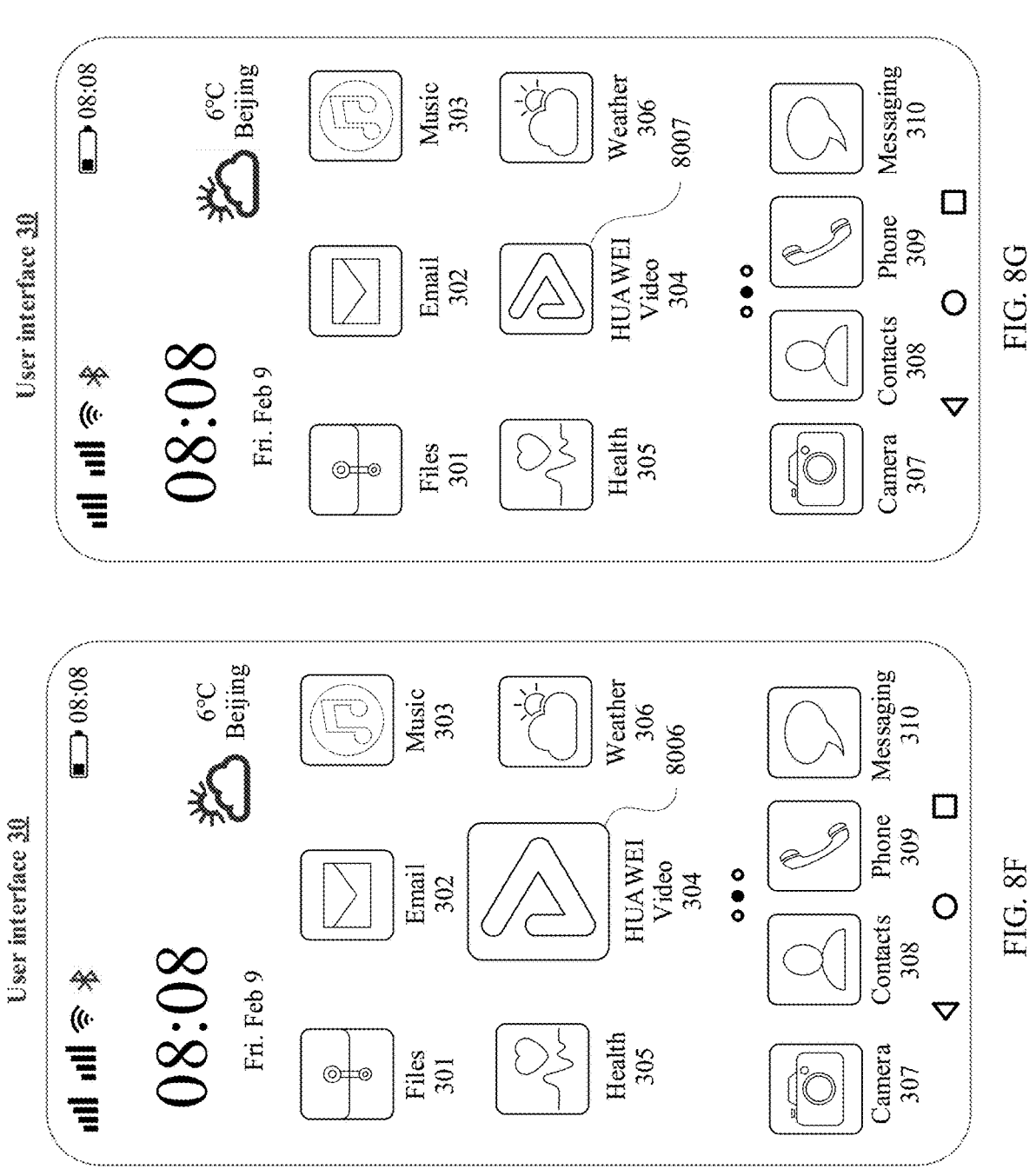

A size of the image frame 8005 gradually decreases, and the electronic device 100 displays an image frame 8006 shown in FIG. 8F, and the image frame 8006 may be the fifth image frame in the exiting animation. A size of the image frame 8006 is greater than a size of an icon of HUAWEI Video, and displayed image content of the image frame 8006 is image content of the icon of HUAWEI Video. The image content of the image frame 8006 may not show any element, or may show one or more elements. This is not limited herein in this disclosure.

The size of the image frame 8006 gradually decreases, and the electronic device 100 displays an image frame 8007 shown in FIG. 8G, and the image frame 8007 may be the sixth image frame in the exiting animation. A size of the image frame 8007 is the same as the size of the icon of HUAWEI Video, and displayed image content of the image frame 8007 is the image content of the icon of HUAWEI Video. The image content of the image frame 8007 may not show any element, or may show one or more elements. This is not limited herein in this disclosure.

It can be understood that FIG. 8A to FIG. 8G show only some accompanying drawings for showing the exiting animation, and may further include more accompanying drawings. Some accompanying drawings are omitted in FIG. 8A to FIG. 8G. This is not limited herein in this disclosure.

Figure 8H:
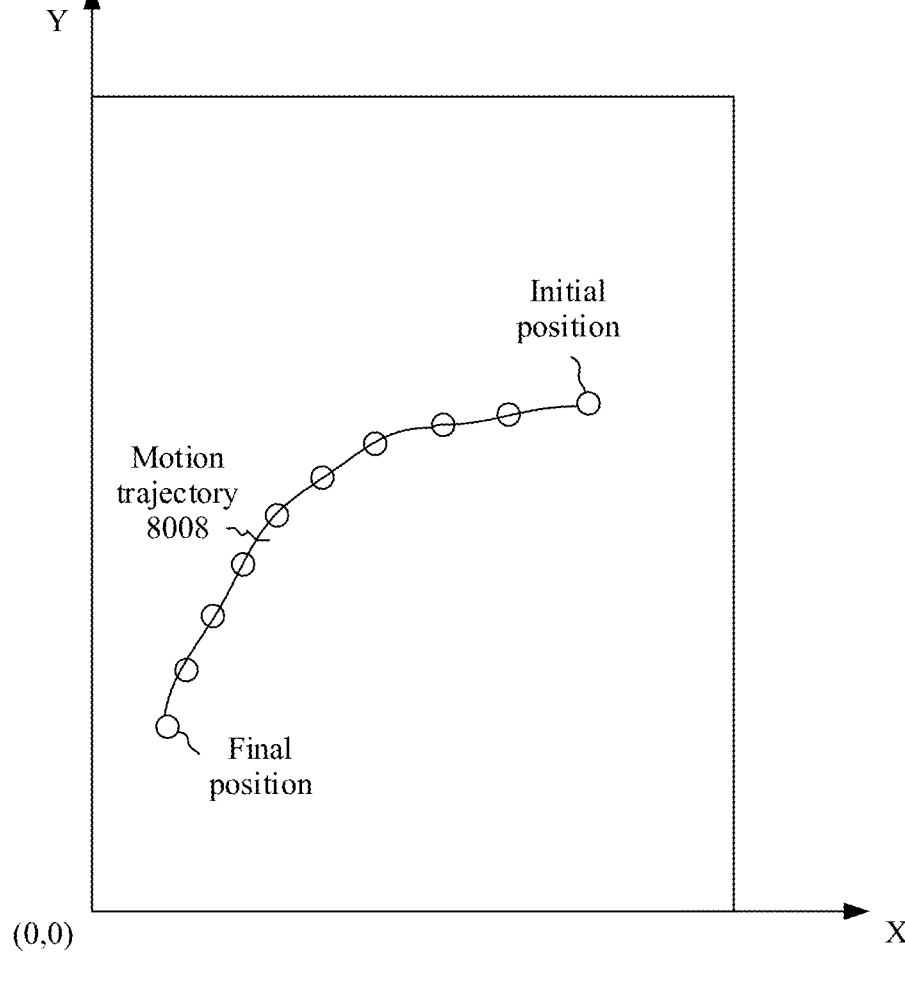

FIG. 8H shows a diagram of an example of a motion trajectory of center points of image frames shown in FIG. 8A to FIG. 8G in the foregoing exiting animation.

An initial position is a position of the center point of the image frame shown in FIG. 8A. Then, the center points of the image frames shown in FIG. 8A to FIG. 8G gradually move from the initial position to a final position on the motion trajectory 8008. The final position is a position of the center point of the image frames shown in FIG. 8F and FIG. 8G.

FIG. 9A to FIG. 9F are an example of UI diagrams of an application scenario corresponding to an operation for exiting a first application that is a sliding operation toward the top right of a screen of an electronic device 100 performed on a lower edge of the screen.

Figures 9A, 9B:
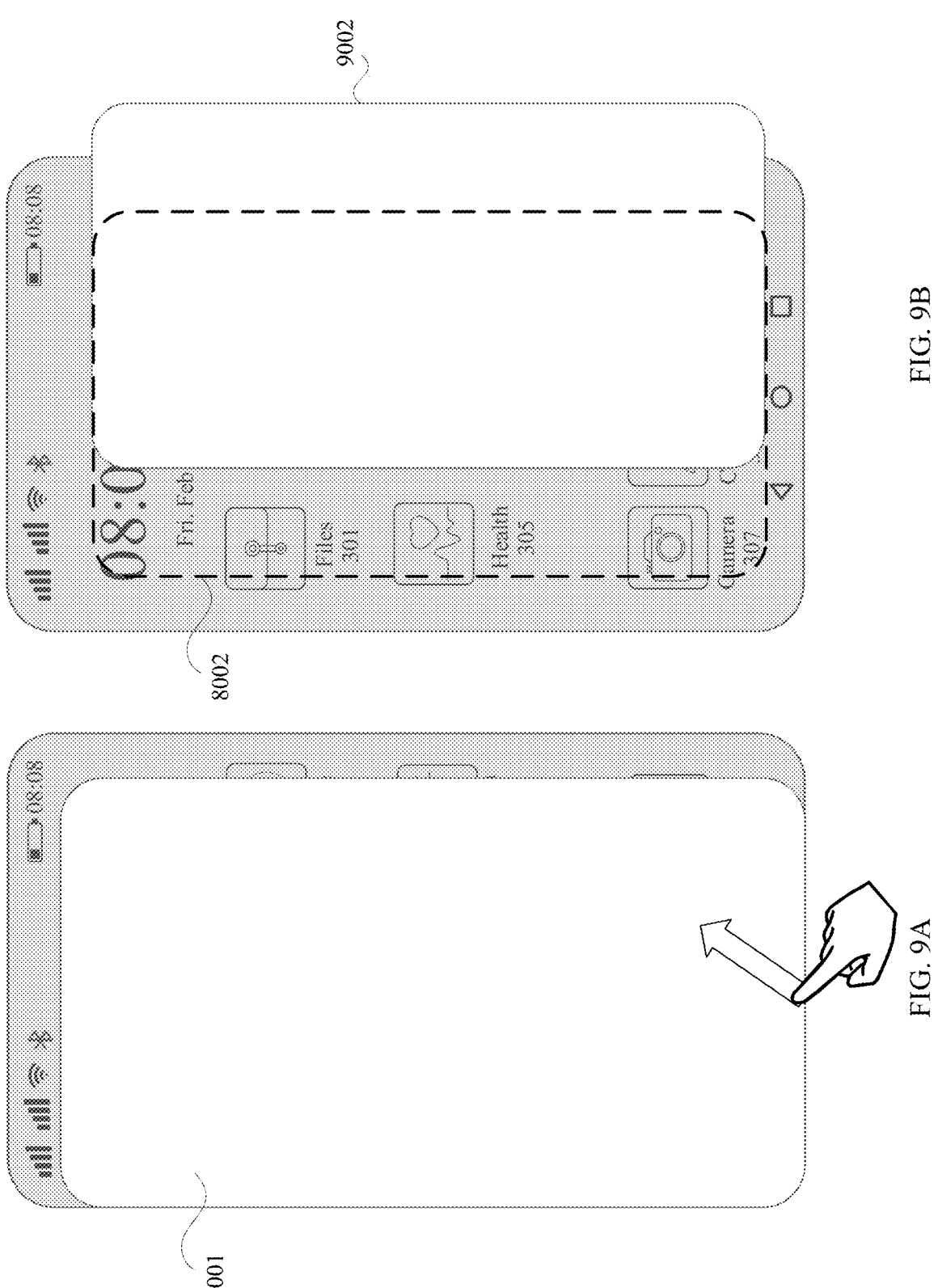
FIG. 9A to FIG. 9F are an example of UI diagrams of an application scenario corresponding to an operation for exiting a first application that is a sliding operation toward the top right of a screen of an electronic device performed on a lower edge of the screen.

For example, as shown in FIG. 9A, an image frame 9001 in FIG. 9A is the last image frame in a starting animation of the first application played by the electronic device 100. The electronic device 100 receives and responds to the sliding operation of a user toward the top right of the screen of the electronic device 100 performed on the lower edge of the screen, and the electronic device 100 plays an exiting animation of the first application.

The electronic device 100 displays an image frame 9002 shown in FIG. 9B, and the image frame 9002 may be the first image frame in the exiting animation. Image content of the image frame 9002 may not show any element, or may show one or more elements. This is not limited herein in this disclosure. As shown in FIG. 9B, compared with the image frame 8002, the image frame 9002 is shifted to a right side of the screen of the electronic device 100.

In addition, the electronic device 100 displays the image frame 9001 and the image frame 9002 in a window drawn by a same animationLeash object. The image frame 9001 is the last image frame in the starting animation. The image frame 9002 is the first image frame in the exiting animation. Therefore, a transition is smooth when the electronic device 100 switches from the starting animation to the exiting animation.

It should be noted that the electronic device 100 does not display a part of image at a right edge of the image frame 9002 that goes beyond a right edge of the electronic device 100, and the electronic device 100 displays only a part of image between a left edge of the image frame 9002 and the right edge of the electronic device 100.

In some embodiments, the image frame 9002 is shifted to the right side of the screen of the electronic device 100, and with a maximum shift, the right edge of the image frame 9002 coincide with the right side of the screen of the electronic device 100. The shift of the image frame 9002 to the right side of the screen of the electronic device 100 is not limited in this disclosure.

Figures 9C, 9D:
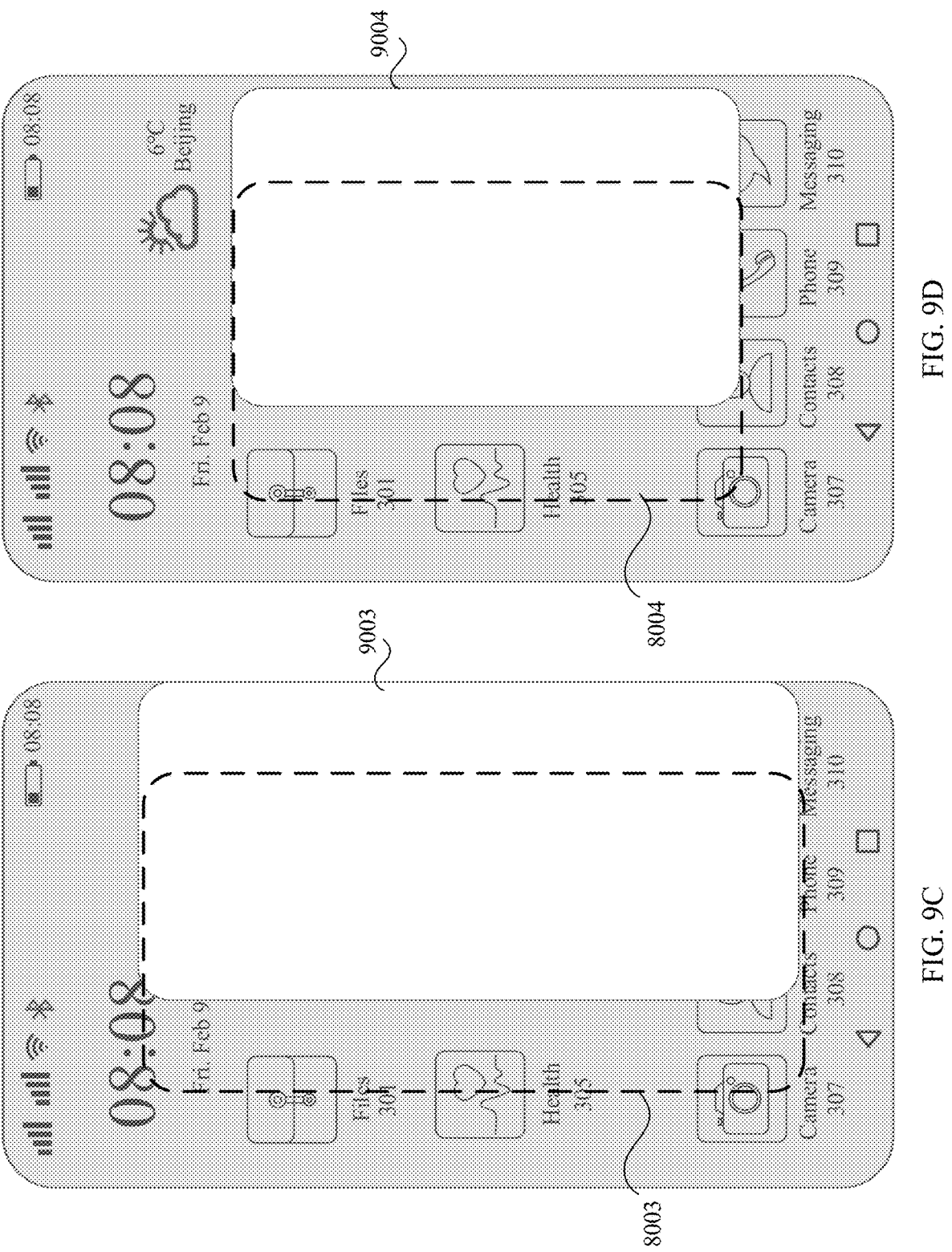

A size of the image frame 9002 gradually decreases, and the electronic device 100 displays an image frame 9003 shown in FIG. 9C, and the image frame 9003 may be the second image frame in the exiting animation. Image content of the image frame 9003 may not show any element, or may show one or more elements. This is not limited herein in this disclosure. As shown in FIG. 9C, compared with the image frame 8003, the image frame 9003 is shifted to the right side of the screen of the electronic device 100.

A size of the image frame 9003 gradually decreases, and the electronic device 100 displays an image frame 9004 shown in FIG. 9D, and the image frame 9004 may be the third image frame in the exiting animation. Image content of the image frame 9004 may not show any element, or may show one or more elements. This is not limited herein in this disclosure. As shown in FIG. 9D, compared with the image frame 8004, the image frame 9004 is shifted to the right side of the screen of the electronic device 100.

Figure 9E:
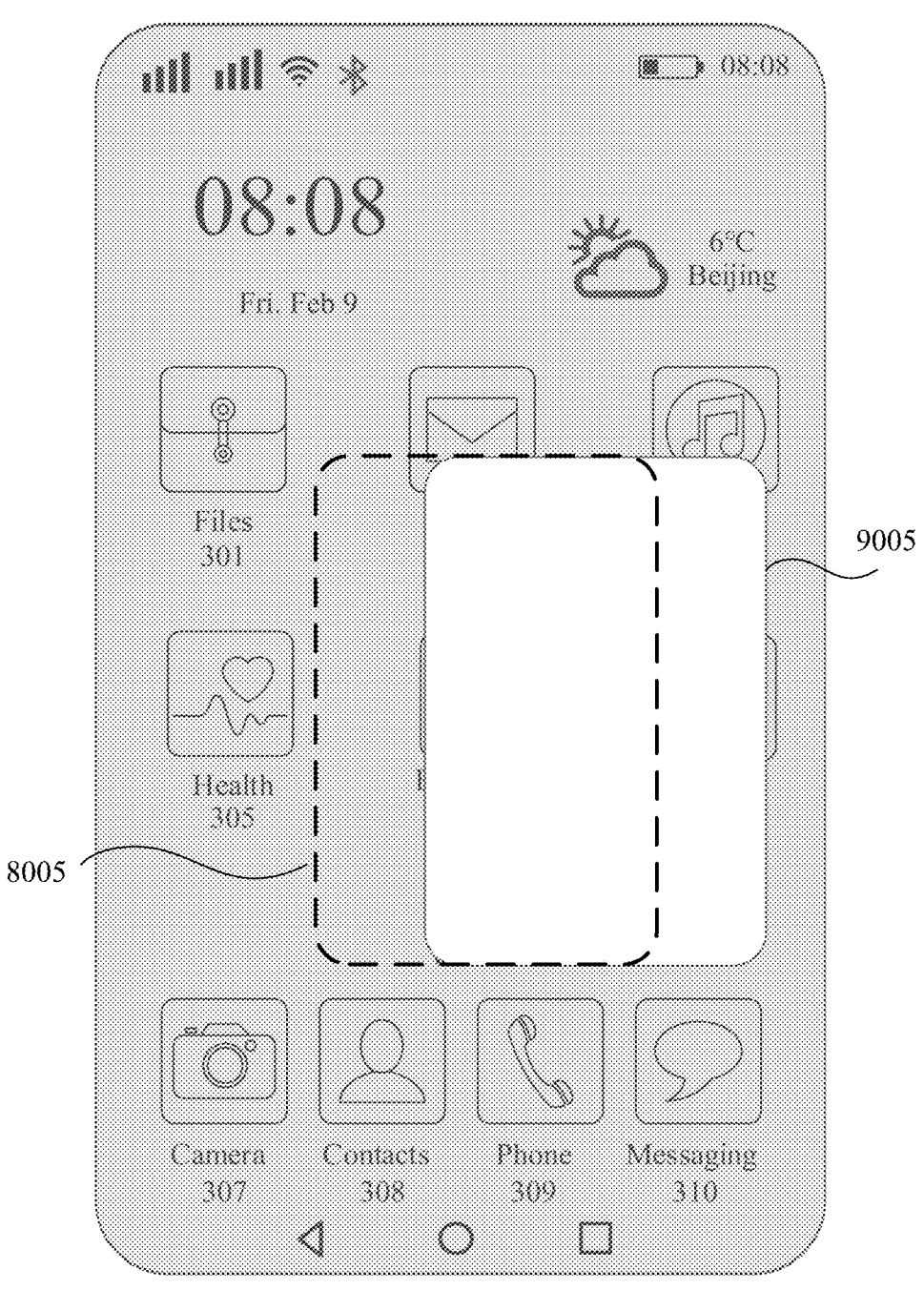

A size of the image frame 9004 gradually decreases, and the electronic device 100 displays an image frame 9005 shown in FIG. 9E, and the image frame 9005 may be the fourth image frame in the exiting animation. Image content of the image frame 9005 may not show any element, or may show one or more elements. This is not limited herein in this disclosure. As shown in FIG. 9E, compared with the image frame 8005, the image frame 9005 is shifted to the right side of the screen of the electronic device 100.

A size of the image frame 9005 gradually decreases, and the electronic device 100 displays an image frame 8006 shown in FIG. 8F, and the image frame 8006 may be the fifth image frame in the exiting animation. A size of the image frame 8006 is greater than a size of an icon of HUAWEI Video, and displayed image content of the image frame 8006 is image content of the icon of HUAWEI Video. Image content of the image frame 8006 may not show any element, or may show one or more elements. This is not limited herein in this disclosure.

The size of the image frame 8006 gradually decreases, and the electronic device 100 displays an image frame 8007 shown in FIG. 8G, and the image frame 8007 may be the sixth image frame in the exiting animation. A size of the image frame 8007 is the same as the size of the icon of HUAWEI Video, and displayed image content of the image frame 8007 is the image content of the icon of HUAWEI Video. Image content of the image frame 8007 may not show any element, or may show one or more elements. This is not limited herein in this disclosure.

It can be understood that FIG. 9A to FIG. 9E, FIG. 8F, and FIG. 8G show only some accompanying drawings for showing the exiting animation, and may further include more accompanying drawings. Some accompanying drawings are omitted in FIG. 9A to FIG. 9E, FIG. 8F, and FIG. 8G. This is not limited herein in this disclosure.

Figure 9F:
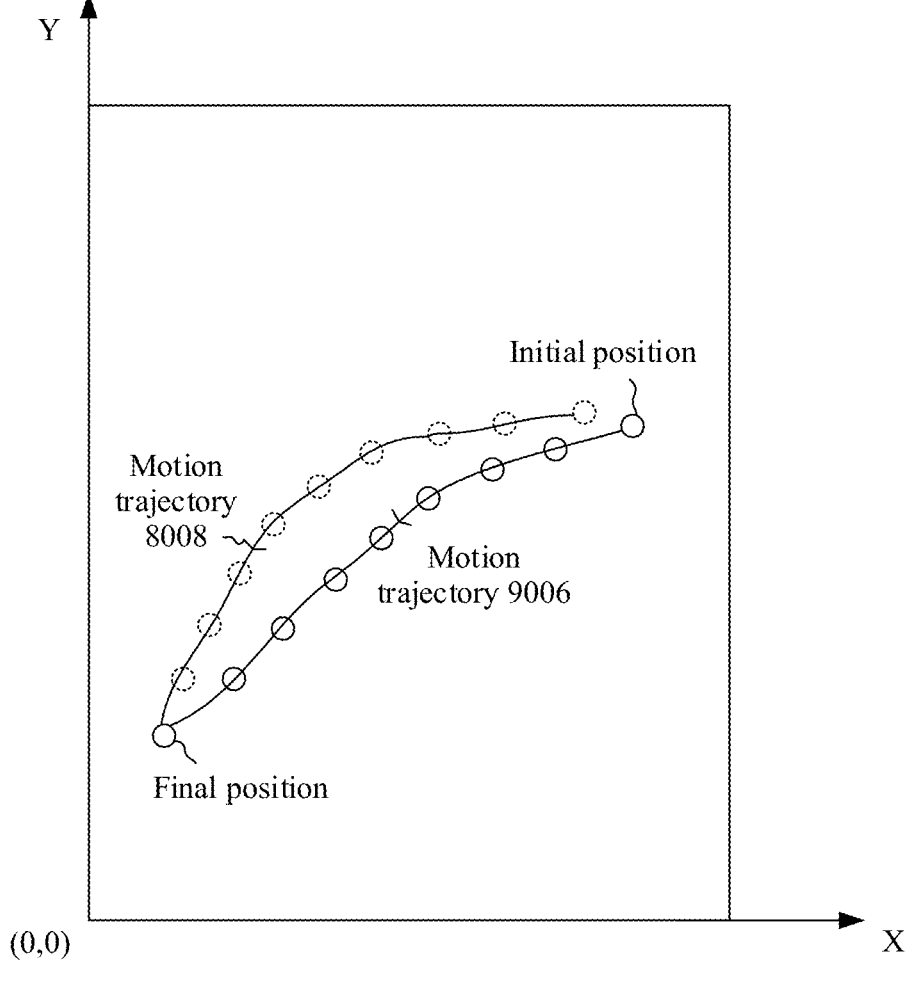

FIG. 9F shows a diagram of an example of a motion trajectory of center points of image frames shown in FIG. 9A to FIG. 9E, FIG. 8F, and FIG. 8G in the foregoing exiting animation.

An initial position is a position of the center point of the image frame shown in FIG. 9A. Then, the center points of the image frames shown in FIG. 9A to FIG. 9E, FIG. 8F, and FIG. 8G gradually move from the initial position to a final position on the motion trajectory 9006. The final position is a position of the center point of the image frames shown in FIG. 8F and FIG. 8G.

As shown in FIG. 9F, when the operation of exiting the first application is the sliding operation toward the top right of the screen of the electronic device 100 performed on the lower edge of the screen, a motion trajectory of a center point of an image frame in the exiting animation is the trajectory 9006. When the operation of exiting the first application is a sliding operation toward the top right of the screen of the electronic device 100 performed on and perpendicular to the lower edge of the screen, the motion trajectory of the center point of the image frame in the exiting animation is the trajectory 8008. It can be learned that, compared with the trajectory 8008, overall, the trajectory 9006 is shifted to the right side of the screen of the electronic device 100.

FIG. 10A to FIG. 10F are an example of UI diagrams of an application scenario corresponding to an operation for exiting a first application that is a sliding operation toward the top left of a screen of an electronic device 100 performed on a lower edge of the screen.

Figures 10A, 10B:
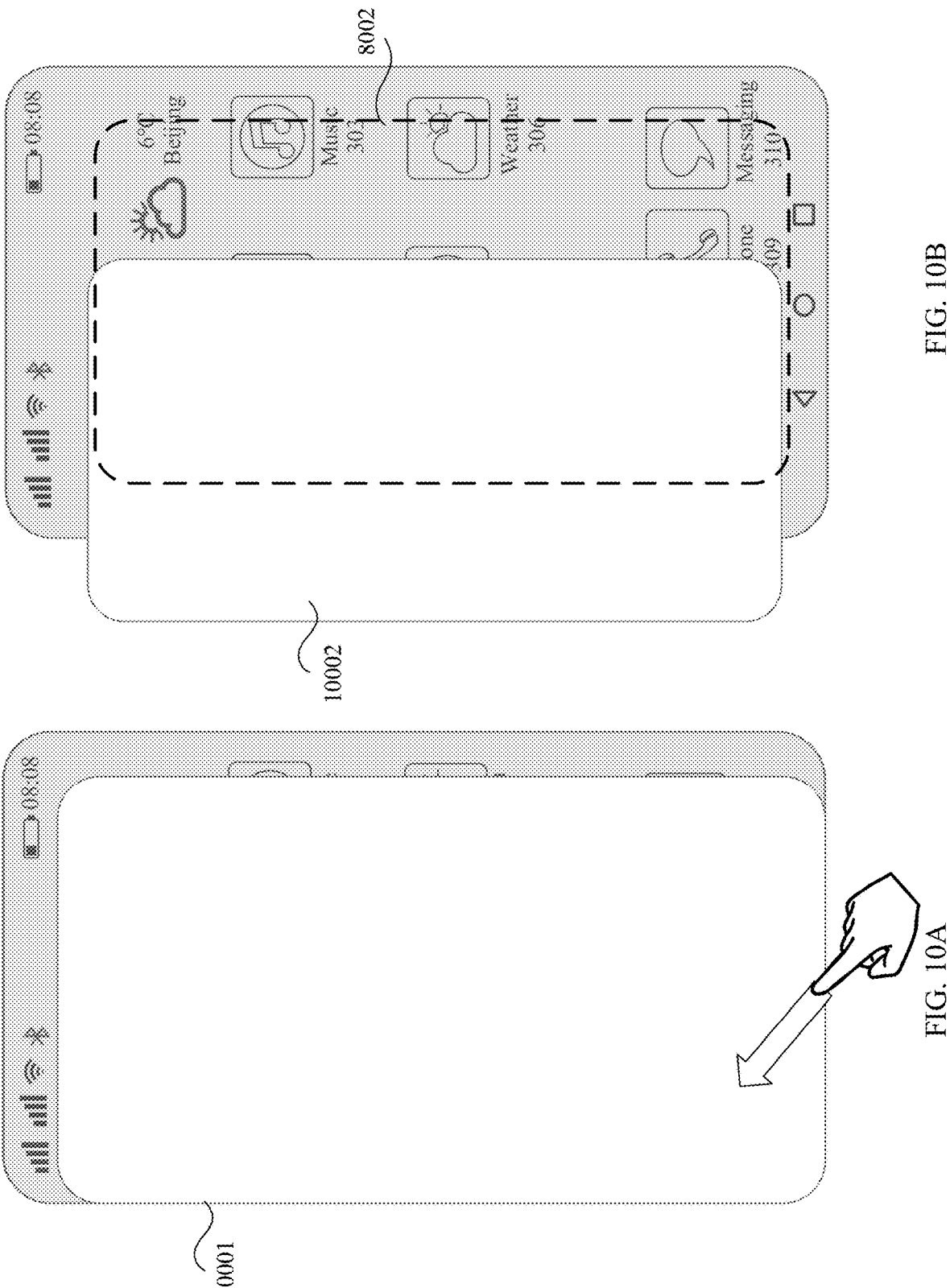
FIG. 10A to FIG. 10F are an example of UI diagrams of an application scenario corresponding to an operation for exiting a first application that is a sliding operation toward the top left of a screen of an electronic device performed on a lower edge of the screen.

For example, as shown in FIG. 10A, an image frame 10001 in FIG. 10A is the last image frame in a starting animation of the first application played by the electronic device 100. The electronic device 100 receives and responds to the sliding operation of a user toward the top left of the screen of the electronic device 100 performed on the lower edge of the screen, and the electronic device 100 plays an exiting animation of the first application.

The electronic device 100 displays an image frame 10002 shown in FIG. 10B, and the image frame 10002 may be the first image frame in the exiting animation. Image content of the image frame 10002 may not show any element, or may show one or more elements. This is not limited herein in this disclosure. As shown in FIG. 10B, compared with the image frame 8002, the image frame 10002 is shifted to a left side of the screen of the electronic device 100.

In addition, the electronic device 100 displays the image frame 10001 and the image frame 10002 in a window drawn by a same animationLeash object. The image frame 10001 is the last image frame in the starting animation. The image frame 10002 is the first image frame in the exiting animation. Therefore, a transition is smooth when the electronic device 100 switches from the starting animation to the exiting animation.

It should be noted that the electronic device 100 does not display a part of image at a left edge of the image frame 10002 that goes beyond a left edge of the electronic device 100, and the electronic device 100 displays only a part of image between a right edge of the image frame 10002 and the left edge of the electronic device 100.

In some embodiments, the image frame 10002 is shifted to the left side of the screen of the electronic device 100, and with a maximum shift, the left edge of the image frame 10002 coincide with the left side of the screen of the electronic device 100. The shift of the image frame 10002 to the left side of the screen of the electronic device 100 is not limited in this disclosure.

Figures 10C, 10D:
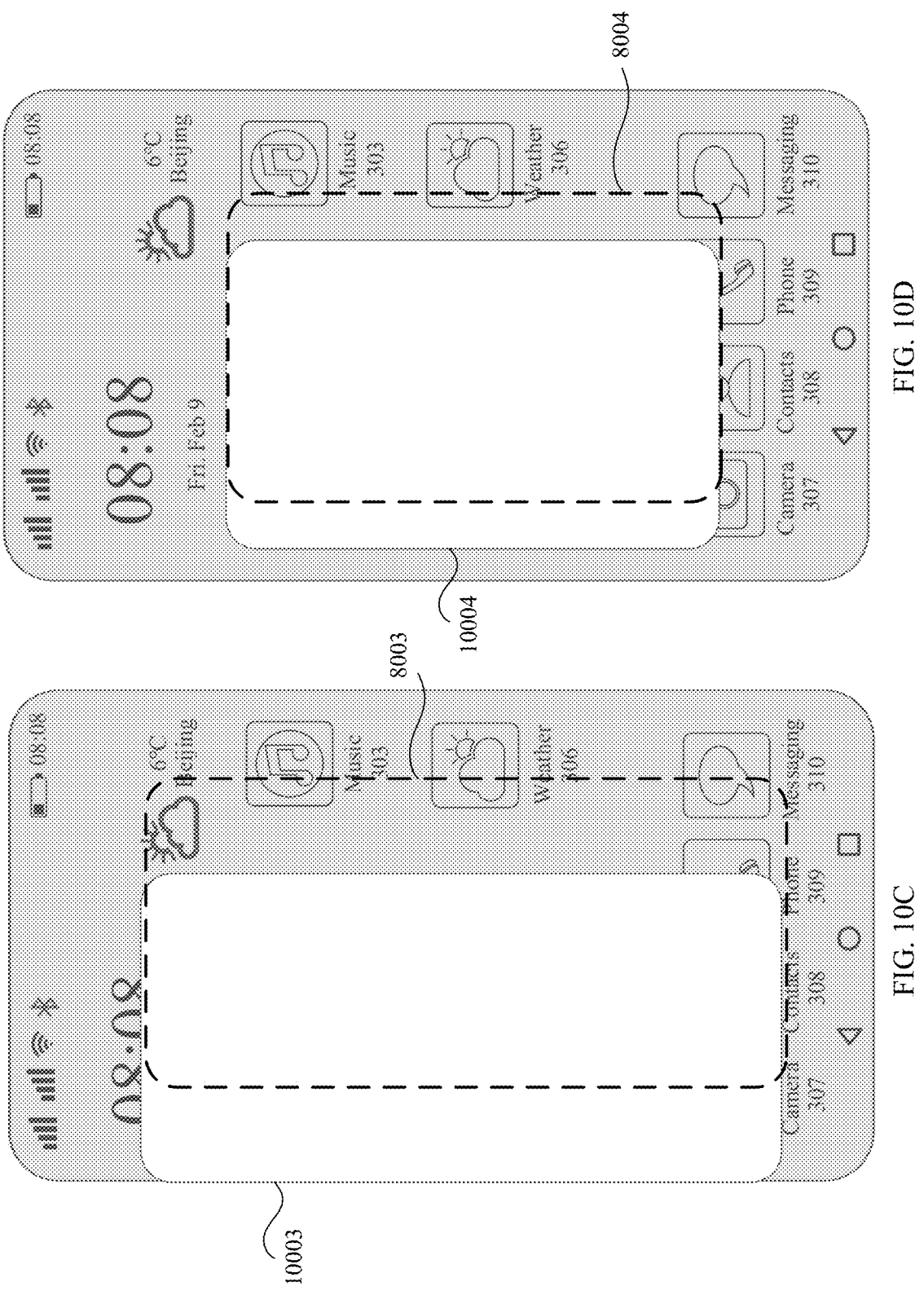

A size of the image frame 10002 gradually decreases, and the electronic device 100 displays an image frame 10003 shown in FIG. 10C, and the image frame 10002 may be the second image frame in the exiting animation. Image content of the image frame 10003 may not show any element, or may show one or more elements. This is not limited herein in this disclosure. As shown in FIG. 10C, compared with the image frame 8003, the image frame 10003 is shifted to the left side of the screen of the electronic device 100.

A size of the image frame 10003 gradually decreases, and the electronic device 100 displays an image frame 10004 shown in FIG. 10D, and the image frame 10004 may be the third image frame in the exiting animation. Image content of the image frame 10004 may not show any element, or may show one or more elements. This is not limited herein in this disclosure. As shown in FIG. 10D, compared with the image frame 8004, the image frame 10004 is shifted to the left side of the screen of the electronic device 100.

Figure 10E:
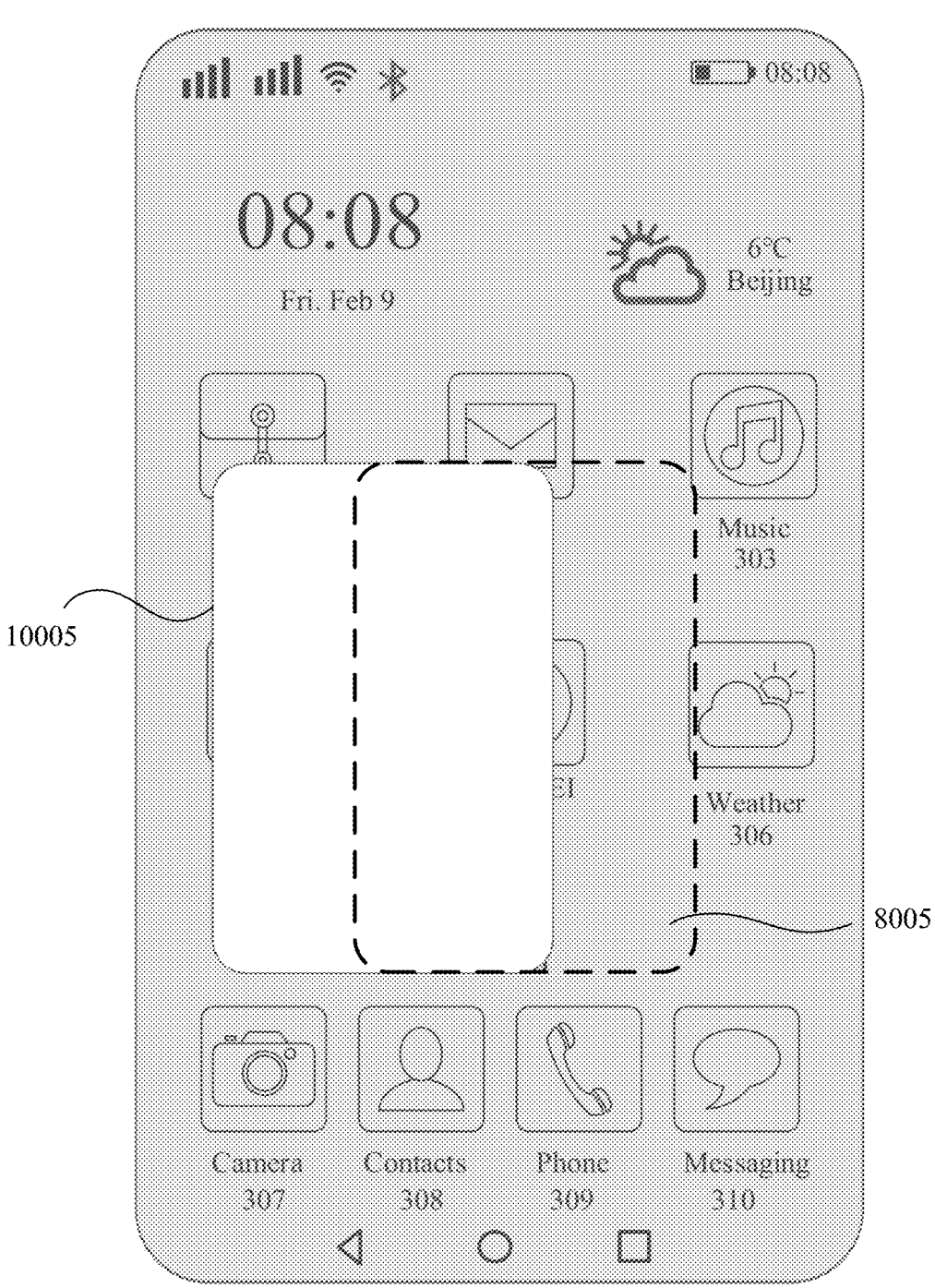

A size of the image frame 10004 gradually decreases, and the electronic device 100 displays an image frame 10005 shown in FIG. 10E, and the image frame 10005 may be the fourth image frame in the exiting animation. Image content of the image frame 10005 may not show any element, or may show one or more elements. This is not limited herein in this disclosure. As shown in FIG. 10E, compared with the image frame 8005, the image frame 10005 is shifted to the left side of the screen of the electronic device 100.

A size of the image frame 10005 gradually decreases, and the electronic device 100 displays an image frame 8006 shown in FIG. 8F, and the image frame 8006 may be the fifth image frame in the exiting animation. A size of the image frame 8006 is greater than a size of an icon of HUAWEI Video, and displayed image content of the image frame 8006 is image content of the icon of HUAWEI Video. Image content of the image frame 8006 may not show any element, or may show one or more elements. This is not limited herein in this disclosure.

The size of the image frame 8006 gradually decreases, and the electronic device 100 displays an image frame 8007 shown in FIG. 8G, and the image frame 8007 may be the sixth image frame in the exiting animation. A size of the image frame 8007 is the same as the size of the icon of HUAWEI Video, and displayed image content of the image frame 8007 is the image content of the icon of HUAWEI Video. Image content of the image frame 8007 may not show any element, or may show one or more elements. This is not limited herein in this disclosure.

It can be understood that FIG. 10A to FIG. 10E, FIG. 8F, and FIG. 8G show only some accompanying drawings for showing the exiting animation, and may further include more accompanying drawings. Some accompanying drawings are omitted in FIG. 10A to FIG. 10E, FIG. 8F, and FIG. 8G. This is not limited herein in this disclosure.

Figure 10F:
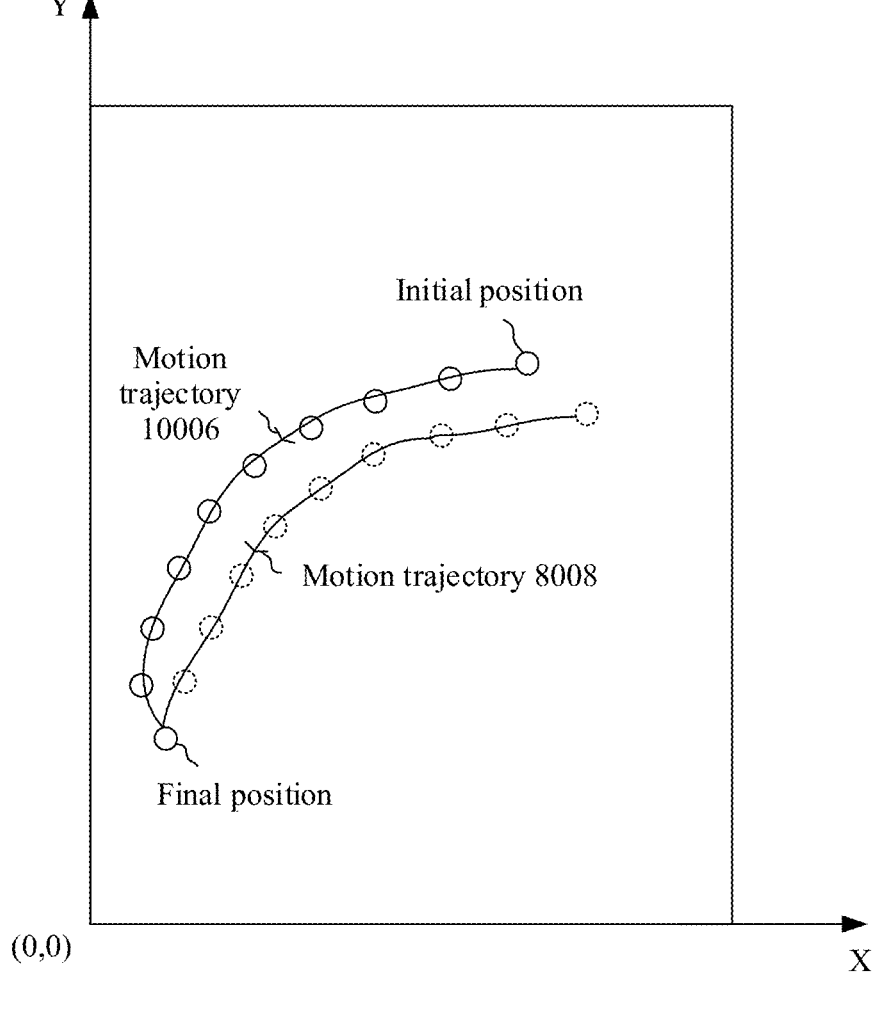

FIG. 10F shows a diagram of an example of a motion trajectory of center points of image frames shown in FIG. 10A to FIG. 10E, FIG. 8F, and FIG. 8G in the foregoing exiting animation.

An initial position is a position of the center point of the image frame shown in FIG. 10A. Then, the center points of the image frames shown in FIG. 10A to FIG. 10E, FIG. 8F, and FIG. 8G gradually move from the initial position to a final position on the motion trajectory 10006. The final position is a position of the center point of the image frames shown in FIG. 8F and FIG. 8G.

As shown in FIG. 10F, when the operation of exiting the first application is the sliding operation toward the top left of the screen of the electronic device 100 performed on the lower edge of the screen, a motion trajectory of a center point of an image frame in the exiting animation is the trajectory 10006. When the operation of exiting the first application is a sliding operation toward the top right of the screen of the electronic device 100 performed on and perpendicular to the lower edge of the screen, the motion trajectory of the center point of the image frame in the exiting animation is the trajectory 8008. It can be learned that, compared with the trajectory 8008, overall, the trajectory 10006 is shifted to the left side of the screen of the electronic device 100.

How the electronic device 100 performs animation calculation is described below.

As mentioned in the foregoing explanation of terms, animation calculation refers to calculating parameter information of each image frame in a starting animation or an exiting animation. In an embodiment of this disclosure, parameter information of a next image frame is calculated according to an interpolation algorithm based on initial parameter information of the image frame in the starting animation or the exiting animation.

First, how the electronic device 100 calculates, according to the interpolation algorithm based on the initial parameter information of the image frame in the starting animation, parameter information of a next image frame in the starting animation is described.

It is assumed that the starting animation of an application includes M image frames, and the initial parameter information of the image frame in the starting animation is preset. For example, the initial parameter information of the image frame in the starting animation is parameter information, for example, a window size, display time, a display position, transparency, and a display element of the first image frame in the starting animation. The initial parameter information of the image frame may further include more other information. This is not limited herein in this disclosure.

In some embodiments, the parameter information of the first image frame may be consistent with parameter information of an icon of a first application. That is, the window size of the first image frame is the same as a size of the icon of the first application, the display position of the first image frame is a display position of the icon of the first application, and the display element of the first image frame is the same as a display element of the icon of the first application.

In some other embodiments, the parameter information of the first image frame may alternatively be inconsistent with the parameter information of the icon of the first application. This is not limited herein in this disclosure.

The electronic device 100 receives an operation of a user for starting the first application, and the electronic device 100 starts to play a starting animation of the first application. The electronic device 100 may obtain the parameter information of the next image frame according to the interpolation algorithm based on the parameter information of the current image frame.

Further, the electronic device 100 obtains the initial parameter information of the image frame in the starting animation. The initial parameter information of the image frame in the starting animation may be the parameter information of the first image frame in the starting animation. The electronic device 100 may obtain parameter information of the second image frame in the starting animation according to the interpolation algorithm based on the parameter information of the first image frame in the starting animation. By analogy, the electronic device 100 may obtain parameter information of the third image frame in the starting animation according to the interpolation algorithm based on the parameter information of the second image frame in the starting animation. The electronic device 100 may obtain parameter information of an $N^{th}$ image frame in the starting animation according to the interpolation algorithm based on parameter information of an $(N-1)^{th}$ image frame in the starting animation, and so on, until the electronic device 100 obtains parameter information of an $M^{th}$ image frame in the starting animation according to the interpolation algorithm based on parameter information of an $(M-1)^{th}$ image frame in the starting animation.

How the electronic device 100 calculates, according to the interpolation algorithm based on the initial parameter information of the image frame in the exiting animation, parameter information of a next image frame in the starting animation is described below.

It is assumed that the exiting animation of the application includes M image frames. If the electronic device 100 receives an operation of a user for exiting the first application after the starting animation ends, the initial parameter information of the image frame in the exiting animation is the parameter information of the $M^{th}$ image frame in the starting animation that has been obtained by the electronic device 100 through calculation. If the electronic device 100 receives an operation of a user for exiting the first application before the starting animation ends (for example, the starting animation is played to the $N^{th}$ image frame, where N is less than M), the initial parameter information of the image frame in the exiting animation is the parameter information of the $N^{th}$ image frame in the starting animation currently displayed on the electronic device 100.

If the electronic device 100 receives the operation of the user for exiting the first application before the starting animation ends (for example, the starting animation is played to the $N^{th}$ image frame), the electronic device 100 starts to play the exiting animation of the first application. The electronic device 100 may obtain the parameter information of the next image frame according to the interpolation algorithm based on the parameter information of the current image frame.

Further, the electronic device 100 obtains the initial parameter information of the image frame in the exiting animation. The initial parameter information of the image frame in the exiting animation may be parameter information of the first image frame in the exiting animation, or the initial parameter information of the image frame in the exiting animation may be parameter information of the $N^{th}$ image frame in the starting animation. The electronic device 100 may obtain, according to the interpolation algorithm based on the initial parameter information of the image frame in the exiting animation, information of the second image frame in image frames in the exiting animation. By analogy, the electronic device 100 may obtain, according to the interpolation algorithm based on the information of the second image frame in the image frames in the exiting animation, information of the third image frame in the image frames in the exiting animation, until the electronic device 100 may obtain, according to the interpolation algorithm based on information of an $(N-1)^{th}$ image frame in the image frames in the exiting animation, the information of the $N^{th}$ image frame in the image frames in the exiting animation.

A principle of the interpolation algorithm is described below. To be specific, how the electronic device 100 obtains parameter information of a next image frame according to the interpolation algorithm based on parameter information of a current image frame in an animation is described.

In the interpolation algorithm, with different values of a parameter, the parameter information of the next image frame obtained by the electronic device 100 based on the parameter information of the current image frame in the animation have different values. In this case, animation curves obtained by the electronic device 100 by playing the animation are also different.

Figures 11A, 11B, 11C:
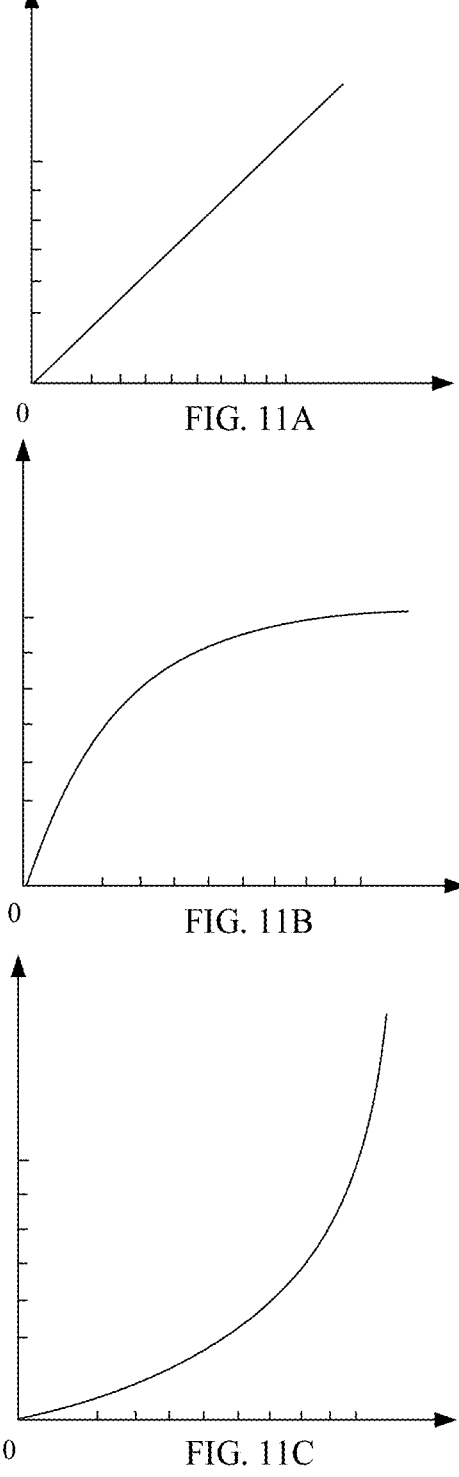
FIG. 11A, FIG. 11B, and FIG. 11C are schematic diagrams of an example of effect of animation curves in several interpolation algorithms.

For example, as shown in FIGS. 11A, 11B, and 11C, FIGS. 11A, 11B, and 11C are schematic diagrams of an example of effect of animation curves in several interpolation algorithms.

As shown in FIG. 11A, FIG. 11A shows an example of a first uniform-motion animation curve. That is, time for switching between any two adjacent image frames in a starting animation or an exiting animation played by an electronic device 100 is the same.

As shown in FIG. 11B, FIG. 11B shows an example of a second decelerated-motion animation. That is, time for switching between two adjacent image frames in order from the first to the last in the starting animation or the exiting animation played by the electronic device 100 decreases progressively.

As shown in FIG. 11C, FIG. 11C shows an example of a third accelerated-motion animation. That is, time for switching between two adjacent image frames in order from the first to the last in the starting animation or the exiting animation played by the electronic device 100 increases progressively.

There may further be another type of animation curves, for example, a motion curve of slow in and slow out. This is not exhaustively listed in this disclosure.

The parameter information of the next image frame may be obtained based on the parameter information of the current image frame in the animation according to the interpolation algorithm by using the following formulas:

$$a = k \times x / m \qquad \text{Formula (1)}$$

$$V = v + a \times t \qquad \text{Formula (2)}$$

$$P = p + V \times t \qquad \text{Formula (3)}$$

As shown in Formula (1), Formula (2), and Formula (3), the parameter information of the next image frame may be obtained based on the parameter information of the current image frame according to the interpolation algorithm by using Formula (1), Formula (2), and Formula (3). In Formula (1), Formula (2), and Formula (3), a represents an acceleration, and k represents rigidity. According to the Hooke's law for springs, $k = -F/x$, where x represents a change in length from spring deformation, and F represents a force applied to generate x, the change in length from spring deformation. According to the Newtonian mechanics formula, F may be represented as $F = m \times a$, where m is the mass of an object. According to the formula $k = -F/x$ and the formula $F = m \times a$, the acceleration $a = -k \times x / m$ may be obtained.

v represents an initial speed of an object, V represents a speed of the object at a next moment, p represents an initial position of the object, P represents a position of the object at the next moment, and t indicates parameter information of which image frame in the starting animation or the exiting animation is currently calculated by an electronic device 100.

It should be noted that, when the electronic device 100 calculates parameter information of an image frame in the starting animation, v in Formula (3) is a positive number, and when the electronic device 100 calculates parameter information of an image frame in the exiting animation, v in Formula (3) is a negative number.

In this way, in the interpolation algorithm, the parameter information of the next image frame may be obtained by using the parameter information of the current image frame as an input p of Formula (3), and P is output according to Formula (3).

For example, the electronic device 100 is displaying the first image frame in the starting animation. The electronic device 100 needs to obtain parameter information of the second image frame within a fixed amount of time based on the parameter information of the first image frame, and the electronic device 100 obtains the second image frame through composition based on the parameter information of the second image frame.

If preset position information of the first image frame is (x, y), where x is a length of the first image frame, and y is a width of the first image frame. The electronic device 100 inputs the position information (x, y) of the first image frame to Formula (3), and outputs position information (x1, y1) of the second image frame according to Formula (3), where x1=x+v+k×x/m and y1=y+v+k×x/m. v is a positive number.

For example, the electronic device 100 is displaying an N$^{th}$ image frame in the starting animation, and the electronic device 100 receives an operation of a user for exiting a first application. The electronic device 100 needs to obtain parameter information of the first image frame in the exiting animation within a fixed amount of time based on the parameter information of the N$^{th}$ image frame. The electronic device 100 obtains, through composition, and displays the first image frame in the exiting animation based on the parameter information of the first image frame in the exiting animation.

If preset position information of the N$^{th}$ image frame in the starting animation is (x, y), x is a length of the N$^{th}$ image frame in the starting animation, and y is a width of the N$^{th}$ image frame in the starting animation. The electronic device 100 inputs the position information (x, y) of the N$^{th}$ image frame in the starting animation to Formula (3), and outputs position information (x1, y1) of the second image frame in the exiting animation according to Formula (3), where x1=x+v+k×x/m and y1=y+v+k×x/m. v is a negative number.

For ease of understanding this disclosure, in an embodiment of this disclosure, an execution effect of the interpolation algorithm is described with a uniform-motion animation curve.

When the animation curve is the uniform-motion animation curve, in Formula (1), Formula (2), and Formula (3), a=0, and v is a fixed value. When the electronic device 100 calculates the parameter information of the image frame in the starting animation, v is a positive number, and when the electronic device 100 calculates the parameter information of the image frame in the exiting animation, v is a negative number.

In this case, the parameter information of the next image frame may be obtained based on the parameter information of the current image frame according to the interpolation algorithm by using the following formula:

$$P=p+v×t \hfill \text{Formula (4)}$$

As shown in Formula (4), P represents an initial position of an object, p represents a position of the object at a next moment, and t represents time. In this way, the physical engine may obtain the parameter information of the next image frame by using the parameter information of the current image frame as an input p of Formula (3), and output P according to Formula (3).

For example, the electronic device 100 is displaying the first image frame in the starting animation. The electronic device 100 needs to obtain parameter information of the second image frame within a fixed amount of time based on the parameter information of the first image frame, and the electronic device 100 obtains the second image frame through composition based on the parameter information of the second image frame.

If position information of the first image frame is (x, y), x is a preset length of the first image frame, and y is a preset width of the first image frame. A surfaceflinger module inputs the position information (x, y) of the first image frame to Formula (3), and outputs target position information (x1, y1) of the second image frame according to Formula (3), where x1=x+v and y1=y+v.

For example, the electronic device 100 is displaying an N$^{th}$ image frame in the starting animation, where position information of the N$^{th}$ image frame in the starting animation is (x+Nv, y+Nv), and the electronic device 100 receives an operation of a user for exiting a first application. The electronic device 100 needs to obtain parameter information of the first image frame in the exiting animation within a fixed amount of time based on the parameter information of the N$^{th}$ image frame. The electronic device 100 obtains, through composition, and displays the first image frame in the exiting animation based on the parameter information of the first image frame in the exiting animation.

If preset position information of the N$^{th}$ image frame in the starting animation is (x+N×v, y+N×v), where x+N×v is a length of the N$^{th}$ image frame in the starting animation, and y+N×v is a width of the N$^{th}$ image frame in the starting animation. The electronic device 100 inputs the position information (x+Nv, y+Nv) of the N$^{th}$ image frame in the starting animation to Formula (3), and outputs position information (x1, y1) of the first image frame in the exiting animation according to Formula (3), where x1=x+N×v−v and y1=y+N×v−v.

In this way, the electronic device 100 may obtain the parameter information of the next image frame according to the interpolation algorithm based on the parameter information of the currently displayed image frame in the starting animation or the exiting animation. The electronic device 100 obtains the next image frame through composition based on the parameter information of the next image frame and displays the next image frame on a display. In this way, the electronic device 100 reuses an animationLeash object used in a starting process for the exiting animation, so that there is no sudden change when the starting animation is switched to the exiting animation, and the electronic device 100 plays the animation smoothly.

Figure 12A:
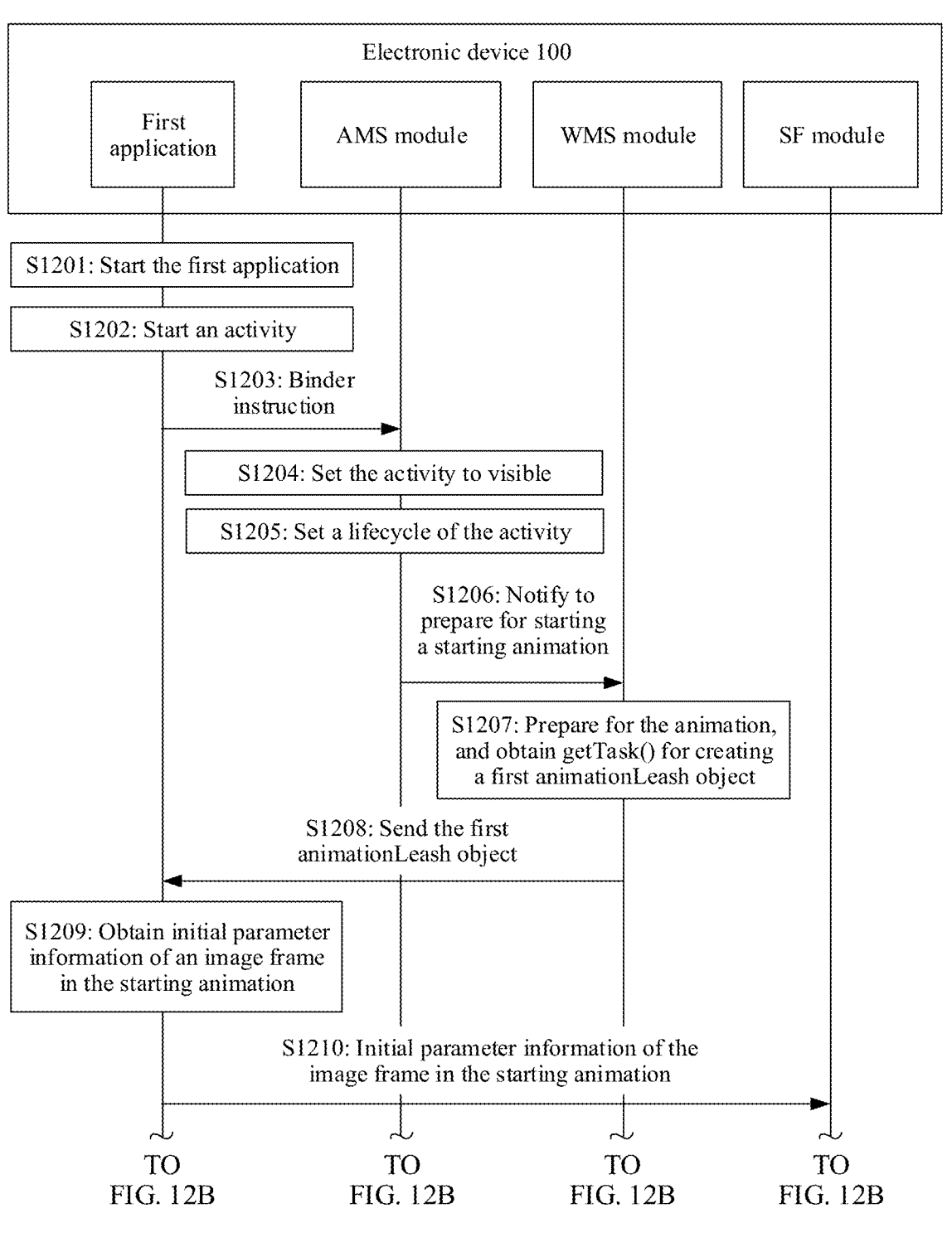
FIG. 12A and FIG. 12B are another schematic diagram of playing a starting animation and playing an exiting animation by an electronic device according to an embodiment of this disclosure.
Figure 12B:
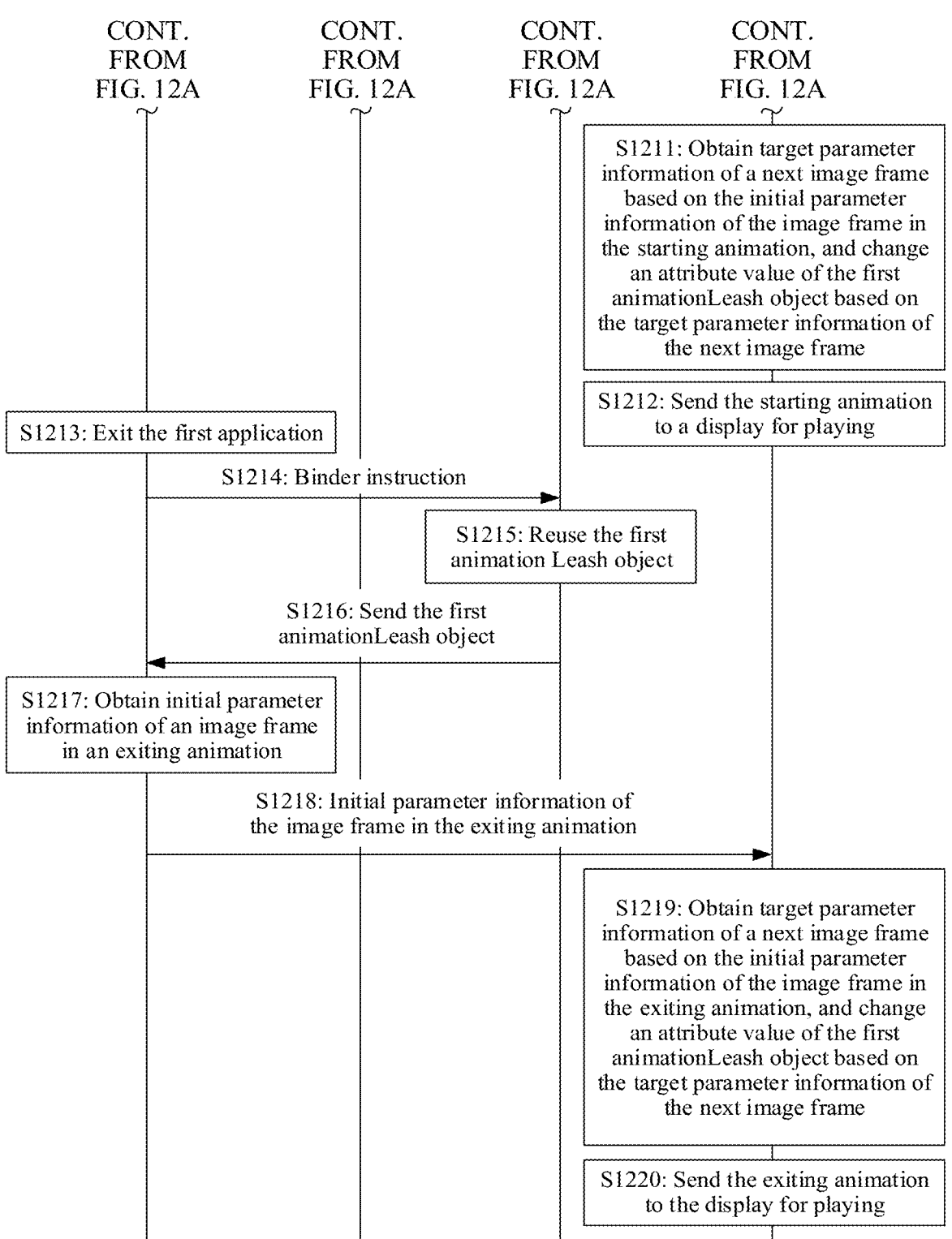

As shown in FIG. 12A and FIG. 12B, FIG. 12A and FIG. 12B are another schematic diagram of an example of an electronic device 100 playing a starting animation and playing an exiting animation.

A flowchart shown in FIG. 12A and FIG. 12B includes a first application, an AMS module, a WMS module, and an SF module.

In some embodiments, the surfaceflinger module may not be included in the flowchart shown in FIG. 12A and FIG. 12B. This is not limited herein in this disclosure.

First, the electronic device 100 receives an operation of a user for starting the first application, and the electronic device 100 creates a first animationLeash object by using the AMS module and the WMS module in response to the operation of the user for starting the first application. Then, the WMS module sends an identifier of the first animation-Leash object to the first application. After the first application receives the identifier of the first animationLeash object, the first application starts the starting animation.

Further, a method procedure in which the AMS module and the WMS module create the first animationLeash object is described in S1001 to S1008. It should be noted that, the method procedure in which the AMS module and the WMS module create the first animationLeash object may include more or fewer steps than S1001 to S1008. This is not limited herein in this disclosure. In addition, an execution order of each step in S1001 to S1008 is not limited in this disclosure.

S1201: The first application is started.

S1202: The first application starts an activity.

S1203: The first application sends a binder instruction to the AMS module.

S1204: The AMS module sets the activity to visible.

S1205: The AMS module sets a lifecycle of the activity.

S1206: The AMS module sends, to the WMS module, a notification for preparing to start a starting animation.

S1207: The WMS module receives and responds to the notification, sent by the AMS module, for preparing to start the starting animation, and the WMS module prepares to start an animation and creates a first animationLeash object.

S1208: The WMS module sends the first animationLeash object to the first application.

After the first application receives the identifier of the first animationLeash object, the first application starts the starting animation. After the first application determines the parameter information of each image frame in the starting animation, the first application changes, based on the parameter information of each image frame in the starting animation, an attribute of a window drawn by the first animation-Leash object. The first application sends the parameter information of each image frame in the starting animation to the SF module, and the SF module obtains an image frame through composition. Then, the SF module displays the composite image frame in the window drawn by the first animationLeash object.

Alternatively, after the first application receives the identifier of the first animationLeash object, the first application notifies the SF module to start the starting animation. After the first application determines initial parameter information of an image frame in the starting animation, the first application sends the initial parameter information of the image frame in the starting animation to the SF module. The SF module determines the parameter information of each image frame in the starting animation based on the initial parameter information of the image frame in the starting animation, and obtains an image frame through composition based on the parameter information of each image frame in the starting animation. The SF module changes, based on the parameter information of each image frame in the starting animation, an attribute of a window drawn by the first animationLeash object. The SF module displays the composite image frame in the window drawn by the first animationLeash object.

Further, a method procedure showing how the first application plays the starting animation is described in S1009 to S1012. It should be noted that the method procedure showing how the first application plays the starting animation may include more or fewer steps than S1009 to S1012. This is not limited herein in this disclosure. In addition, an execution order of each step in S1009 to S1012 is not limited in this disclosure.

S1209: The first application obtains initial parameter information of an image frame in the starting animation.

S1210: The first application sends the initial parameter information of the image frame in the starting animation to the surfaceflinger module.

S1211: The surfaceflinger module obtains target parameter information of a next image frame based on the initial parameter information of the image frame in the starting animation, and changes an attribute value of the first animationLeash object based on the target parameter information of the next image frame.

S1212: The surfaceflinger module sends the starting animation to a display for playing.

The electronic device 100 receives an operation of a user for exiting the first application. The electronic device 100 may receive, in a process of playing the starting animation, the operation of the user for exiting the first application, or may receive, after the starting animation ends, the operation of the user for exiting the first application. This is not limited herein in this disclosure. In response to the operation of the user for exiting the first application, the electronic device 100 reuses the first animationLeash object by using the AMS module and the WMS module. Then, the WMS module sends an identifier of the first animationLeash object to the first application. After the first application receives the identifier of the first animationLeash object, the first application starts the exiting animation.

Further, a method procedure in which the AMS module and the WMS module create a second animationLeash object is described in S1213 to S1216. It should be noted that the method procedure in which the AMS module and the WMS module create the second animationLeash object may include more or fewer steps than S1213 to S1216. This is not limited herein in this disclosure. In addition, an execution order of each step in S1213 to S1216 is not limited in this disclosure.

S1213: The first application is exited.

S1214: The first application sends a binder instruction to the WMS module.

For detailed explanations of S1201 to S1214, refer to the embodiments in S501 to S514. Details are not described herein again in this disclosure.

S1215: The WMS module receives and responds to the binder instruction, and reuses the first animationLeash object.

The first animationLeash object is an animationLeash object created when the electronic device 100 plays the starting animation. The electronic device 100 continues to use the first animationLeash object when playing the exiting animation. In this way, the starting animation and the exiting animation can be one whole piece of animation, so that a problem that a transition is not smooth when the starting animation is switched to the exiting animation does not occur.

S1216: The WMS module sends the first animationLeash object to the first application.

After the first application receives the identifier of the first animationLeash object, the first application starts the exiting animation. After the first application determines the parameter information of each image frame in the exiting animation, the first application changes, based on the parameter information of each image frame in the exiting animation, an attribute of a window drawn by the first animationLeash object. The first application sends the parameter information of each image frame in the exiting animation to the SF module, and the SF module obtains an image frame through composition. Then, the SF module displays the composite image frame in the window drawn by the first animation-Leash object.

Alternatively, after the first application receives the identifier of the first animationLeash object, the first application notifies the SF module to start the exiting animation. After the first application determines initial parameter information of an image frame in the exiting animation, the first application sends the initial parameter information of the image frame in the exiting animation to the SF module. The SF module determines the parameter information of each image frame in the exiting animation based on the initial parameter information of the image frame in the exiting animation, and obtains an image frame through composition based on the parameter information of each image frame in the exiting animation. The SF module changes, based on the parameter information of each image frame in the exiting animation, an attribute of a window drawn by the first animationLeash object. The SF module displays the composite image frame in the window drawn by the first animationLeash object.

Further, a method procedure in which the AMS module and the WMS module reuse the first animationLeash object is described in S1217 to S1220. It should be noted that, the method procedure in which the AMS module and the WMS module create the first animationLeash object may include more or fewer steps than S1217 to S1220. This is not limited herein in this disclosure. In addition, an execution order of each step in S1217 to S1220 is not limited in this disclosure.

S1217: The first application obtains the initial parameter information of the image frame in the exiting animation.

First, the first application obtains the initial parameter information of the image frame in the exiting animation, and the initial parameter information of the image frame in the exiting animation is parameter information of the first image frame in the exiting animation. The first application may obtain parameter information of the second image frame in the exiting animation according to the interpolation algorithm based on the parameter information of the first image frame in the exiting animation. By analogy, the first application may obtain parameter information of the third image frame in the exiting animation according to the interpolation algorithm based on the parameter information of the second image frame in the exiting animation. The first application may obtain parameter information of an $N^{th}$ image frame in the exiting animation according to the interpolation algorithm based on parameter information of an $(N-1)^{th}$ image frame in the exiting animation, and so on, until the electronic device 100 obtains parameter information of an $M^{th}$ image frame in the exiting animation according to the interpolation algorithm based on parameter information of an $(M-1)^{th}$ image frame in the exiting animation. The exiting animation includes M image frames. That is, the first application obtains the parameter information of the next image frame according to the interpolation algorithm based on the parameter information of the currently displayed image frame.

In some embodiments, in a process in which the first application plays the starting animation, the electronic device 100 currently displays, for example, an $N^{th}$ image frame in the starting animation, and the electronic device 100 receives a second operation of exiting the first application. In this case, the initial parameter information of the image frame in the exiting animation obtained by the first application is parameter information of the $N^{th}$ image frame in the starting animation.

For details, refer to the embodiment of FIG. 13 below. Details are not described herein again in this disclosure.

S1218: The first application sends the initial parameter information of the image frame in the exiting animation to the surfaceflinger module.

S1219: The surfaceflinger module obtains target parameter information of a next image frame based on the initial parameter information of the image frame in the exiting animation, and changes the attribute value of the first animationLeash object based on the target parameter information of the next image frame.

In S1218 and S1219, the first application sends a task of animation calculation to the surfaceflinger module, and the surfaceflinger module performs animation calculation. In this way, a current problem of a jank frame that occurs when a UI thread processes animation calculation can be greatly improved.

Further, the surfaceflinger module creates a new animation processing thread based on an original thread, and the thread has a task of calculating all tasks of animation calculation processed by a UI thread on the electronic device 100.

Further, the surfaceflinger module receives the initial parameter information, sent by the first application, of the image frame in the exiting animation, and obtains the target parameter information of the next image frame through calculation based on the initial parameter information of the image frame in the exiting animation. The surfaceflinger module sends the target parameter information of the next image frame to the WMS module. The WMS module changes the attribute value of the first animationLeash object based on the target parameter information of the next image frame, and the WMS module draws a second window based on the attribute value of the first animationLeash object. For example, the target parameter information of the next image frame includes information, for example, a window size, display time, a display position, transparency, and a display element, of the next image frame, and the attribute value of the first animationLeash object also includes the information, for example, the window size, the display time, the display position, the transparency, and the display element.

It can be understood that the first animationLeash object may be a window displayed in a user interface on the electronic device 100 in a floating manner. Then, the surfaceflinger module sets an attribute of the "window" based on the initial parameter information of the image frame in the starting animation, so that the window can display an image according to a display order and a display status of a preset image frame in the starting animation.

S1220: The surfaceflinger module sends the exiting animation to the display for playing.

After obtaining the image frame through composition based on the updated parameter information of the image frame, the surfaceflinger module sends the composite image frame to the display for display.

How the electronic device 100 plays the exiting animation has been described in the foregoing explanation of technical terms. For details, refer to the foregoing embodiment. Details are not described herein again in this disclosure.

In some embodiments, S1218, S1219, and S1220 may alternatively be replaced with the following S1218 and S1219.

S1218: The first application obtains target parameter information of a next image frame based on the initial parameter information of the image frame in the exiting animation, and changes an attribute value of the first animationLeash object based on the target parameter information of the next image frame.

To be specific, the first application obtains the target parameter information of the next image frame through calculation based on the initial parameter information of the image frame in the exiting animation. The first application sends the target parameter information of the next image frame to the WMS module, the WMS module changes the attribute value of the first animationLeash object based on the target parameter information of the next image frame, and the WMS module draws the second window based on the attribute value of the first animationLeash object. For example, the target parameter information of the next image frame includes information, for example, a window size, display time, a display position, transparency, and a display element, of the next image frame, and the attribute value of the first animationLeash object also includes the information, for example, the window size, the display time, the display position, the transparency, and the display element.

It can be understood that the first animationLeash object may be a window displayed in a user interface on the electronic device 100 in a floating manner. Then, the surfaceflinger module sets an attribute of the "window" based on the initial parameter information of the image frame in the starting animation, so that the window can display an image according to a display order and a display status of a preset image frame in the starting animation.

S1219: The first application sends the exiting animation to the display for playing.

After obtaining the image frame through composition based on the updated parameter information of the image frame, the first application sends the composite image frame to the display for display.

How the electronic device 100 plays the exiting animation has been described in the foregoing explanation of technical terms. For details, refer to the foregoing embodiment. Details are not described herein again in this disclosure.

Figure 13:
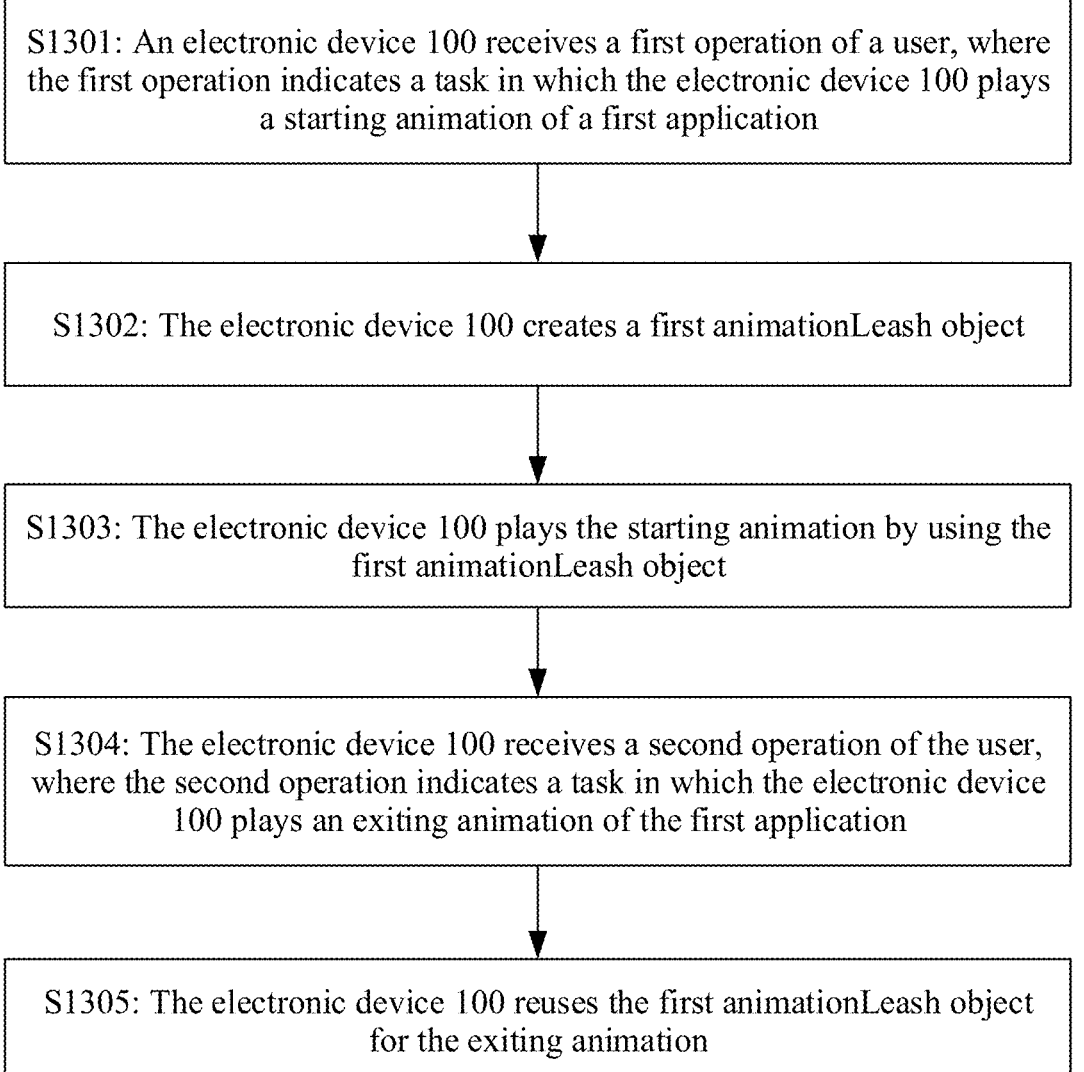
FIG. 13 is a flowchart of a method for animation transition in an application according to an embodiment of this disclosure.

As shown in FIG. 13, FIG. 13 is a flowchart of a method for animation transition in an application according to an embodiment of this disclosure.

S1301: An electronic device 100 receives a first operation of a user for a task of starting a first application and playing a starting animation (a first animation).

The first operation is an operation for starting the first application. The first operation may be an operation of tapping an icon of the first application. For example, the first operation may be an operation of tapping an icon 1013 of an application HUAWEI Video shown in FIG. 1G.

The first operation for starting the first application may be another operation. This is not limited herein in this disclosure.

S1302: The electronic device 100 creates a first animationLeash object.

The electronic device 100 receives the first operation of the user, and the electronic device 100 starts to play the starting animation. Before the electronic device 100 starts to play the starting animation, the electronic device 100 needs to create an animationLeash object (for example, the first animationLeash object), and the electronic device 100 performs the starting animation by using the first animationLeash object.

It can be understood that the first animationLeash object may be a "window" displayed in a user interface on the electronic device 100 in a floating manner. An attribute of the "window" is preset. Because parameter information of each image frame in the starting animation may be different, after obtaining the parameter information of each image frame, the electronic device 100 changes the attribute of the "window", so that the "window" may display the image frame in the user interface on the electronic device 100 based on the parameter information of each image frame.

S1303: The electronic device 100 plays the starting animation by using the first animationLeash object.

Further, first, the electronic device 100 needs to obtain parameter information of an image frame in the starting animation, and then the electronic device 100 draws a first window by using the first animationLeash object. The electronic device 100 changes an attribute of the first window based on the parameter information of the image frame in the starting animation, the electronic device 100 obtains the image frame through composition based on the parameter information of the image frame, and the electronic device 100 displays the image frame in the first window.

Before the electronic device 100 plays the starting animation by using the first animationLeash object, for a smoother animation, of image frames obtained by an animation thread through composition, displayed on a display, the electronic device 100 needs to determine parameter information of an interpolation algorithm, and the parameter information of the interpolation algorithm includes an animation type, an elastic strength, and the like. The animation type may be, for example, a uniform-motion animation type, a slow in and slow out animation type, or an accelerated-motion animation type. The coefficient of elasticity is rigidity k described in FIGS. 11A, 11B, and 11C. The parameter information of the interpolation algorithm may further include more other parameter information, for example, a damping coefficient. This is not limited herein in this disclosure.

It can be understood that parameter information of the interpolation algorithm for different applications may be the same or may be different. This is not limited herein in this disclosure.

Further, first, the electronic device 100 needs to obtain the parameter information of the image frame in the starting animation, and then the electronic device 100 obtains the image frame through composition by using the first animationLeash object based on the parameter information of the image frame. The electronic device 100 sends the image frame to the display for display.

The electronic device 100 obtains the parameter information of the image frame in the starting animation according to the interpolation algorithm.

First, the electronic device 100 obtains initial parameter information of an image frame in the starting animation. The initial parameter information of the image frame in the starting animation may be understood as parameter information of the first image frame in the starting animation. The electronic device 100 may obtain parameter information of the second image frame in the starting animation according to the interpolation algorithm based on the parameter information of the first image frame in the starting animation. By analogy, the electronic device 100 may obtain parameter information of the third image frame in the starting animation according to the interpolation algorithm based on the parameter information of the second image frame in the starting animation. The electronic device 100 may obtain parameter information of an $N^{th}$ image frame in the starting animation according to the interpolation algorithm based on parameter information of an $(N-1)^{th}$ image frame in the starting animation, and so on, until the electronic device 100 obtains parameter information of an Mt image frame in the starting animation according to the interpolation algorithm based on parameter information of an $(M-1)^{th}$ image frame in the starting animation. The starting animation includes M image frames. That is, the electronic device 100 obtains the parameter information of the next image frame according to the interpolation algorithm based on the parameter information of the currently displayed image frame.

This part of description has been described in detail in the foregoing embodiment. For details, refer to the descriptions in the foregoing embodiment. Details are not described herein again in this disclosure.

After the electronic device 100 obtains the parameter information of the image frame in the starting animation, the electronic device 100 obtains the image frame through composition by using the first animationLeash object based on the parameter information of the image frame, and then the electronic device 100 sends the image frame to the display for display. Further, refer to the embodiments shown in FIG. 1A to FIG. 1M, FIG. 2A to FIG. 2M, and FIG. 3A to FIG. 3E. Details are not described herein again in this disclosure.

S1304: The electronic device 100 receives a second operation of the user, where the second operation indicates a task in which the electronic device 100 plays an exiting animation (a second animation) of the first application.

The second operation is an operation for exiting the first application. The second operation may be a sliding operation toward the top of a screen of the electronic device 100 performed on a lower edge of the screen. For example, the second operation may be a sliding operation, shown in FIG. 8A, toward the top of the screen of the electronic device 100 performed on and perpendicular to the lower edge of the screen, the second operation may be a sliding operation, shown in FIG. 9A, toward the top right of the screen of the electronic device 100 performed on and perpendicular to the lower edge of the screen, or the second operation may be a sliding operation, shown in FIG. 10A, toward the top left of the screen of the electronic device 100 performed on and perpendicular to the lower edge of the screen. Alternatively, the second operation may be a tapping operation performed on a button for returning to a home screen in "three buttons". It should be noted that the button for returning to the home screen in the "three buttons" may be a physical button or a virtual button. This is not limited herein in this disclosure. The second operation for exiting the first application may alternatively be another operation. This is not limited herein in this disclosure.

S1305: The electronic device 100 reuses the first animationLeash object for the exiting animation.

Further, first, the electronic device 100 needs to obtain parameter information of an image frame in the exiting animation, and then the electronic device 100 draws a second window by using the first animationLeash object. The electronic device 100 changes an attribute of the second window based on the parameter information of the image frame in the exiting animation, the electronic device 100 obtains the image frame through composition based on the parameter information of the image frame, and the electronic device 100 displays the image frame in the second window.

The electronic device 100 obtains the parameter information of the image frame in the exiting animation according to the interpolation algorithm.

In some embodiments, the starting animation played on the electronic device 100 has ended, the electronic device 100 displays a main interface of the first application, and the electronic device 100 receives the second operation for exiting the first application. In this case, the initial parameter information of the image frame in the exiting animation obtained by the electronic device 100 is the parameter information of the $M^{th}$ image frame in the starting animation. The $M^{th}$ image frame in the starting animation is the last image frame in the starting animation.

First, the electronic device 100 obtains initial parameter information of an image frame in the exiting animation. The initial parameter information of the image frame in the exiting animation is parameter information of the first image frame in the exiting animation. The electronic device 100 may obtain parameter information of the second image frame in the exiting animation according to the interpolation algorithm based on the parameter information of the first image frame in the exiting animation. By analogy, the electronic device 100 may obtain parameter information of the third image frame in the exiting animation according to the interpolation algorithm based on the parameter information of the second image frame in the exiting animation. The electronic device 100 may obtain parameter information of an $N^{th}$ image frame in the exiting animation according to the interpolation algorithm based on parameter information of an $(N-1)^{th}$ image frame in the exiting animation, and so on, until the electronic device 100 obtains parameter information of an $M^{th}$ image frame in the exiting animation according to the interpolation algorithm based on parameter information of an $(M-1)^{th}$ image frame in the exiting animation. The exiting animation includes M image frames. That is, the electronic device 100 obtains the parameter information of the next image frame according to the interpolation algorithm based on the parameter information of the currently displayed image frame.

In some other embodiments, in a process in which the electronic device 100 plays the starting animation, the electronic device 100 currently displays, for example, the $N^{th}$ image frame in the starting animation, and the electronic device 100 receives the second operation for exiting the first application. In this case, the initial parameter information of the image frame in the exiting animation obtained by the electronic device 100 is parameter information of the $N^{th}$ image frame in the starting animation.

First, the electronic device 100 obtains initial parameter information of an image frame in the exiting animation. The initial parameter information of the image frame in the exiting animation is parameter information of the first image frame in the exiting animation. The electronic device 100 may obtain parameter information of the second image frame in the exiting animation according to the interpolation algorithm based on the parameter information of the first image frame in the exiting animation. By analogy, the electronic device 100 may obtain parameter information of the third image frame in the exiting animation according to the interpolation algorithm based on the parameter information of the second image frame in the exiting animation. The electronic device 100 may obtain parameter information of an $N^{th}$ image frame in the exiting animation according to the interpolation algorithm based on parameter information of an $(N-1)^{th}$ image frame in the exiting animation, and so on. The $N^{th}$ image frame in the starting animation is the last image frame in the exiting animation. That is, the electronic device 100 obtains the parameter information of the next image frame according to the interpolation algorithm based on the parameter information of the currently displayed image frame.

This part of description has been described in detail in the foregoing embodiment. For details, refer to the descriptions in the foregoing embodiment. Details are not described herein again in this disclosure.

The electronic device 100 obtains parameter information of an image frame in the exiting animation, and the electronic device 100 reuses the first animationLeash object used for the starting animation. Then, the electronic device 100 draws the second window by using the first animationLeash object, the electronic device 100 obtains the image frame through composition based on the parameter information of the image frame in the exiting animation, and the electronic device 100 displays the composite image frame in the second window. Further, refer to the embodiments shown in FIG. 8A to FIG. 8H, FIG. 9A to FIG. 9F, and FIG. 10A to FIG. 10F. Details are not described herein again in this disclosure.

In this way, when the electronic device 100 plays the exiting animation, the first animationLeash object created when the electronic device 100 plays the starting animation is reused. On one hand, it can be understood that the starting animation and the exiting animation are one piece of animation, and a problem that a transition is not smooth when the starting animation is switched to the exiting animation does not occur, thereby improving user experience. On the other hand, the electronic device 100 obtains the parameter information of the next image frame according to the interpolation algorithm based on the parameter information of the current image frame, and then obtains the next image frame through composition based on the parameter information of the next image frame. In this way, effect of playing the starting animation and the exiting animation on the electronic device 100 is smoother and not abrupt.

In some embodiments, a direction of the second operation for exiting the first application also affects an effect of playing the exiting animation on the electronic device 100.

As shown in FIG. 8H, FIG. 8H is a diagram of an example of a motion trajectory of center points of image frames in the exiting animation when the second operation for exiting the first application is a sliding operation toward the top of a screen of the electronic device 100 performed on and perpendicular to a lower edge of the screen.

When the second operation for exiting the first application is a sliding operation toward the top right of the screen of the electronic device 100 performed on and perpendicular to the lower edge of the screen, the motion trajectory of the center points of the image frames in the exiting animation is shifted to a right side of the electronic device 100. As shown in FIG. 9F, FIG. 9F shows an example of the motion trajectory of the center points of the image frames in the exiting animation when the second operation for exiting the first application is the sliding operation toward the top right of the screen of the electronic device 100 performed on and perpendicular to the lower edge of the screen. Compared with the motion trajectory of the center points of the image frames in FIG. 8H, the motion trajectory of the center points of the image frames in the exiting animation shown in FIG. 9F is shifted to the right side of the electronic device 100.

Further, it is assumed that the starting animation of the application includes the M image frames. For example, the electronic device 100 currently displays the $N^{th}$ image frame in the starting animation. The electronic device 100 receives the second operation for exiting the first application, and the electronic device 100 starts to play the exiting animation. First, the electronic device 100 needs to obtain parameter information of the first image frame in the exiting animation. It can be learned from the foregoing analysis that the electronic device 100 obtains the parameter information of the first image frame in the exiting animation based on the parameter information of the $N^{th}$ image frame in the starting animation. Position information of the $N^{th}$ image frame may be represented as $(x+N \times v, y+N \times v)$. Because the second operation is the sliding operation toward the top right of the screen of the electronic device 100 performed on and perpendicular to the lower edge of the screen, a horizontal coordinate in the position information of the $N^{th}$ image frame that is input by using the electronic device 100 to the interpolation algorithm becomes greater. For example, the position information of the $N^{th}$ image frame that is input by using the electronic device 100 to the interpolation algorithm is $(x+N \times v+x0, y+N \times v)$, where $x0$ is greater than 0. Position information, of the first image frame in the exiting animation, obtained by the electronic device 100 according to the interpolation algorithm is $(x+N \times v+x0-v, y+N \times v-v)$. Therefore, the first image frame in the exiting animation is shifted to a right side of the screen of the electronic device 100. By analogy, each image frame in the exiting animation is shifted to the right side of the screen of the electronic device 100.

When the second operation for exiting the first application is the sliding operation toward the top left of the screen of the electronic device 100 performed on and perpendicular to the lower edge of the screen, the motion trajectory of the center points of the image frames in the exiting animation is shifted to a left side of the electronic device 100. As shown in FIG. 10F, FIG. 10F shows an example of a motion trajectory of the center points of the image frames in the exiting animation when the second operation for exiting the first application is the sliding operation toward the top left of the screen of the electronic device 100 performed on and perpendicular to the lower edge of the screen. Compared with the motion trajectory of the center points of the image frames in FIG. 8H, the motion trajectory of the center points of the image frames in the exiting animation shown in FIG. 10F is shifted to the left side of the electronic device 100.

Further, it is assumed that the starting animation of the application includes the M image frames. For example, the electronic device 100 currently displays the $N^{th}$ image frame in the starting animation. The electronic device 100 receives the second operation for exiting the first application, and the electronic device 100 starts to play the exiting animation. First, the electronic device 100 needs to obtain the parameter information of the first image frame in the exiting animation. It can be learned from the foregoing analysis that the electronic device 100 obtains the parameter information of the first image frame in the exiting animation based on the parameter information of the $N^{th}$ image frame in the starting animation. Position information of the $N^{th}$ image frame may be represented as $(x+N \times v, y+N \times v)$. Because the second operation is the sliding operation toward the top left of the screen of the electronic device 100 performed on and perpendicular to the lower edge of the screen, a horizontal coordinate in the position information of the $N^{th}$ image frame that is input by using the electronic device 100 to the interpolation algorithm becomes greater. For example, the position information of the $N^{th}$ image frame that is input by using the electronic device 100 to the interpolation algorithm is $(x+N \times v-x0, y+N \times v)$, where $x0$ is greater than 0. Position information, of the first image frame in the exiting animation, obtained by the electronic device 100 according to the interpolation algorithm is $(x+N \times v-x0-v, y+N \times v-v)$. Therefore, the first image frame in the exiting animation is shifted to a left side of the screen of the electronic device 100. By analogy, each image frame in the exiting animation is shifted to the left side of the screen of the electronic device 100.

Further, for explanations of the interpolation algorithm, refer to the descriptions in the foregoing embodiment. Details are not described herein again in this disclosure.

In conclusion, the embodiments described above are merely intended for describing the technical solutions of this disclosure, not for limiting this disclosure. Although this disclosure is described in detail with reference to the foregoing embodiments, a person of ordinary skill in the art should understand that modifications can still be made to the technical solutions described in the foregoing embodiments or equivalent replacements can still be made to some technical features thereof, without departing from the scope of the technical solutions of embodiments of this disclosure.

The invention claimed is:

1. A method implemented by an electronic device and comprising:

receiving a first operation of a user for initiating a first application and for starting to play a starting animation of the first application;

drawing, by an animationLeash object, a first window;

displaying, based on the first operation and in the first window, a first image frame in the starting animation;

receiving, after the first operation and while displaying the first image frame, a second operation of the user for exiting the first application and instructing the electronic device to play an exiting animation of the first application;

determining, based on first parameter information of the first image frame, second parameter information of a second image frame and attribute information of a second window, wherein the first parameter information is a first transparency of the first image frame, wherein the second parameter information is a second transparency of the second image frame, and wherein the attribute information is a third transparency of the second window;

drawing, by the animationLeash object, the second window based on the attribute information; and displaying, based on the second operation, based on the second parameter information, and in the second window, the second image frame in the exiting animation.

2. The method of claim 1, further comprising:

obtaining, before displaying the first image frame and based on the first parameter information, the first image frame through composition; and obtaining, before displaying the second image frame and based on the second parameter information, the second image frame through composition.

3. The method of claim 1, wherein the second image frame is the first image frame in the exiting animation.

4. The method of claim 1, further comprising further determining, through an interpolation calculation based on the first parameter information, the second parameter information.

5. The method of claim 1, further comprising:

creating a new animation processing thread in a surfaceflinger of the electronic device before displaying the first image frame; and further determining, using the new animation processing thread and based on the first parameter information, the second parameter information.

6. The method of claim 1, wherein the first parameter information further comprises any one or more of a first position of a first center point of the first image frame, a first window size of the first image frame, or a first size of a first rounded corner of the first image frame, wherein the second parameter information further comprises any one or more of a second position of a second center point of the second image frame, a second window size of the second image frame, or a second size of a second rounded corner of the second image frame, and wherein the attribute information further comprises any one or more of a third position of a third center point of the second window, a third window size of the second window, or a third size of a third rounded corner of the second window.

7. The method of claim 1, wherein before receiving the second operation, the method further comprises displaying a first user interface of the first application after the first animation has ended.

8. An electronic device comprising:

one or more memories configured to store computer instructions; and one or more processors coupled to the one or more memories and configured to execute the computer instructions to cause the electronic device to:

receive a first operation of a user for initiating a first application and for starting to play a starting animation of the first application;

draw, by an animationLeash object, a first window;

display, based on the first operation and in the first window, a first image frame in the starting animation;

receive, after the first operation and while displaying the first image frame, a second operation of the user for exiting the first application and instructing the electronic device to play an exiting animation of the first application;

determine, based on first parameter information of the first image frame, second parameter information of a second image frame and attribute information of a second window, wherein the first parameter information is a first transparency of the first image frame, wherein the second parameter information is a second transparency of the second image frame, and wherein the attribute information is a third transparency of the second window;

draw, by the animationLeash object, the second window based on the attribute information; and display, based on the second operation, based on the second parameter information, and in the second window, the second image frame in the exiting animation.

9. The electronic device of claim 8, wherein the one or more processors are further configured to execute the computer instructions to cause the electronic device to:

obtain, based on the first parameter information, the first image frame through composition; and obtain, based on the second parameter information, the second image frame through composition.

10. The electronic device of claim 8, wherein the second image frame is the first image frame in the exiting animation.

11. The electronic device of claim 8, wherein the one or more processors are further configured to execute the computer instructions to cause the electronic device to further determine, through interpolation calculation based on the first parameter information, the second parameter information.

12. The electronic device of claim 8, wherein the electronic device further comprises a surfaceflinger, and wherein the one or more processors are further configured to execute the computer instructions to cause the electronic device to:

create a new animation processing thread in the surface-flinger; and determine, using the new animation processing thread and based on the first parameter information, the second parameter information.

13. The electronic device of claim 8, wherein the first parameter information further comprises any one or more of a first position of a first center point of the first image frame, a first window size of the first image frame, or a first size of a first rounded corner of the first image frame, wherein the second parameter information further comprises any one or more of a second position of a second center point of the second image frame, a second window size of the second image frame, or a second size of a second rounded corner of the second image frame, and wherein the attribute information further comprises any one or more of a third position of a third center point of the second window, a third window size of the second window, or a third size of a third rounded corner of the second window.

14. The electronic device of claim 8, wherein the one or more processors are further configured to execute the computer instructions to cause the electronic device to display a first user interface of the first application after the first animation has ended.

15. A computer program product comprising computer-executable instructions that are stored on a non-transitory readable medium and that, when executed by one or more processors, cause an electronic device to:

receive a first operation of a user for initiating a first application and for starting to play a starting animation of the first application;

draw, by an animationLeash object, a first window;

display, based on the first operation and in the first window, a first image frame in the starting animation;

receive, after the first operation and while displaying the first image frame, a second operation of the user for exiting the first application and instructing the electronic device to play an exiting animation of the first application;

determine, based on first parameter information, second parameter information of a second image frame and attribute information of a second window, wherein the first parameter information is a first transparency of the first image frame, wherein the second parameter information is a second transparency of the second image frame, and wherein the attribute information is a third transparency of the second window;

draw, by the animationLeash object, the second window based on the attribute information; and display, based on the second operation, based on the second parameter information, and in the second window, the second image frame in the exiting animation.

16. The computer program product of claim 15, wherein the computer-executable instructions further cause the electronic device to:

obtain, based on the first parameter information, the first image frame through composition; and obtain, based on the second parameter information, the second image frame through composition.

17. The computer program product of claim 15, wherein the computer-executable instructions further cause the electronic device to display a first user interface of the first application after the first animation has ended.

18. The computer program product of claim 15, wherein the first parameter information further comprises a first position of a first center point of the first image frame, wherein the second parameter information further comprises a second position of a second center point of the second image frame, and wherein the attribute information further comprises a third position of a third center point of the second window.

19. The computer program product of claim 15, wherein the first parameter information further comprises, a first window size of the first image frame, wherein the second parameter information further comprises, a second window size of the second image frame, and wherein the attribute information further comprises, a third window size of the second window.

20. The computer program product of claim 15, wherein the first parameter information further comprises a first size of a first rounded corner of the first image frame, wherein the second parameter information further comprises a second size of a second rounded corner of the second image frame, and wherein the attribute information further comprises a third size of a third rounded corner of the second window.

* * * * *